United States Patent
Hoshiyama et al.

(10) Patent No.: US 7,661,787 B2
(45) Date of Patent: Feb. 16, 2010

(54) PRINTING METHOD, COMPUTER-READABLE MEDIUM, PRINTING APPARATUS, METHOD OF MANUFACTURING PRINTING APPARATUS, PRINTING SYSTEM, AND CORRECTION PATTERN

(75) Inventors: Yoshiko Hoshiyama, Nagano-ken (JP); Masahiko Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 490 days.

(21) Appl. No.: 11/054,365

(22) Filed: Feb. 10, 2005

(65) Prior Publication Data
US 2005/0212832 A1  Sep. 29, 2005

(30) Foreign Application Priority Data
Feb. 13, 2004  (JP)  ............................. 2004-037137
Jul. 29, 2004  (JP)  ............................. 2004-221424

(51) Int. Cl.
*B41J 29/393* (2006.01)
*B41J 2/205* (2006.01)

(52) U.S. Cl. .......................................... 347/19; 347/15

(58) Field of Classification Search ................. 347/19, 347/15, 5, 43; 358/1.9, 3.01, 3.02, 3.03, 358/3.06
See application file for complete search history.

(56) References Cited

U.S. PATENT DOCUMENTS

| 6,089,691 | A | 7/2000 | Kakutani |
| 6,099,105 | A | 8/2000 | Kakutani |
| 6,338,538 | B1 | 1/2002 | Toshiaki |
| 7,318,636 | B2 * | 1/2008 | Komatsu .................. 347/19 |
| 7,347,524 | B2 * | 3/2008 | Yoshida .................... 347/19 |
| 2007/0121130 | A1 * | 5/2007 | Yoshida .................... 358/1.9 |
| 2007/0146740 | A1 * | 6/2007 | Yoshida .................... 358/1.8 |

FOREIGN PATENT DOCUMENTS

| EP | 955768 B1 * | 12/2005 |
| JP | 2-54676 A | 2/1990 |
| JP | 6-166247 A | 6/1994 |
| JP | 10-200765 A | 7/1998 |
| JP | 11-170589 A | 6/1999 |
| JP | 2001-030521 A | 2/2001 |
| JP | 2001-225488 A | 8/2001 |
| JP | 2002185783 A * | 6/2002 |

* cited by examiner

*Primary Examiner*—Stephen D Meier
*Assistant Examiner*—Rene Garcia, Jr.
(74) *Attorney, Agent, or Firm*—Sughrue Mion, PLLC

(57) ABSTRACT

Darkness correction is carried out effectively. A printing method is provided with the following steps: A step of, when a plurality of nozzles arranged in a predetermined direction for each of a plurality of colors of ink is moved in a movement direction intersecting with the predetermined direction while ejecting ink of the plurality of different colors, correcting a darkness of only a predetermined color, of the plurality of colors, for each dot row region so as to inhibit darkness non-uniformities between dot row regions that are formed on a medium by dot rows in the movement direction of the nozzles, and a step of performing printing by moving the plurality of nozzles while ejecting ink.

12 Claims, 41 Drawing Sheets recording table for magenta ink recording table for cyan ink recording table for black ink

| record number | measured value | | | | | | | | instructed value | | | | | | | |
|---|---|---|---|---|---|---|---|---|---|---|---|---|---|---|---|---|
| | Ca | Cb | Cc | Cd | Ce | Cf | Cg | Ch | Sa | Sb | Sc | Sd | Se | Sf | Sg | Sh |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | | | | | | | | | | | | | | |
| 12 | | | | | | | | | | | | | | | | |

⋮

Fig.13 correction data table for yellow ink correction data table for light magenta ink correction data table for light cyan ink

| number | measured value | | | |
|---|---|---|---|---|
| | 20% | 40% | 60% | 80% |
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |

PRINTING METHOD, COMPUTER-READABLE MEDIUM, PRINTING APPARATUS, METHOD OF MANUFACTURING PRINTING APPARATUS, PRINTING SYSTEM, AND CORRECTION PATTERN

CROSS-REFERENCE TO RELATED APPLICATIONS

The present application claims priority upon Japanese Patent Application No. 2004-037137 filed on Feb. 13, 2004 and Japanese Patent Application No. 2004-221424 filed on Jul. 29, 2004, which are herein incorporated by reference.

BACKGROUND OF THE INVENTION

1. Field of the Invention

The present invention relates to printing methods, computer-readable media, printing apparatuses, methods for manufacturing printing apparatuses, printing systems, and correction patterns.

2. Description of the Related Art

Color inkjet printers (hereinafter referred to as "printers") that eject inks of a plurality of color onto a medium such as paper to form an image are known as printing apparatuses. These printers repeat in alternation a dot formation operation of forming dots on a paper by ejecting ink from a plurality of nozzles, which move in the movement direction of a carriage, and a carrying operation of carrying the paper in an intersecting direction (hereinafter, also referred to as the "carrying direction") that intersects the movement direction using a carry unit. By doing this, a plurality of raster lines each made of a plurality of dots aligned in the movement direction are formed in the intersecting direction, printing an image.

With this type of printer, there are variations in the ink droplet ejection characteristics, such as the amount of the ink droplet and the travel direction, for each nozzle. Discrepancies in the ejection characteristics are a cause of darkness non-uniformities in printed images, and thus are not preferable. In conventional countermeasures, correction patterns are first printed on the paper using each of the respective color inks that are ejectable. Next, the darknesses of the printed correction patterns are read, correction information is obtained based on the data that had been read, and printing is carried out by executing darkness correction based on the obtained correction information.

(1) In conventional methods, correction patterns are printed using each ejectable color ink, the printed correction patterns are then read, and darkness correction is carried out based on the data that has been read. That is, if four color inks are ejectable, then four correction patterns are printed for those colors, and if six color inks are ejectable, then six correction patterns are printed for those colors. However, depending on the ink color, there are colors in which darkness non-uniformities have a tendency to occur (colors in which darkness non-uniformity is easily visible) and colors in which it is difficult for darkness non-uniformities to occur (colors in which darkness non-uniformity is not easily visible). For this reason, there is little effect in carrying out darkness correction for a color in which it is difficult for darkness non-uniformities to occur. That is, notwithstanding the large amount of time spent in processes such as the process of printing a correction pattern using a color in which it is difficult for darkness non-uniformities to occur, the process of reading the correction pattern of the color in which it is difficult for darkness non-uniformities to occur, the process of obtaining correction information based on the data that has been read for the color in which it is difficult for darkness non-uniformities to occur, and the process of carrying out darkness correction based on the obtained correction information for the color in which it is difficult for darkness non-uniformities to occur, there is little effect in darkness correction for the color in which it is difficult for darkness non-uniformities to occur. And for this reason, a large amount effort and time is wasted by carrying out darkness correction for a color in which it is difficult for darkness non-uniformities to occur, such that there is a problem of reducing the throughput of the printer.

(2) Furthermore, in carrying out darkness correction, a large amount of time and effort is spent in processes such as the process of printing a correction pattern, the process of reading the correction pattern, and the process of carrying out darkness correction based on the data that is read. Conversely, by omitting darkness correction in regions in which there is little effect, it would be possible to restrain the effort and time wasted on these.

In this regard, darkness non-uniformities tend to occur easily in light regions within a printed image. For example, when printing portrait images, the darkness of the printed image is light in regions in which human skin colors are rendered, and therefore darkness non-uniformities tend to occur easily. For this reason, the effect of darkness correction is easily obtainable in regions of light darkness. On the other hand, darkness non-uniformities tend not to occur easily in dark regions within a printed image, and there is little effect in carrying out darkness correction.

SUMMARY OF THE INVENTION

The present invention was arrived at in light of the foregoing issues, and it is an object thereof to effectively carry out darkness correction.

A primary aspect of the present invention is a printing method such as the following.

A printing method comprises the following steps of:

carrying out darkness correction in order to inhibit darkness non-uniformity between dot row regions on a medium, the darkness correction being carried out with respect to only one or more predetermined colors, of a plurality of colors, for each of the dot row regions; and ejecting ink toward each of the dot row regions from each of a plurality of nozzles arranged along a predetermined direction for each ink color of the plurality of colors while moving the nozzles in a movement direction intersecting with the predetermined direction, such that the dot row regions take on a corrected darkness.

Other features of the present invention will become clear through the accompanying drawings and the following description.

BRIEF DESCRIPTION OF THE DRAWINGS

For a more complete understanding of the present invention and the advantages thereof, reference is now made to the following description taken in conjunction with the accompanying drawings.

FIG. 13 is a conceptual diagram of a recording table that is provided in the memory of a computer.

FIG. 36 is a conceptual diagram of a correction data table.

DETAILED DESCRIPTION OF PREFERRED EMBODIMENTS

Figure 1:
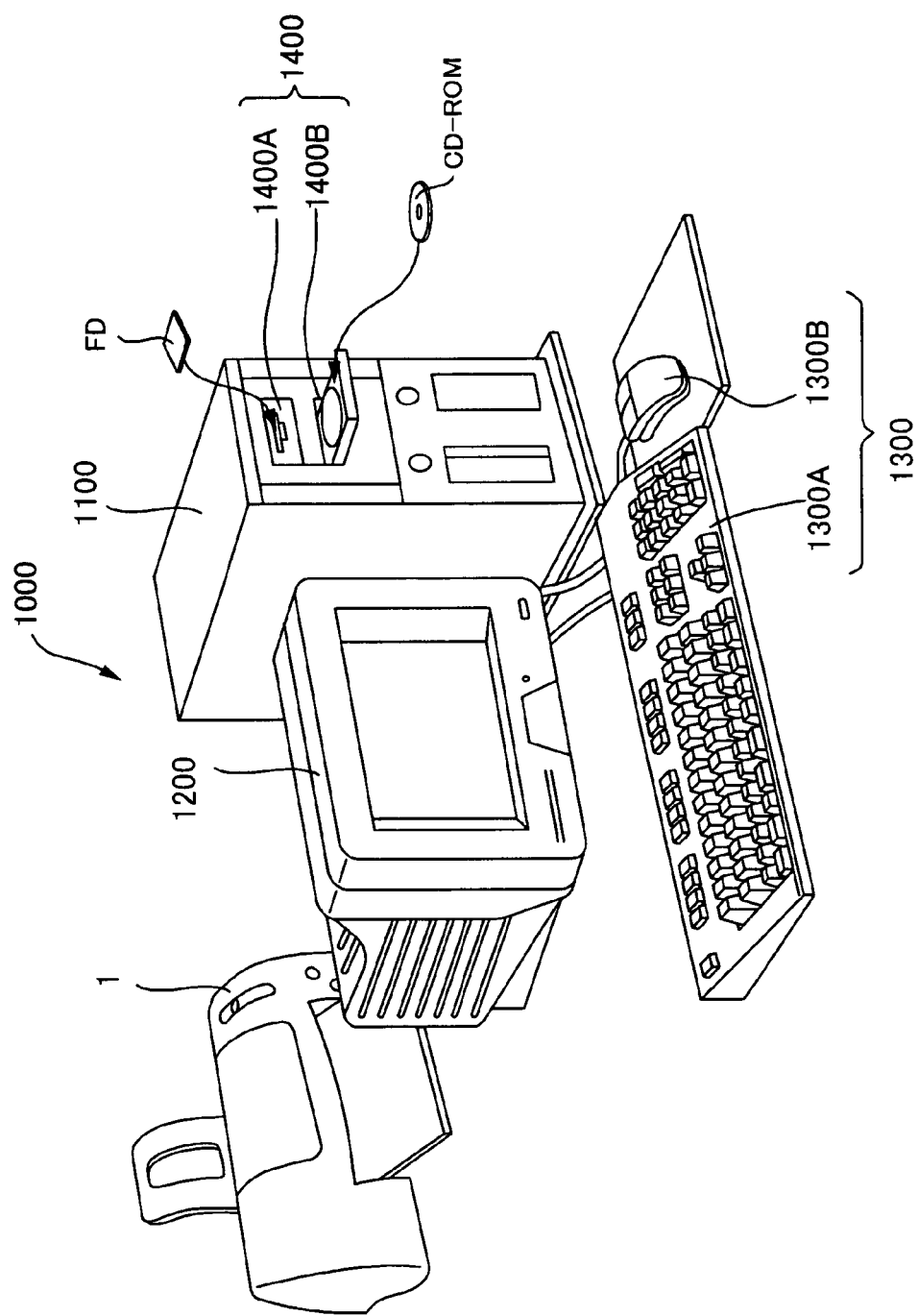
FIG. 1 is an explanatory diagram showing the external structure of a printing system.

At least the following matters will be made clear by the present specification and the accompanying drawings.

A printing method comprises the following steps of:

carrying out darkness correction in order to inhibit darkness non-uniformity between dot row regions on a medium, the darkness correction being carried out with respect to only one or more predetermined colors, of a plurality of colors, for each of the dot row regions; and ejecting ink toward each of the dot row regions from each of a plurality of nozzles arranged along a predetermined direction for each ink color of the plurality of colors while moving the nozzles in a movement direction intersecting with the predetermined direction, such that the dot row regions take on a corrected darkness.

With the above-described printing method, darkness correction for the dot row regions is performed for only a predetermined color, and therefore correction is not performed for all the plurality of colors. For this reason, the processing for carrying out correction can be performed in a shorter time compared to when performing correction for all the colors, and therefore throughput is increased. Moreover, since the number for tasks involved in the processes of generating the data used in correction is reduced and the time spent on these processes is shortened, it is also possible to increase productivity and reduce costs. Furthermore, since correction is carried out with respect to predetermined colors, it is possible to inhibit darkness non-uniformities between dot row regions compared to when correction is not performed.

In this printing method, it is preferable that the correction is carried out based on a result of reading the correction patterns printed for each of a plurality of gradations for each of the one or more predetermined colors. With this printing method, since correction is carried out for predetermined colors based on the results of reading actually printed correction patterns, these correction patterns being printed for each gradation of a plurality of gradations, it is possible to obtain very accurate information corresponding to the actual machine, and reliable correction can be carried out based on the accurate information that is obtained.

In this printing method, it is preferable that each of the correction patterns is printed extending in the predetermined direction on the medium for each of the gradations for each of the colors. Although darkness non-uniformities that occur between dot row regions are caused due to the printed dot rows, the conditions of the occurrences in dot rows vary depending on factors such as differences in the print mode and the ejection sections that are used, and different positions on the medium of the dot rows that are formed. For this reason, as in the above-described printing method, by performing correction based on results read from correction patterns printed along the above-mentioned predetermined direction of the medium for each gradation and for each color, it is possible to carry out appropriate correction made to correspond to the print mode by which printing is actually carried out, the ejection section that actually forms the dots, and the different positions on the medium, and so forth.

In this printing method, it is preferable that the correction patterns are printed lined up in the movement direction. With this printing method, since a plurality of correction patterns are printed lined up in the movement direction, it is possible to print many correction patterns during a single movement of the ejection section in the movement direction. Furthermore, since the plurality of correction patterns are printed lined up in the movement direction, it is possible to form each correction pattern in the carrying direction, and therefore it is possible to print many more of the correction patterns that make it possible to perform effective correction.

In this printing method, it is preferable that the correction patterns required for carrying out the correction are all printed on a single medium. With this printing method, since a single medium is used for printing all the correction patterns, it is possible to reduce not only the amount of media used but also the amount of ink, and therefore costs can be reduced. Furthermore, since printing is performed on only a single medium, it is possible to reduce the time required in processing.

In this printing method, it is preferable that the one or more predetermined colors is a color in which darkness non-uniformity between the dot row regions is easily visible. With this printing method, correction is performed on colors in which darkness non-uniformities are easily visible but is not performed on colors in which darkness non-uniformities do not become easily visible, and therefore it is possible to effectively inhibit darkness non-uniformities and also possible to reduce the processing time of darkness correction and the time spent for obtaining correction data.

In this printing method, it is preferable that the one or more predetermined colors is a color that, among the plurality of colors, has a high level of darkness. Colors that have a high level of darkness easily stand out, and therefore it is possible to inhibit darkness non-uniformities more effectively by performing correction for colors that have a high level of darkness.

In this printing method, it is preferable that the one or more predetermined colors includes at least one of cyan, magenta, and black. Cyan, magenta, and black have a high level of darkness and, comparatively, non-uniformities in darkness are easily visible, and therefore it is possible to effectively inhibit darkness non-uniformities by performing correction for cyan, magenta, and black. Furthermore, cyan, magenta, and black are ink colors, and therefore correction can be performed easily by correcting the image data corresponding to those colors.

Further, a printing method comprises:

a step of carrying out darkness correction in order to inhibit darkness non-uniformity between dot row regions on a medium, the darkness correction being carried out with respect to only one or more predetermined colors, of a plurality of colors, for each of the dot row regions; and a step of ejecting ink toward each of the dot row regions from each of a plurality of nozzles arranged along a predetermined direction for each ink color of the plurality of colors while moving the nozzles in a movement direction intersecting with the predetermined direction, such that the dot row regions take on a corrected darkness;

wherein the correction is carried out based on a result of reading the correction patterns printed for each of a plurality of gradations for each of the predetermined colors;

wherein each of the correction patterns is printed extending in the predetermined direction on the medium for each of the gradations for each of the colors;

wherein the correction patterns are printed lined up in the movement direction;

wherein the correction patterns required for carrying out the correction are all printed on a single medium;

wherein the one or more predetermined colors is a color in which darkness non-uniformity between the dot row regions is easily visible;

wherein the one or more predetermined colors is a color that, among the plurality of colors, has a high level of darkness; and wherein the one or more predetermined colors includes at least one of cyan, magenta, and black.

With this printing method, it is possible to attain substantially all of the effects mentioned above, and thus the object of the present invention is achieved most effectively.

Also possible is a computer-readable medium for causing a printing apparatus that is provided with a plurality of nozzles arranged along a predetermined direction for each ink color of a plurality of colors to operate, comprising:

a code for causing performance of darkness correction in order to inhibit darkness non-uniformity between dot row regions on a medium, the darkness correction being carried out with respect to only one or more predetermined colors, of the plurality of colors, for each of the dot row regions; and a code for causing ejection of ink toward each of the dot row regions from each of the nozzles while moving the nozzles in a movement direction intersecting with the predetermined direction, such that the dot row regions take on a corrected darkness.

Also possible is a correction pattern used in darkness correction executed for each of a plurality of dot row regions on a medium to inhibit darkness non-uniformities between the dot row regions by moving, in a movement direction, a plurality of nozzles arranged along a predetermined direction for each ink color of a plurality of colors, the movement direction intersecting with the predetermined direction, wherein only one or more predetermined colors, of the plurality of colors, is printed.

Furthermore, it is possible to achieve a printing apparatus comprising:

a plurality of nozzles arranged along a predetermined direction for each ink color of a plurality of colors;

wherein the plurality of nozzles are moved in a movement direction intersecting with the predetermined direction, and darkness correction is executed for each of a plurality of dot row regions on a medium to inhibit darkness non-uniformities between the dot row regions; and wherein the correction is carried out on only one or more predetermined colors of the plurality of colors.

Furthermore, it is possible to achieve a printing system that includes:

a computer main unit; and a printing apparatus connected to the computer main unit and provided with a plurality of nozzles arranged along a predetermined direction for each ink color of a plurality of colors;

wherein darkness correction is executed for each of a plurality of dot row regions to inhibit darkness non-uniformities between the dot row regions on a medium on which dot rows are formed along a movement direction, which intersects with the predetermined direction, with each of the nozzles when ink is ejected while the plurality of nozzles are moved in the movement direction; and wherein the correction is carried out on only one or more predetermined colors of the plurality of colors.

Furthermore, a printing method comprises the following steps of:

obtaining correction values for correcting darkness of unit images respectively formed in unit regions that are adjacent to one another in a carrying direction of a medium; and if a gradation value indicated by pixel data corresponding to the unit region on the medium is less than a predetermined gradation value, then forming the unit image in the unit region using a darkness corrected according to the correction value corresponding to that unit region, and if the gradation value indicated by the pixel data corresponding to the unit region on the medium is equal to or greater than the predetermined gradation value, then forming the unit image in that unit region without correcting the darkness.

With this printing method, darkness non-uniformities can be efficiently inhibited.

In this printing method, it is preferable that printing is performed using a head that forms on the medium dark dots and light dots that absorb light of the same wavelength but absorb different amounts thereof; and if the gradation value indicated by the pixel data is less than the predetermined gradation value, only the light dots are formed on the medium. In this way, correction values for dark dots do not need to be stored, and therefore darkness correction can be carried out efficiently.

In this printing method, it is preferable that the head forms the dark dots and the light dots in cyan or magenta. However, the head may form dark dots and light dots in yellow.

In this printing method, it is preferable that information related to a creation ratio of the light dots is stored as the correction values. In this way, the darkness of unit images can be corrected by changing the creation ratio of dots formed in the unit regions.

In this printing method, it is preferable that information related to a darkness in the unit regions is stored as the correction values. In this way, darkness correction can be achieved in accordance with the darkness of the unit regions.

In this printing method, it is preferable that printing is performed using a head that forms on the medium a correction pattern in which a plurality of the unit images are formed adjacent to one another in the carrying direction; and the correction values corresponding to darkness in the unit regions of the correction pattern are respectively associated with the unit regions and stored. In this way, darkness correction can be carried out corresponding to each dot row region.

In this printing method, it is preferable that the head is capable of forming on the medium dark dots and light dots that absorb light of the same wavelength but absorb different amounts thereof; and the correction pattern is formed using only the light dots. In this way, correction patterns do not need to be made for dark dots, and thus the effort of the tasks involved can be reduced.

In this printing method, it is preferable that a darkness of the unit image is corrected by correcting a creation ratio of dots formed in the unit region based on the correction value. In this way, the darkness of unit images can be corrected by changing the creation ratio of dots formed in the unit regions.

Furthermore, a printing method comprises:

a step of obtaining correction values for correcting darkness of unit images respectively formed in unit regions that are adjacent to one another in a carrying direction of a medium; and a step of, if a gradation value indicated by pixel data corresponding to the unit region on the medium is less than a predetermined gradation value, forming the unit image in the unit region using a darkness corrected according to the correction value corresponding to that unit region, and if the gradation value indicated by the pixel data corresponding to the unit region on the medium is equal to or greater than the predetermined gradation value, forming the unit image in that unit region without correcting the darkness;

wherein printing is performed using a head that forms on the medium dark dots and light dots in cyan or magenta;

wherein, if the gradation value indicated by the pixel data is less than the predetermined gradation value, only the light dots are formed on the medium;

wherein information related to a creation ratio of the light dots is stored as the correction values;

wherein information related to a darkness in the unit regions is stored as the correction values;

wherein a correction pattern in which a plurality of the unit images are formed adjacent to one another in the carrying direction is formed on the medium;

wherein the correction values corresponding to darkness in the unit regions of the correction pattern are respectively associated with the unit regions and stored;

wherein the correction pattern is formed using only the light dots; and wherein a darkness of the unit image is corrected by correcting a creation ratio of dots formed in the unit region based on the correction value.

With this printing method, darkness non-uniformities can be effectively inhibited.

Furthermore, a computer-readable medium for causing a print control apparatus that controls a printing apparatus for forming printed images on a medium to operate, comprises:

a code for obtaining correction values for correcting darkness of unit images respectively formed in unit regions that are adjacent to one another in a carrying direction of a medium; and a code for, if a gradation value indicated by pixel data corresponding to the unit region on the medium is less than a predetermined gradation value, forming the unit image in the unit region using a darkness corrected according to the correction value corresponding to that unit region, and if the gradation value indicated by the pixel data corresponding to the unit region on the medium is equal to or greater than the predetermined gradation value, forming the unit image in that unit region without correcting the darkness.

With this computer-readable medium, darkness non-uniformities can be effectively inhibited.

Furthermore, a printing method comprises the following steps of:

forming on a medium a correction pattern constituted by only light dots using a head that forms on the medium dark dots and the light dots that absorb light of the same wavelength but absorb different amounts thereof;

detecting, respectively, darkness of a plurality of unit images that constitute the correction pattern;

storing, in association with each of the unit images, information related to the darkness of each of the unit images; and correcting the darkness of the unit images constituted by the dark dots and the light dots based on the information, and forming on the medium a print image constituted by a plurality of the unit images.

With this printing method, darkness non-uniformities can be effectively inhibited.

Furthermore, a printing apparatus comprises:

a movement section for moving in a movement direction a head for ejecting ink;

a carrying section for carrying a medium in a carrying direction;

a memory for storing correction values for correcting darkness of unit images respectively formed in unit regions that are adjacent to one another in the carrying direction; and a controller for, if a gradation value indicated by pixel data corresponding to the unit region on the medium is less than a predetermined gradation value, forming the unit image in the unit region using a darkness corrected according to the correction value corresponding to that unit region, and if the gradation value indicated by the pixel data corresponding to the unit region on the medium is equal to or greater than the predetermined gradation value, forming the unit image in that unit region without correcting the darkness.

With this printing apparatus, darkness non-uniformities can be effectively inhibited.

Furthermore, a method of manufacturing a printing apparatus that stores correction values, comprises the following steps of:

forming on a medium a correction pattern constituted by only light dots using the printing apparatus provided with a head that is capable of forming on the medium dark dots and the light dots that absorb light of the same wavelength but absorb different amounts thereof;

detecting, respectively, darkness of a plurality of unit images that constitute the correction pattern; and storing, in association with each of the unit images, information related to the darkness of each of the unit images.

With this method of manufacturing a printing apparatus, it is possible to efficiently manufacture a printing apparatus capable of inhibiting darkness non-uniformities.

Furthermore, a printing system comprises:

a movement section for moving in a movement direction a head for ejecting ink;

a carrying section for carrying a medium in a carrying direction;

a memory for storing correction values for correcting darkness of unit images respectively formed in unit regions that are adjacent to one another in the carrying direction; and a controller for, if a gradation value indicated by pixel data corresponding to the unit region on the medium is less than a predetermined gradation value, forming the unit image in the unit region using a darkness corrected according to the correction value corresponding to that unit region, and if the gradation value indicated by the pixel data corresponding to the unit region on the medium is equal to or greater than the predetermined gradation value, forming the unit image in that unit region without correcting the darkness.

With this printing system, darkness non-uniformities can be effectively inhibited.

(1) First Embodiment

===(1) Configuration of the Printing System===

An embodiment of a printing system according to a first embodiment is described next with reference to the drawings.

FIG. 1 is an explanatory diagram showing the external structure of the printing system. The printing system according to the first embodiment is provided with an inkjet printer 1 (hereinafter, referred to simply as "printer 1"), a computer 1100, a display device 1200, input devices 1300, and record/play devices 1400. The printer 1 is a printing apparatus for printing images on a medium such as paper, cloth, or film. It should be noted that the following description is made using paper S (see FIG. 3), which is a representative medium, as an example of the medium.

The computer 1100 is communicably connected to the printer 1, has an application program and a printer driver 1110 (see FIG. 8) for example installed on it, and outputs print data corresponding to an image to be printed to the printer 1 in order to print the image with the printer 1. The input devices 1300 are for example a keyboard 1300A and a mouse 1300B, and are used to operate the application program or input the settings of the printer driver 1110, for example. A flexible disk drive device 1400A and a CD-ROM drive device 1400B, for example, are employed as the record/play devices 1400.

The printer driver 1110 is a program for achieving the function of displaying screens or the like for setting conditions such as printing conditions on the display device 1200, and in addition it also achieves the function of converting image data that has been output from the application program into print data. The printer driver 1110 is recorded on a storage medium (computer-readable storage medium) such as a flexible disk or a CD-ROM. The printer driver 1110 may also be downloaded onto the computer 1100 via the Internet. This program is made of codes for achieving various functions.

It should be noted that "printing apparatus" in a narrow sense means the printer 1, but in a broader sense it means the system constituted by the printer 1 and the computer 1100.

===(1) Configuration of the Printer===

<Configuration of the Printer>

Figure 2:
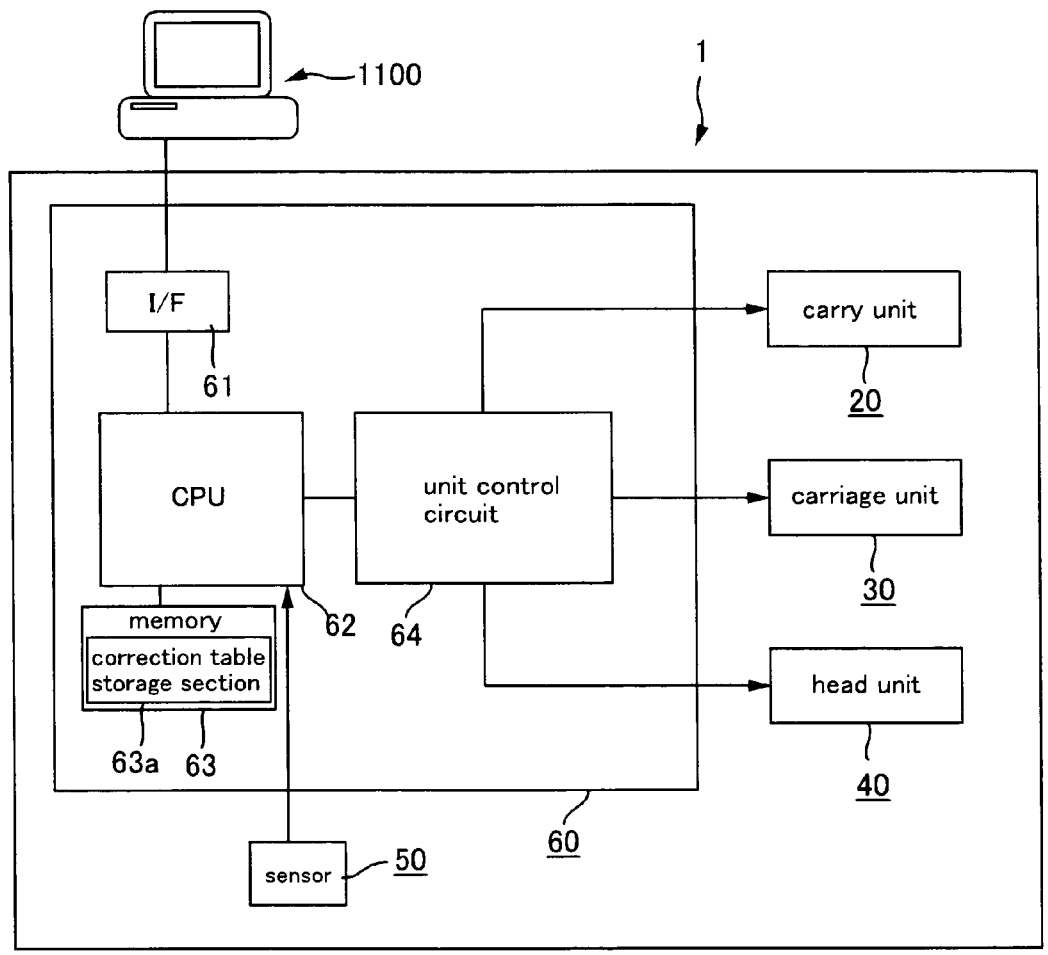
FIG. 2 is a block diagram of the overall configuration of a printer 1 of a first embodiment.
Figure 3:
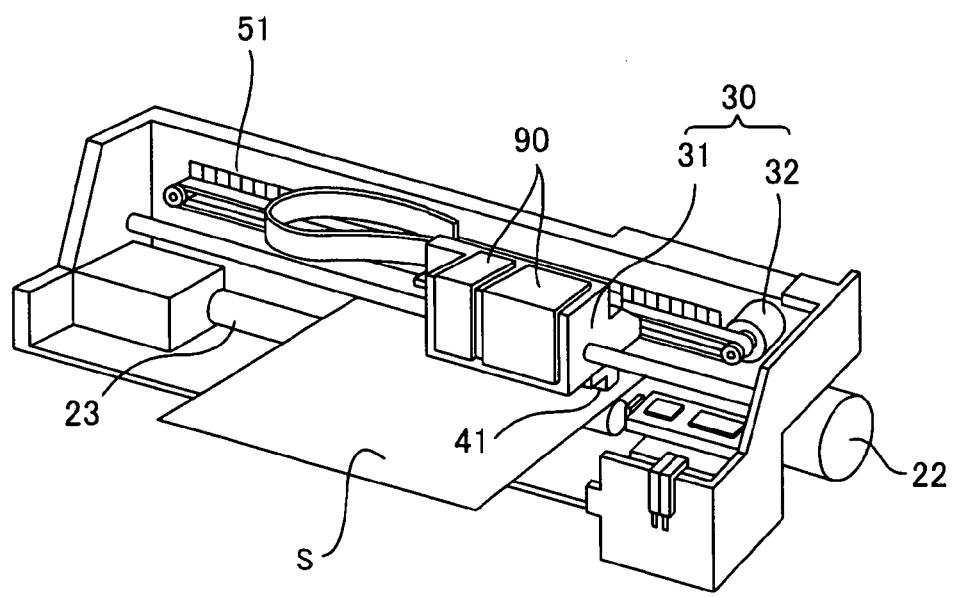
FIG. 3 is a schematic diagram of the overall configuration of the printer 1 of the first embodiment.
Figure 3:
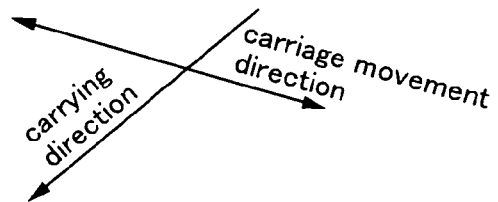
Figure 4:
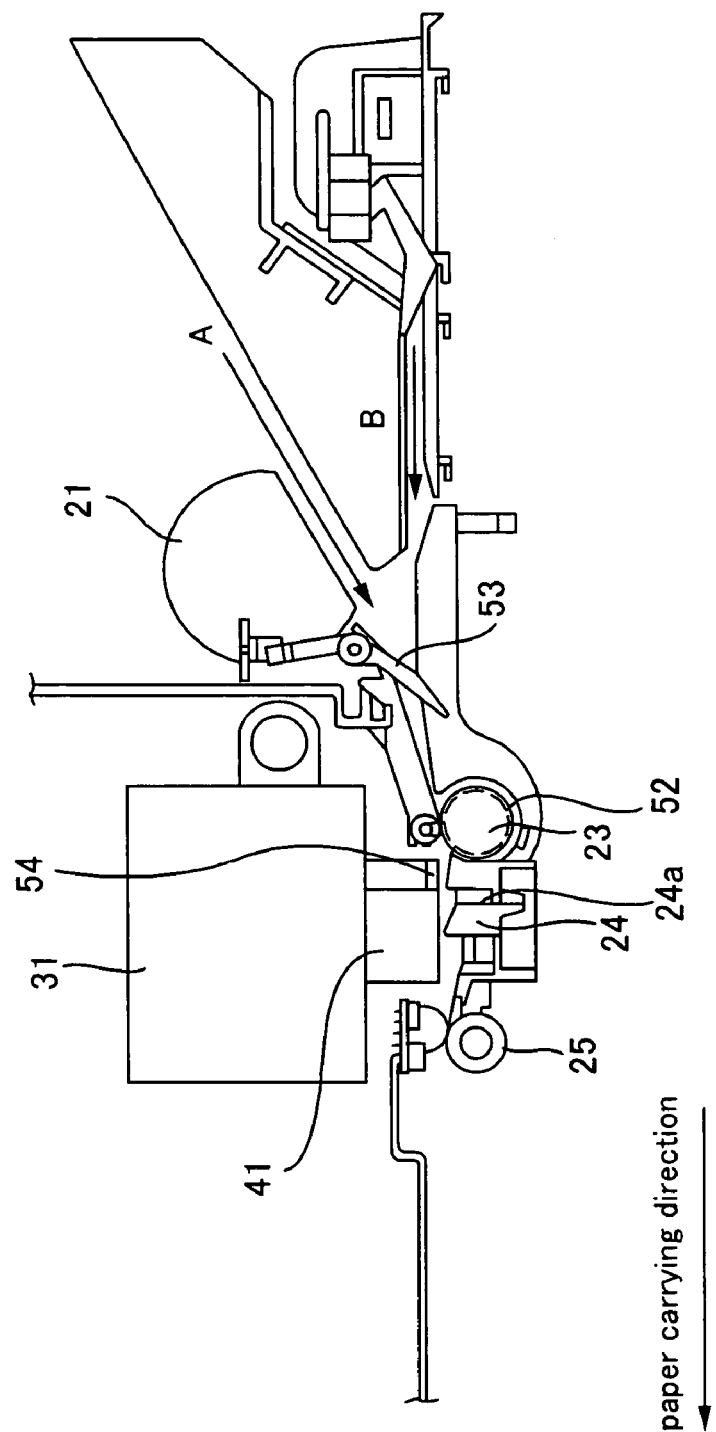
FIG. 4 is a cross-sectional view of the overall configuration of the printer 1 of the first embodiment.
Figure 5:
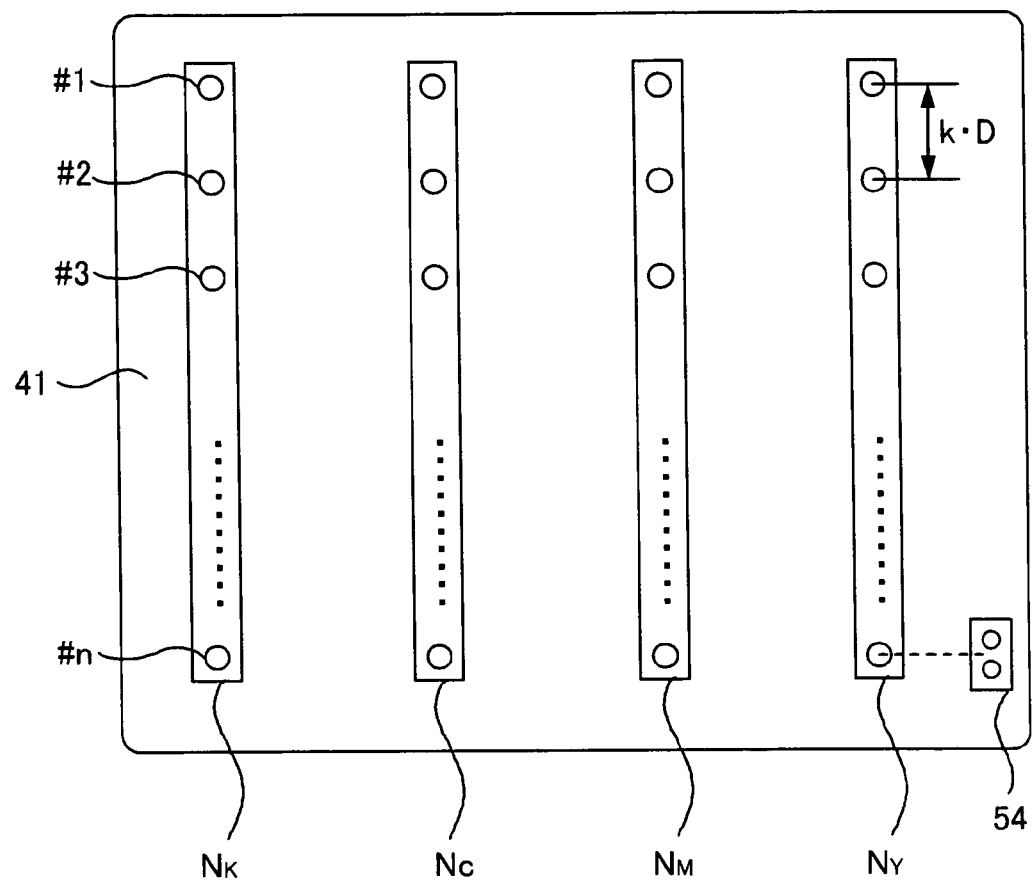
FIG. 5 is an explanatory diagram showing the arrangement of the nozzles in the lower surface of the head.
Figure 5:
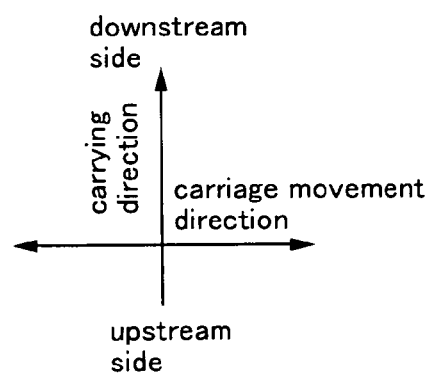

FIG. 2 is a block diagram of the overall configuration of a printer 1 according to the first embodiment, FIG. 3 is a schematic diagram of the overall configuration of the printer 1 of the first embodiment, FIG. 4 is a cross-sectional view of the overall configuration of the printer 1 of the first embodiment, and FIG. 5 is an explanatory diagram showing the arrangement of the nozzles in the lower surface of the head 41. The basic structure of the printer 1 according to the first embodiment is described below using these diagrams.

The inkjet printer 1 of the first embodiment has a carry unit 20, a carriage unit 30, a head unit 40, sensors 50, and a controller 60. The printer 1, which receives print data from the computer 1100, which is an external device, controls the various units (the carry unit 20, the carriage unit 30, and the head unit 40) using the controller 60. The controller 60 controls the units in accordance with the print data that is received from the computer 1100 to print an image on a paper S. The sensors 50 monitor the conditions within the printer 1, and output the results of this detection to the controller 60. The controller 60 controls the various units based on the detection results that are output from the sensors 50.

The carry unit 20 functions as a carrying mechanism that carries the paper S and is for carrying the paper S to a printable position, carrying the paper S by a predetermined carry amount in a predetermined direction (hereinafter, referred to as the "carrying direction") during printing.

The carry unit 20 has a paper supply roller 21, a carry motor 22 (also referred to as "PF motor"), a carry roller 23, a platen 24, and a paper discharge roller 25. The paper supply roller 21 is a roller for supplying the paper S that has been inserted into a paper insert opening into the printer 1. The paper supply roller 21 has its cross-section shaped like the letter D, and the length of its circumferential portion is set longer than the carry distance up to the carry roller 23. Thus, by rotating the paper supply roller once from a state in which its circumferential portion is apart from the paper surface, the paper S can be carried by an amount equivalent to the length of the circumferential portion, and it is possible to make the leading edge of the paper S reach to the carry roller 23. The carry motor 22 is a motor for carrying paper in the carrying direction, and is constituted by a DC motor, for example. The carry roller 23 is a roller for carrying the paper S that has been supplied by the paper supply roller 21 up to a printable region, and is driven by the carry motor 22. The platen 24 supports the paper S during printing from the rear surface side of the paper S. The paper discharge roller 25 is a roller for carrying the paper S in the carrying direction at a position downstream from the platen 24 in the carrying direction. The paper discharge roller 25 is rotated in synchronization with the carry roller 23.

The carriage unit 30 is provided with a carriage 31 and a carriage motor 32 (hereinafter, also referred to as "CR motor"). The carriage motor 32 is a motor for moving the carriage 31 back and forth in a predetermined direction (hereinafter, this is also referred to as the "carriage movement direction"), and for example is constituted by a DC motor. The carriage 31 detachably holds ink cartridges 90 containing ink. A head 41 for ejecting ink from the nozzles is attached as an ejection portion to the carriage 31. Thus, by moving the carriage 31 back and forth, the head 41 and the nozzles also move back and forth in the carriage movement direction. Consequently, the carriage movement direction corresponds to the "movement direction" in the claims.

The head unit 40 is for ejecting ink onto the paper S. The head unit 40 includes the head 41. The head 41 has a plurality of nozzles, and ejects ink intermittently from each of the nozzles. Rows of dots are formed on the paper S in the carriage movement direction due to the head 41 intermittently ejecting ink from the nozzles while moving in the carriage movement direction. Furthermore, the region in which a row of dots is to be formed in the carriage movement direction can be determined virtually on the paper as a row of pixels in the carriage movement direction, and this virtually determined region is referred to as a "dot row region." Here a "pixel" refers to virtual square boxes on the paper that defines the positions onto which a dot is to be formed on the paper by the ejection of ink from a nozzle serving as an ejection portion. In other words, the pixels are regions on the medium on which dots can be formed, and can be thought of as "dot formation units." It should be noted that the nozzle arrangement, the configuration the head 41, the drive circuit for driving the head 41, and the method for driving the head 41 are described further below.

The sensors 50 include a linear encoder 51, a rotary encoder 52, a paper detection sensor 53, and a paper width sensor 54, for example. The linear encoder 51 is for detecting the position in the carriage movement direction, and has a belt-shaped slit plate provided extending in the carriage movement direction, and a photo interrupter that is attached to the carriage 31 and detects the slits formed in the slit plate.

The rotary encoder 52 is for detecting the amount of rotation of the carry roller 23, and has a disk-shaped slit plate that rotates in conjunction with rotation of the carry roller 23, and a photo interrupter for detecting the slits formed in the slit plate.

The paper detection sensor 53 is for detecting the position of the leading edge of the paper S to be printed. The paper detection sensor 53 is provided at a position where it can detect the leading edge position of the paper S as the paper S is being carried toward the carry roller 23 by the paper supply roller 21. It should be noted that the paper detection sensor 53 is a mechanical sensor that detects the leading edge of the paper S through a mechanical mechanism. More specifically, the paper detection sensor 53 includes a lever that can be rotated in the paper carrying direction, and this lever is disposed so that it protrudes into the path over which the paper S is carried. Also, as a result of the paper S being carried, the leading edge of the paper comes into contact with the lever and the lever is rotated. Thus, the paper detection sensor 53 detects the leading edge position of the paper S and whether or not the paper S is present by detecting the movement of this lever using a photo interrupter, for example.

The paper width sensor 54 is attached to the carriage 31. In the first embodiment, as shown in FIG. 5, it is attached at substantially the same position as the most upstream side nozzle, with respect to its position in the carrying direction. The paper width sensor 54 is a reflective optical sensor, and with a light-receiving section receives the reflection light of the light that has been irradiated onto the paper S from a light-emitting section, and based on the intensity of the light that is received by the light-receiving section, detects whether or not the paper S is present. The paper width sensor 54 detects the positions of the edges of the paper S while being moved by the carriage 31, so as to detect the width of the paper S. The paper width sensor 54 also can detect the leading edge of the paper S depending on the conditions.

The controller 60 is a control unit for carrying out control of the printer 1. The controller 60 has an interface section (I/F) 61, a CPU 62, a memory 63, and a unit control circuit 64. The interface section 61 is for exchanging data between the computer 1100, which is an external device, and the printer 1. The CPU 62 is a computer processing device for carrying out overall control of the printer. The memory 63 is for reserving a working region and a region for storing the programs for the CPU 62, for instance, and includes storage means such as a RAM, an EEPROM, or a ROM. The CPU 62 controls the various units 20, 30, and 40 via the unit control circuit 64 in accordance with programs stored in the memory 63. In the first embodiment, a partial region of the memory 63 is used as a correction table storage section 63a for storing a correction table, which is described later.

<Regarding the Nozzle Arrangement and Configuration of the Head>

As shown in FIG. 5, a black ink nozzle row NK, a cyan ink nozzle row NC, a magenta ink nozzle row NM, and a yellow ink nozzle row NY are formed in the lower surface of the head 41. That is, the printer 1 is capable of ejecting inks of four colors, these being black (K) ink, cyan (C) ink, and magenta (M) ink, which are dark-colored inks with a high level of darkness, and yellow (Y) ink, which is a light-colored ink with a low level of darkness. Each nozzle row is provided with n (for example, n=180) nozzles, which are ejection openings for ejecting the respective color inks. The plurality of nozzles of the nozzle rows are arranged at a constant spacing (nozzle pitch: k·D) in a direction that intersects the movement direction of the carriage 31, that is, arranged in the carrying direction of the paper S. Here, D is the minimum dot pitch in the carrying direction, that is, the interval of dots formed on the paper S at the highest resolution. Also, k is an integer of 1 or more. For example, if the nozzle pitch is 180 dpi (1/180 inch) and the dot pitch in the carrying direction is 720 dpi (1/720 inch), then k=4. It should be noted that in the example illustrated here, the nozzles of the nozzle rows are assigned numbers that become smaller toward the nozzles on the downstream side (#1 to #n). That is, the nozzle #1 is positioned more downstream in the carrying direction than the nozzle #n. When these nozzles rows are provided in the head 41, the region in which dots are formed by a single dot formation operation is broadened, allowing the printing time to be reduced. Also, these nozzle rows are provided for each color of ink, and thus by suitably ejecting ink from these nozzle rows it is possible to perform multi-color printing.

Also, each nozzle has an ink path linked to the ink cartridge 90, which contains ink, and pressure chambers (not shown) are provided on the inkpaths. Each pressure chamber is configured such that the volume therein shrinks or expands due to a piezo element (not shown) for example, which is provided as a drive element for causing ink droplets to be ejected from the respective nozzle.

<Regarding the Driving of the Head>

Figure 6:
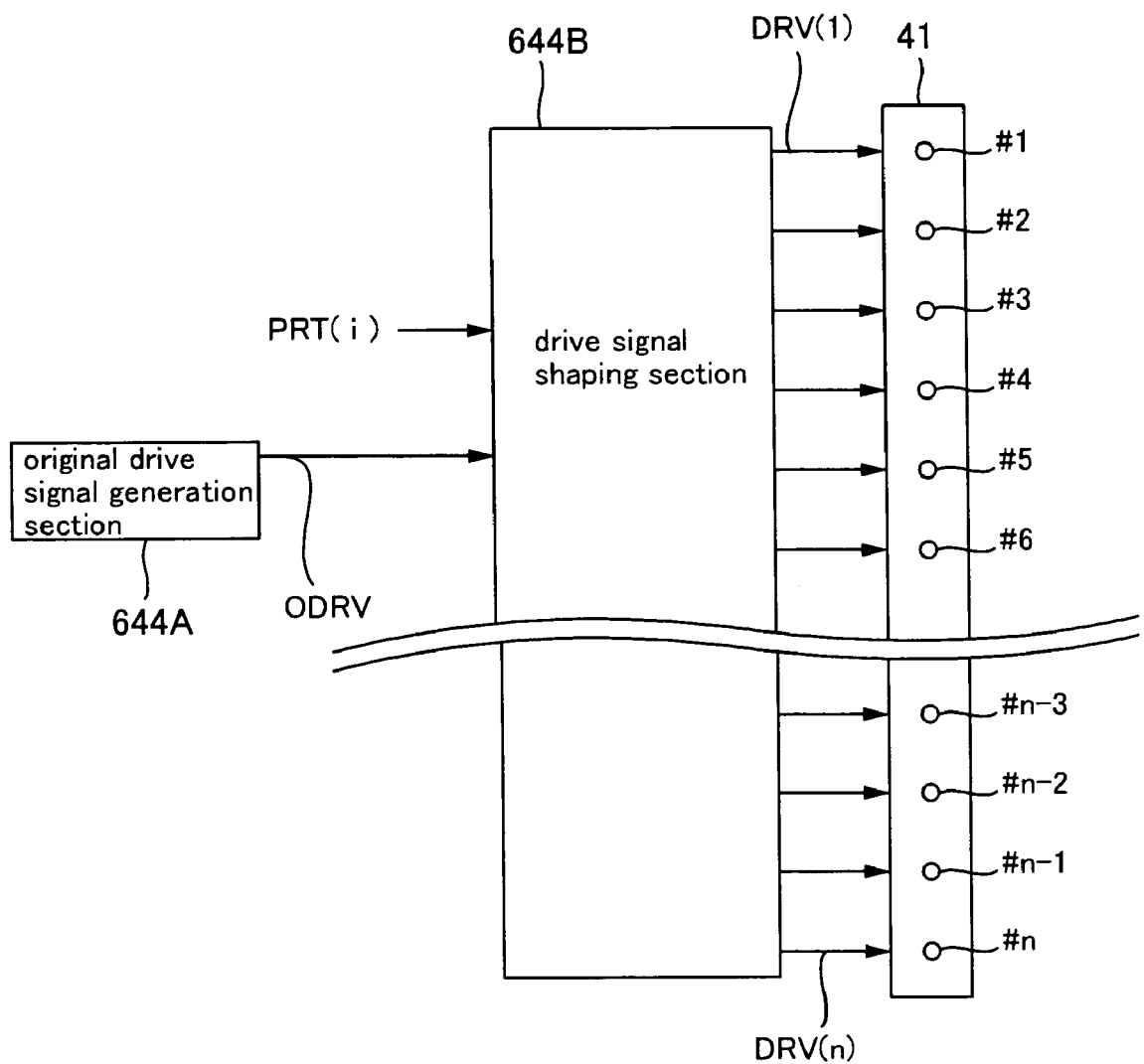
FIG. 6 is an explanatory diagram of the drive circuit of the head.

FIG. 6 is an explanatory diagram of the drive circuit of the head 41. This drive circuit is provided within the unit control circuit 64 mentioned above. As shown in the diagram, the drive circuit is provided with an original drive signal generation section 644A and a drive signal shaping section 644B. In the first embodiment, a drive circuit is provided for each nozzle row, that is, for each nozzle row of the colors black (K), cyan (C), magenta (M), and yellow (Y), such that the piezo elements are driven individually for each nozzle row. The number in parentheses at the end of the name of each of the signals in the diagram indicates the number of the nozzle to which that signal is supplied.

The piezo element mentioned above is deformed each time a drive pulse W1 or W2 (see FIG. 7) is supplied thereto, changing the pressure on the ink within the pressure chamber. In other words, when a voltage of a predetermined time duration is applied between electrodes provided on both ends of the piezo element, the piezo element is deformed for the time duration of voltage application and deforms an elastic membrane (lateral wall) partitioning a portion of the pressure chamber. The volume of the pressure chamber changes in accordance with this deformation of the piezo element, and due to this change in pressure chamber volume the pressure on the ink within the pressure chamber is altered. Due to this change in pressure on the ink, an ink droplet is ejected from the corresponding nozzle #1 to #n.

The original drive signal generation section 644A generates an original drive signal ODRV that is used in common by the nozzles #1 to #n. The original drive signal ODRV in the first embodiment is a signal in which two types of drive pulses W1 and W2 are output, once each, during the time in which the carriage 31 moves by a distance of one pixel, which corresponds to the print resolution.

The drive signal shaping section 644B receives the original drive signal ODRV from the original signal generation section together with a print signal PRT(i). The print signal PRT(i) is a signal whose level changes according to the aforementioned 2-bit print data. The drive signal shaping section 644B shapes the original drive signal ODRV in correspondence with the level of the print signal PRT(i) and outputs it toward the piezo elements of the nozzles #1 to #n as a drive signal DRV(i). The piezo elements of the nozzles #1 to #n are driven in accordance with the drive signal DRV from the drive signal shaping section 644B.

<Regarding the Drive Signals of the Head>

Figure 7:
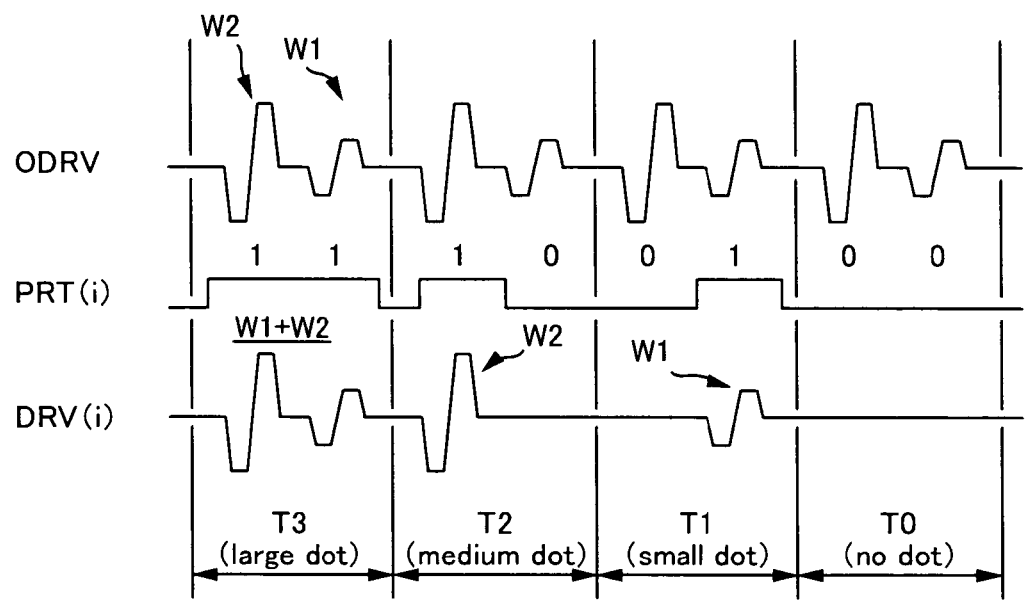
FIG. 7 is a timing chart for describing the various signals.

FIG. 7 is a timing chart illustrating the various signals. That is, this drawing shows a timing chart for the various signals, namely the original drive signal ODRV, the print signal PRT(i), and the drive signal DRV(i).

The original drive signal ODRV is a signal used in common for the nozzles #1 to #n, and is output from the original drive signal generation section 644A to the drive signal shaping section 644B. Within the time (hereinafter called "single pixel period") in which the carriage 31 moves by a distance of one pixel corresponding to the print resolution, there are a first pulse W1 and a second pulse W2 in the original drive signal ODRV of the first embodiment. The first pulse W1 is a drive pulse for causing a small size ink droplet (hereinafter, called small ink droplet) to be ejected from the nozzle. The second pulse W2 is a drive pulse for causing a medium size ink droplet (hereinafter, called medium ink droplet) to be ejected from the nozzle. In other words, by supplying the first pulse W1 to the piezo element, a small ink droplet is ejected from the nozzle. When this small ink droplet lands on the paper S, a small size dot (small dot) is formed. Likewise, by supplying the second pulse W2 to the piezo element, a medium ink droplet is ejected from the nozzle. When this medium ink droplet lands on the paper S, a medium size dot (medium dot) is formed.

The print signal PRT(i) is a signal corresponding to the pixel data allocated to each of the pixels in the print data sent from a computer or the like. That is, the print signal PRT(i) is a signal corresponding to the pixel data included in the print data. In the first embodiment, the print signals PRT(i) are signals having two bits of information per pixel. It should be noted that the drive signal shaping section 644B shapes the original drive signal ODRV in correspondence with the level of the print signal PRT(i), and outputs a drive signal DRV(i).

The drive signal DRV is a signal that is obtained by blocking the original drive signal ODRV in correspondence with the level of the print signal PRT. That is, when the print data is "1," then the print signal PRT is at high level and the drive signal shaping section 644B allows the drive pulse for the original drive signal ODRV to pass unchanged and sets it as the drive signal DRV(i). On the other hand, when the print data is "0," then the print signal PRT is at low level and the drive signal shaping section 644B blocks the drive pulse for the original drive signal ODRV. Then, the drive signal DRV(i) from the drive signal shaping section 644B is individually supplied to the corresponding piezo element. The piezo elements are driven in accordance with the drive signals DRV(i) that are supplied to them.

When the print signal PRT(i) corresponds to the two bits of data "01" then only the first pulse W1 is output in the first half of the pixel period. Accordingly, a small ink droplet is output from the nozzle, forming a small dot on the paper S. When the print signal PRT(i) corresponds to the two bits of data "10" then only the second pulse W2 is output in the second half of a single pixel period. Accordingly, a medium ink droplet is output from the nozzle, forming a medium dot on the paper S. When the print signal PRT(i) corresponds to the two bits of data "11" then both the first pulse W1 and the second pulse W2 are output during a single pixel period. Accordingly, a small ink droplet and a medium ink droplet are successively ejected from the nozzle, forming a large size dot (large dot) on the paper S.

In other words, the printer 1 is capable of forming dots of a plurality of sizes (here, three sizes). When the print signal PRT(i) corresponds to the two bits of data "00" then neither the first pulse W1 nor the second pulse W2 are output during the pixel period. In this case, no ink droplet of any size is ejected from the nozzle, and no dot is formed on the paper S.

As described above, the drive signal DRV(i) in a single pixel period is shaped so that it may have four different waveforms corresponding to the four different values of the print signal PRT(i).

===(1) Printer Driver===

<Regarding the Printer Driver>

Figure 8:
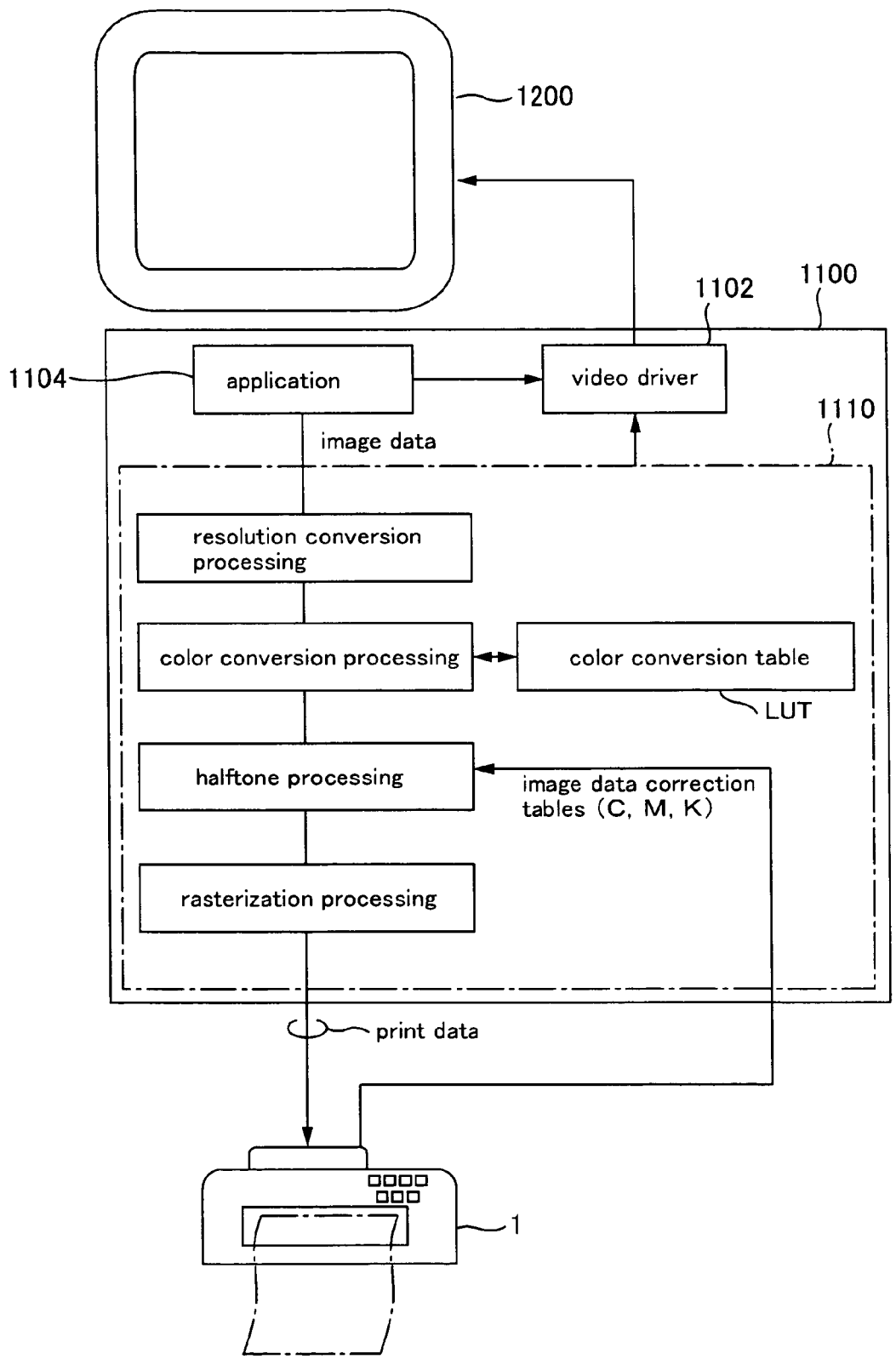
FIG. 8 is a schematic explanatory diagram of basic processes carried out by the printer driver.

FIG. 8 is a schematic explanatory diagram of the basic processes carried out by the printer driver 1110. It should be noted that structural elements that have already been described are assigned identical reference numerals and thus further description thereof is omitted.

On the computer 1100, computer programs such as a video driver 1102, an application program 1104, and the printer driver 1110 operate under an operating system installed on the computer 1100.

The video driver 1102 has a function for displaying a predetermined screen on the display device 1200 in accordance with display commands from the application program 1104 and the printer driver 1110.

The application program 1104, for example, has a function for image editing or the like and creates data related to an image (image data). A user can give a command to print an image edited by the application program 1104 via the user interface of the application program 1104. Upon receiving the print command, the application program 1104 outputs the image data to the printer driver 1110.

The printer driver 1110 receives the image data from the application program 1104, converts the received image data into printable print data, and outputs the converted print data to the printer 1. The image data has pixel data as the data corresponding to the pixels of the image to be printed. The pixel data is expressed in gradation values for each of the colors of RGB or CMYK for example, and the gradation values or the like are converted in accordance with later-described processing stages and are ultimately converted at the print data stage into print data (data such as the color and the size of the dots) corresponding to the dots to be formed on the paper.

Print data is data in a format that can be interpreted by the printer 1, and includes the pixel data and various command data. Here, "command data" refers to data for instructing the printer 1 to carry out a specific operation, and is data indicating the carry amount, for example.

In order to convert the image data that is output from the application program 1104 into print data, the printer driver 1110 carries out such processes as resolution conversion, color conversion, halftoning, and rasterization. The various processes carried out by the printer driver 1110 are described below.

Resolution conversion is a process for converting image data (text data, image data, etc.) output from the application program 1104 to the resolution (the interval of dots when printing; also referred to as "print resolution") for printing the image on the papers. For example, when the print resolution has been designated as 720×720 dpi, then the image data obtained from the application program 1104 is converted into image data having a resolution of 720×720 dpi.

Pixel data interpolation and decimation are examples of this conversion method. For example, if the resolution of the image data is lower than the print resolution that has been designated, then linear interpolation or the like is performed to create new pixel data between adjacent pixel data. On the other hand, if the resolution of the image data is higher than the print resolution, then the pixel data are decimated, for example, at a set ratio to make the resolution of the image data match the print resolution.

Also, in this resolution conversion processing, the image data undergoes size adjustment in which processing is carried out so that it matches the size of the print region to be printed (the region onto which ink is actually ejected).

It should be noted that the pixel data in the image data that is output from the application program 1104 is data that indicates gradation values of many levels (for example, 256 levels) expressed in RGB color space. The pixel data representing RGB gradation values is hereinafter referred to as "RGB pixel data," and the image data made of the RGB pixel data is referred to as "RGB image data."

Color conversion processing is processing for converting the RGB pixel data of the RGB image data into data that represents gradation values of many levels (for example, 256 levels) expressed in CMYK color space. Here the term CMYK respectively refers to C for cyan, M for magenta, Y for yellow, and K for black. Hereinafter, pixel data that represents CMYK gradation values is referred to as "CMYK pixel data", and the image data composed of this CMYK pixel data is referred to as "CMYK image data". Color conversion processing is carried out by the printer driver 1110, with reference to a table that correlates RGB gradation values and CMYK gradation values (color conversion lookup table LUT).

Halftone processing is processing for converting CMYK pixel data having many gradation values into CMYK pixel data having few gradation values, which can be expressed by the printer 1. For example, through halftone processing, CMYK pixel data representing 256 gradation values is converted into 2-bit CMYK pixel data representing four gradation values. The 2-bit CMYK pixel data is data that indicates, for each color, "no dot formation" (binary value "00"), "small dot formation" (binary value "01"), "medium dot formation" (binary value "10"), and "large dot formation" (binary value "11").

So-called dithering, gamma correction, error diffusion, or other such techniques are used in halftone processing to create 2-bit (four gradation) CMYK pixel data with which the printer 1 can form dispersed dots. It should be noted that in the first embodiment, later-described darkness correction, that is, correction carried out for every dot row region so as to suppress darkness non-uniformities between dot row regions is also executed in the halftoning process.

Rasterization is processing for changing the 4-gradation CMYK image data of the four colors that have been subjected to halftone processing into the data order in which they are to be transferred to the printer 1. Data that has been rasterized is output to the printer 1 as print data.

===(1) Regarding the Printing Operation===

Figure 9:
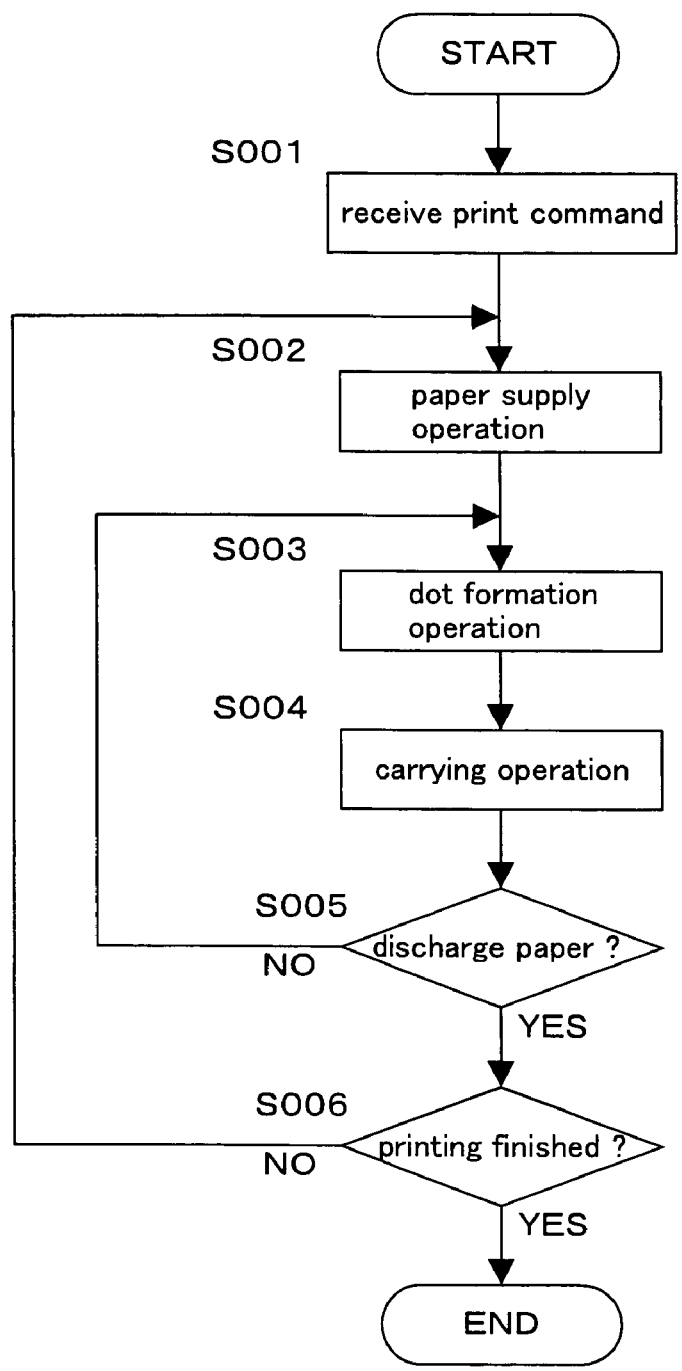
FIG. 9 is a flowchart of the operations during printing.

FIG. 9 is a flowchart of the processing during printing. The various operations that are described below are achieved by the controller 60 controlling the various units in accordance with a program stored in the memory. This program includes codes for executing the various processes.

Receive Print Command (S001): The controller 60 receives a print command via the interface section 61 from the computer 1100. This print command is included in the header of the print data transmitted from the computer 1100. The controller 60 the analyzes the content of the various commands included in the print data that are received and uses the various units to perform the following paper supply operation, carrying operation, and dot formation operation, for example.

Paper Supply Operation (S002): The controller 60 performs the paper supply operation. The paper supply operation is a process for moving the paper S, which is the medium to be printed, and positioning it at a print start position (the so-called "indexed position"). In other words, the controller 60 rotates the paper supply roller 21 to feed the paper S to be printed up to the carry roller 23. Next, the controller 60 rotates the carry roller 23 to position the paper S, which has been fed from the paper supply roller 21, at the print start position. It should be noted that when the paper S has been positioned at the print start position, at least some of the nozzles of the head 41 are in opposition to the paper S.

Dot Formation Operation (S003): The controller 60 performs the dot formation operation. The dot formation operation is an operation for intermittently ejecting ink from the head 41 moving in the carriage movement direction, so as to form dots on the paper S. At this time, the controller 60 drives the carriage motor 32 to move the carriage 31 in the carriage movement direction. Also, the controller 60 causes ink to be ejected from the head 41 in accordance with the print data during the period that the carriage 31 is moving. Then, as mentioned above, if ink that is ejected from the head 41 lands on the paper S, dots are formed on the paper S. At this time, when ink is ejected from the nozzle while the carriage 31 is being moved, a dot row (hereafter also called "raster line") is formed on the paper S in the movement direction.

Carrying Operation (S004): The controller 60 performs the carrying operation. The carrying operation is a process for moving the paper S relative to the head 41 in the carrying direction. The controller 60 drives the carry motor 22 to rotate the carry roller 23 and thereby carry the paper S in the carrying direction. Through this carrying operation, the head 41 becomes able to form dots at positions that are different from the positions of the dots formed in the above-described dot formation operation.

Paper Discharge Operation (S005): The controller 60 determines whether or not to discharge the paper S that is being printed. In this determination, the paper is not discharged if there remains data to be printed on the paper S that is being printed. In this case, the controller 60 repeats in alternation the dot formation operation and the carrying operation until there is no longer any data for printing, gradually printing an image made of dots on the paper S. When there is no longer any data to be printed on the paper S that is being printed, the controller 60 discharges that paper S. That is, the controller 60 discharges the printed paper S to the outside by rotating the paper discharge roller 25. It should be noted that whether or not to discharge the paper can also be determined based on a paper discharge command that is included in the print data.

Determination Whether Printing is Finished (S006): The controller 60 determines whether or not to continue printing. If the next sheet of paper S is to be printed, a new sheet of paper is supplied by a paper supply operation (S002) and printing is continued. If the next sheet of paper S is not to be printed, then the printing operation is ended.

===(1) Regarding the Reason Why Darkness Non-uniformities Occur in the Image ===

Darkness non-uniformities that occur in a multicolor image that is printed using CMYK inks are generally due to darkness non-uniformities that occur in each of those ink colors. For this reason, the method that is normally adopted is a method for inhibiting darkness non-uniformities in images printed in multiple colors by individually inhibiting darkness non-uniformities in each of the ink colors.

Figure 10:
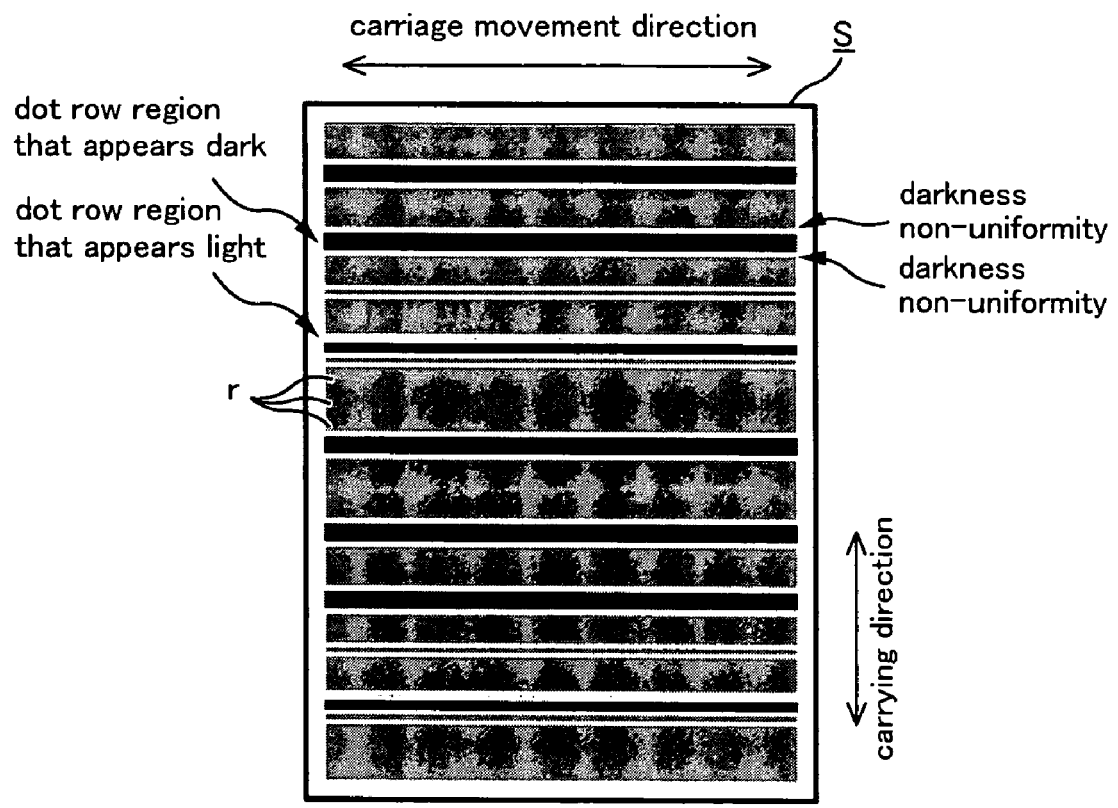
FIG. 10 is a diagram for describing darkness non-uniformities that occur in an image that is printed in a single color, these being the darkness non-uniformities that occur in the carrying direction of the paper.

Accordingly, a description of how darkness non-uniformities occur in images printed in a single color is made in the following. FIG. 10 is a diagram for describing darkness non-uniformities that occur in the carrying direction of the paper S in an image that is printed in a single color.

The darkness non-uniformities in the carrying direction that are illustrated in FIG. 10 appear as bands parallel to the carriage movement direction (for convenience, these are also referred to as "horizontal bands"). These darkness non-uniformities in horizontal bands occur, for example, due to discrepancies in the ink ejection amount between nozzles, but they can also occur due to discrepancies in the machining precision of the nozzles. That is, variation in the direction of travel of the ink that is ejected from the nozzles occurs due to discrepancies in the machining precision of the nozzles. Due to this variation in the travel direction, the positions of the dots that are formed by the ink that lands on the paper S may deviate in the carrying direction from the target formation positions. In this case, the formation position of raster lines r composed of these dots also inevitably shifts relative to the carrying direction away from the target formation positions. For this reason, the spacing between adjacent raster lines r in the carrying direction becomes periodically wider or narrower. When viewed macroscopically, these appear as darkness non-uniformities in horizontal bands. That is, due to the spacing between adjacent raster lines r becoming relatively wider or narrower, the dot row regions in which more dots, or portions of dots, than should be formed in the dot row region are formed appear darker macroscopically, and when the dots, or dot portions, that should be formed in the dot row region are formed in adjacent dot row regions, that dot row region appears macroscopically lighter. Here, raster line r refers to a dot row formed in the carriage movement direction by ink being intermittently ejected while the carriage 31 is moved.

It should be noted that such causes of darkness non-uniformities also apply to any of the other ink colors as well. And as long as any one of the colors cyan C, magenta M, yellow Y, and black K has this tendency, there is a possibility that darkness non-uniformities will appear in an image printed in multiple colors. However, the visibility of darkness non-uniformities varies depending on the color; darkness non-uniformities tend to be more visible with the above-mentioned dark-colored inks, and less visible with a light-colored ink, that is, yellow. For this reason, in the first embodiment, darkness correction is carried out only for dark-colored inks, that is, for black, cyan, and magenta, in which darkness non-uniformities are more visible, thus reducing the time spent on darkness correction.

===(1) Regarding the Method for Printing an Image According to the First Embodiment ===

Figure 11:
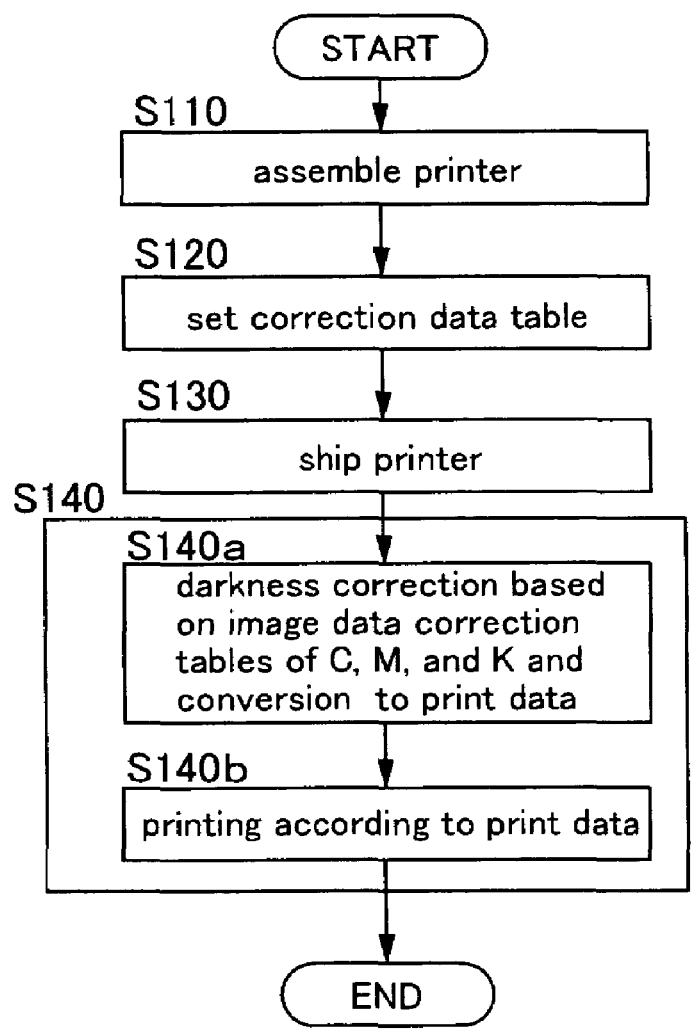
FIG. 11 is a flowchart showing for example the flow of the processing in a method for printing an image according to the first embodiment.

FIG. 11 is a flowchart showing for example the flow of the processing in a method for printing an image according to the first embodiment. An outline of the processing is described below with reference to this flowchart. First, the printer 1 is assembled on the manufacturing line (S110). Next, a correction table for correcting darkness is set in the printer 1 by a worker responsible for inspection (S120). In the first embodiment, since the object of correction is image data that indicates gradation values of pixels (dot formation units), an image data correction table is set for correcting gradation values corresponding to each of the pixels that are supplied as the data for the image to be printed. Here, the image data correction table that indicates values for correcting image data so as to convert that data to new data is stored in a memory, more specifically the correction table storage section 63a (see FIG. 2), of the printer 1.

Next, the printer 1 is shipped (S130). Then, a user who has purchased the printer 1 performs actual printing of an image, and at the time of this actual printing, the printer 1 carries out darkness correction for each raster line based on the correction table stored in the correction table storage section 63a and prints an image on the paper S (S140). Here, in contrast to the printing of a predetermined test pattern such as a correction pattern, "actual printing" refers to the printing of a desired image such as a scenic picture carried out by a user or the like. The method of printing an image according to the first embodiment is achieved by the step of setting the correction table (step S120) and the actual printing of the image (step S140). Accordingly, Step S120 and Step S140 are described below.

<Step S120: Setting the Correction Table for Inhibiting Darkness Non-Uniformities>

Figure 12:
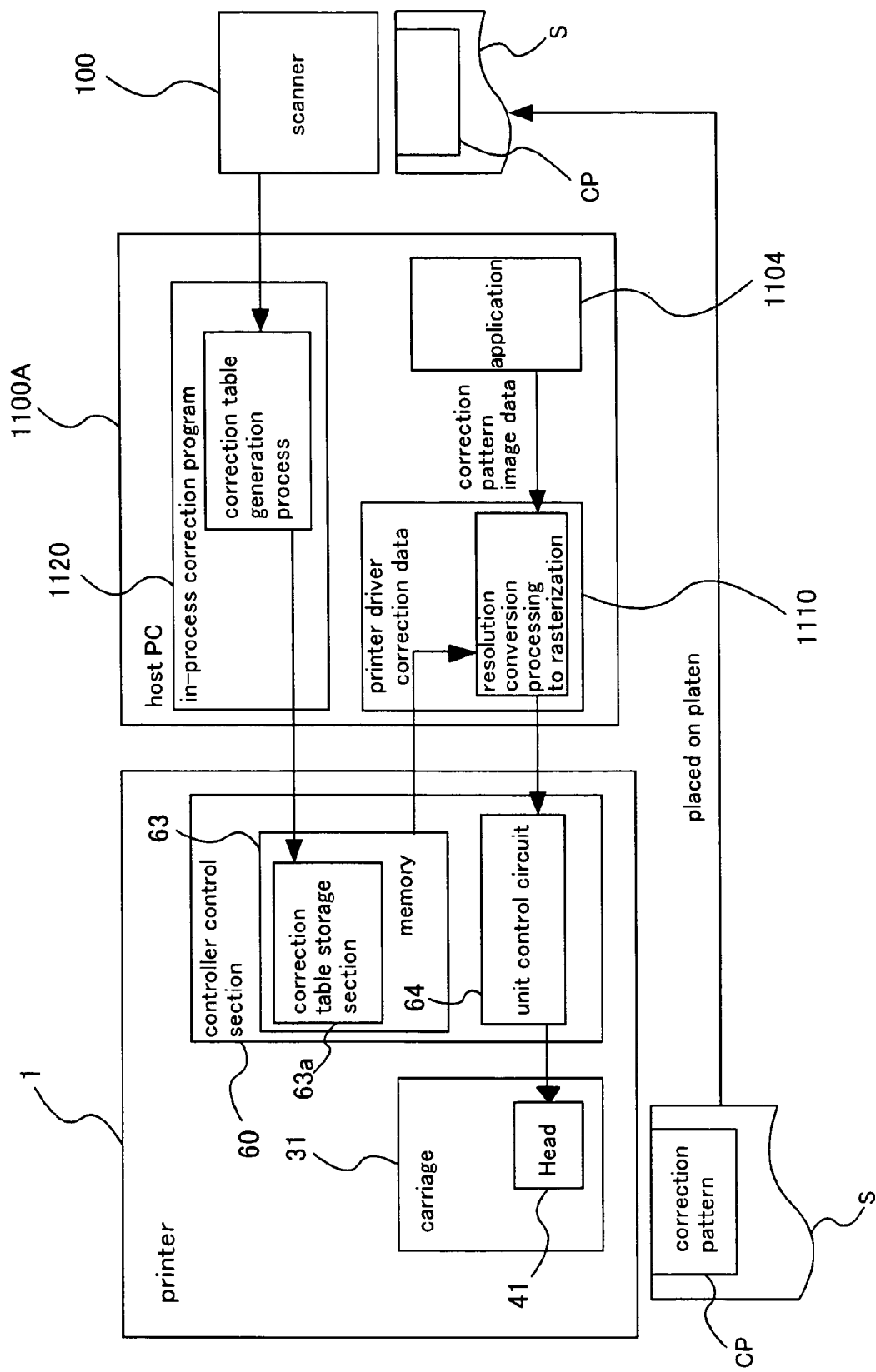
FIG. 12 is a block diagram describing equipment used for setting a correction table.

FIG. 12 is a block diagram illustrating equipment used in setting the correction table. It should be noted that structural elements that have already been described are assigned identical reference numerals and thus further description thereof is omitted. In FIG. 12, a computer 1100A is a computer that is disposed on an inspection line, and runs an in-process correction program. This in-process correction program can perform a correction table generation process. With this correction table generation process, a correction table for a target dot row region is generated based on a data group (for example, 256 tone grayscale data of a predetermined resolution) obtained by a scanner device 100 reading a correction pattern that has been printed on a paper S. It should be noted that the correction table generation process is described in greater detail later. Also, an application run by the computer 1100A outputs to the printer 1 print data for printing a correction pattern CP in designated gradation values.

FIG. 13 is a conceptual diagram of a recording table that is provided in the memory of the computer 1100A. A recording table is prepared for each ink color. The measured values of the correction pattern CP printed in each color are recorded in the corresponding recording table. Since darkness correction is carried out for only black, cyan, and magenta in the first embodiment, the recording table is provided for three colors only, which correspond to the three colors black, cyan, and magenta.

Associated and recorded in this recording table are measured gradation values C, as measured values, obtained by measuring a plurality of correction patterns CP (described later) that have been printed according to a plurality of gradation values (hereafter "specified gradation values") that indicate a plurality of mutually different levels of darkness for example, and the specified gradation values S of each of the correction patterns. In the first embodiment, eight correction patterns are printed based on eight specified gradation values for each color and the darkness of each correction pattern is measured.

Each recording table is provided with two fields for each level of darkness. That is, in the recording tables, eight sets of measurement information are stored in which a measured gradation value and a specified gradation value S are associated for each dot row region. Specifically, in the field furthest to the left in this drawing and in the ninth field from the left are recorded measurement information based on correction patterns that have been printed based on the lowest specified gradation value, of the eight categories of specified gradation values. That is, a measured gradation value Ca of a correction pattern CPa is recorded in the field furthest to the left, and a specified gradation value Sa of the correction pattern CPa is recorded in the ninth field from the left. Furthermore, a measured gradation value Cb of a correction pattern CPb of the second lowest specified gradation value of the eight categories of specified gradation values and a specified gradation value Sb of the correction pattern CPb are respectively stored in the second field from the left and the tenth field from the left. In this way, measured gradation values C and specified gradation values S corresponding to progressive degrees of darkness are stored in the fields, such that a measured gradation value Ch of a correction pattern CPh of the highest specified gradation value of the eight categories of specified gradation values is stored in the eighth field from the left and a specified gradation value Sh of the correction pattern CPh of the highest specified gradation value of the eight categories of specified gradation values is stored in the field furthest to the right.

Each record is given a record number, and the number of records provided is equivalent to the assumed number of dot row regions according to the carrying direction length of the printable region on the paper. Furthermore, the measured gradation values Ca, Cb, . . . , and Ch, and the specified gradation values Sa, Sb, . . . , and Sh that correspond to the same dot row region in each of the correction patterns CPa, CPb, . . . , CPh of the respective specified gradation values, are recorded in a record with the same record number.

Figure 14:
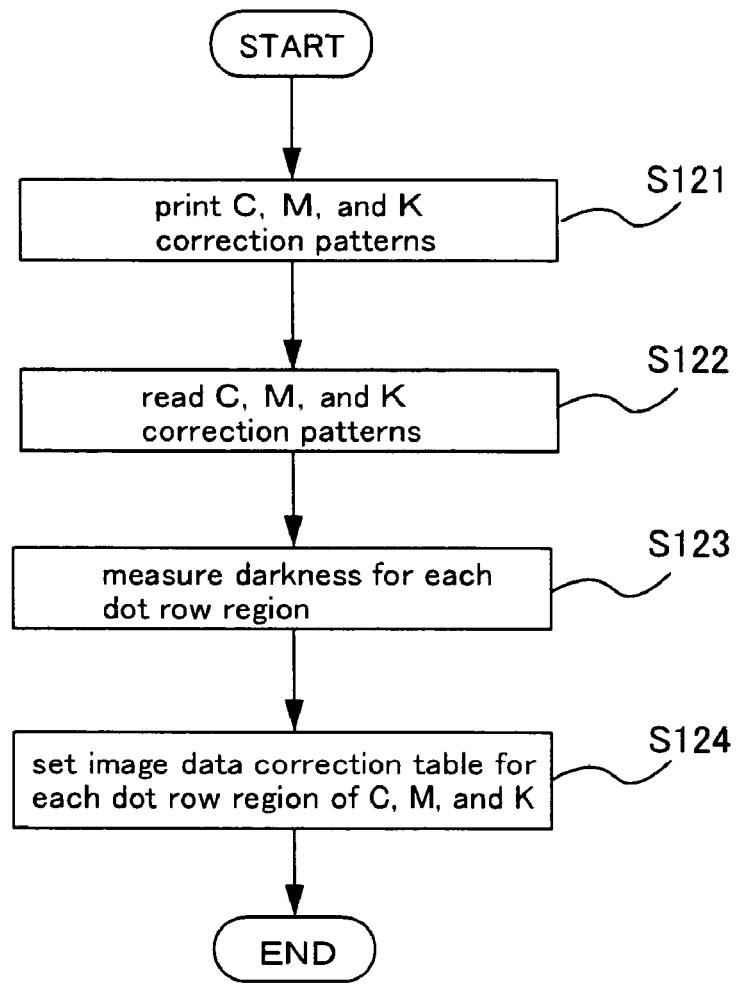
FIG. 14 is a flowchart showing the procedure of step S120 in FIG. 11.

FIG. 14 is a flowchart showing the procedure of Step S120 in FIG. 11. The procedure for setting the correction tables is described below using this flowchart.

This setting procedure includes a step of printing a correction pattern CP (S121), a step of reading the correction pattern CP (S122), a step of measuring the pixel darkness of each dot row region (S123), and a step of setting a correction table based on the measured values of darkness for each dot row region (S124). These steps are described in detail below. In the first embodiment, the specified gradation values for printing the correction patterns are set using eight categories of gradation values, for example 10%, 20%, 30%, 40%, 50%, 60%, 70%, and 80%. Furthermore, the printable range of darkness is from zero darkness to 100% darkness, with the gradation value corresponding to zero darkness being the lowest value "0" and the gradation value corresponding to 100% darkness being the highest value "255."

(1) Regarding Printing of the Correction Pattern CP (S121)

First, in Step S121, a correction pattern CP for each ink color subject to correction is printed on the paper S. Here, a worker responsible for inspection communicably connects the printer 1 to a computer 1100A that is set up on the inspection line and prints correction patterns CP for the three colors cyan, magenta, and black using the printer 1. In other words, the worker performs an operation using a user interface of the computer 1100A to print correction patterns CP. Due to this operation, the computer 1100A reads the print data of the correction pattern CP that is stored in the memory and outputs the print data to the printer 1. The printer 1 prints the correction patterns CP on the paper S based on the print data. It should be noted that the printer 1 that prints the correction pattern CP is the printer 1 for which correction tables are to be set. In other words, correction tables are set for each printer 1.

Figure 15:
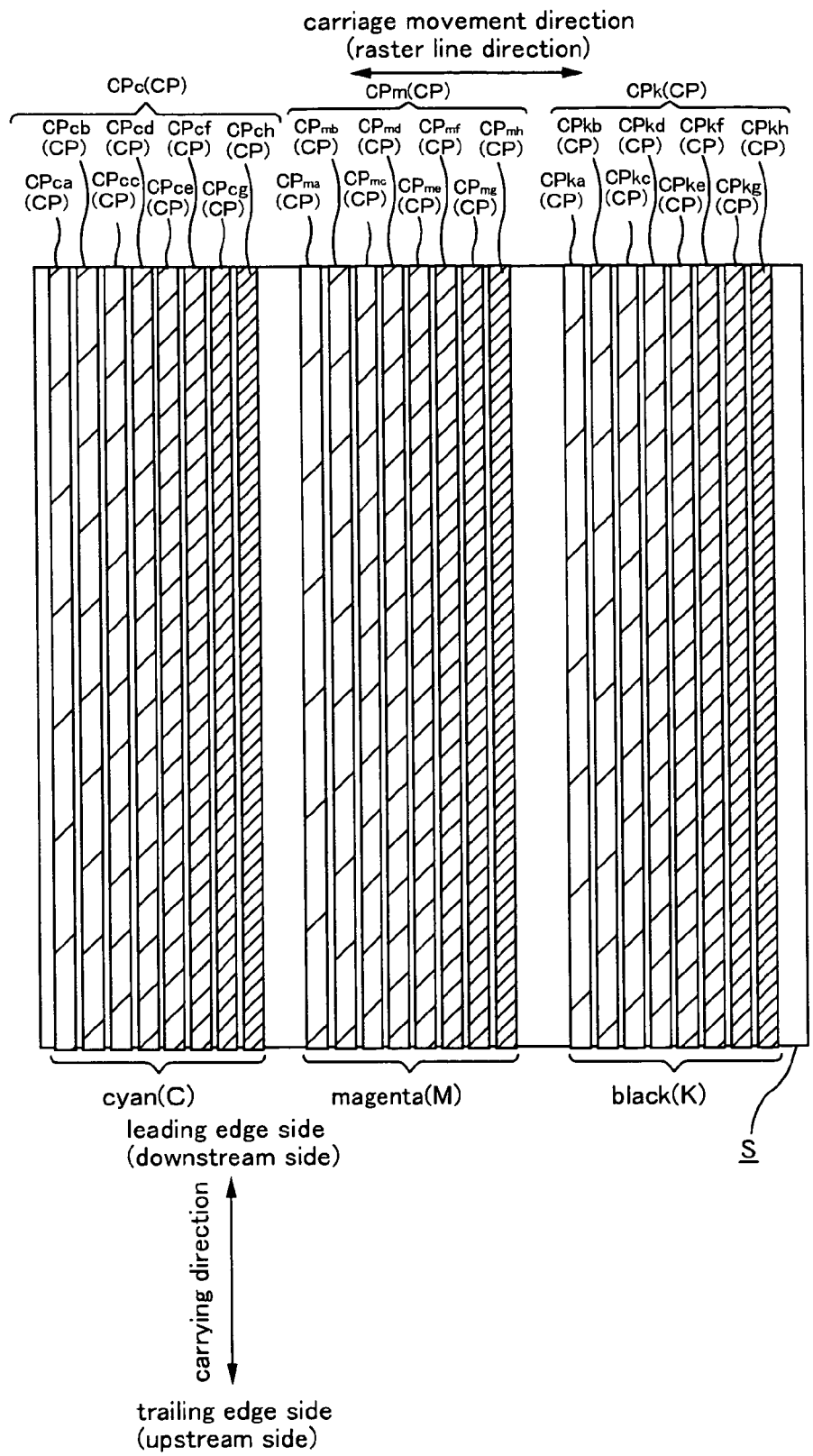
FIG. 15 is a diagram describing an example of a correction pattern CP that is printed.

FIG. 15 is a diagram illustrating an example of the correction pattern CP that is printed. As shown in the drawing, the correction pattern CP of the first embodiment is printed in divisions for each darkness for each of the ink colors cyan, magenta, and black. In this example, correction patterns CP are respectively printed for each of the colors cyan, magenta, and black based on the eight categories of specified gradation values. In other words, the eight categories of darkness, being 10%, 20%, 30%, . . . , and 80%, are printed based on the specified gradation values that correspond to the levels of darkness. The print data of each of the correction patterns CP assumes image data for each of cyan, magenta, and black in which a specified gradation value corresponding to each of the eight categories of darkness is allotted to all pixels, and is created when the assumed image data has undergone halftone processing and rasterization by the printer driver. For this reason, the print data of the correction patterns CP stored in the memory is set such that, when the band-shaped correction patterns CP are printed with an ideal printing apparatus based on each of the gradation values that indicates the respective levels of darkness, the respective patterns have uniform darkness. That is, with an ideal printing apparatus, the correction patterns CP are respectively printed at substantially the same darkness over the entire region in the carrying direction. Here, "ideal printing apparatus" refers to a printing apparatus that is machined and manufactured as designed and in which dots are formed at the target positions by ink droplets ejected from the nozzles.

Fundamentally, only the ink color is different between the correction pattern groups made of the respective eight correction patterns CP of cyan, magenta, and black. For this reason, hereinafter the correction pattern group constituted by the eight black (K) correction patterns CPk is described as a representative correction pattern group. Also, as mentioned above, darkness non-uniformities in multicolor printing are inhibited for each ink color that is used in that multicolor printing, but the method that is used for inhibiting the darkness non-uniformities is the same. For this reason, in the following description, black (K) is used as a representative color, and there are places where the description refers only to the color black (K), but the same also applies for the other ink colors C and M as well.

The black (K) correction patterns CPk are printed in long band shapes in the carrying direction for each of the eight categories of darkness based on the above-mentioned eight categories of specified gradation values. Also, in the example shown in FIG. 15, the print region in the carrying direction extends over the entire region in the carrying direction of the paper S. In other words, each of the patterns is formed continuously from the upper edge to the lower edge of the paper S. Furthermore, the correction patterns CPk are printed on one sheet of paper in a state in which eight bands of different darknesses are lined up along the carriage movement direction.

In accordance with printing methods such as interlaced mode and band feed mode, the correction patterns CPk are printed using paper carry amounts and nozzle ink ejection timings that correspond to these respective printing methods. Since the raster lines of the images printed using interlaced mode and band feed mode and the nozzles that form each of the raster lines are different depending on the print mode, it is preferable that correction patterns for inhibiting darkness non-uniformities in each dot row region, in which a raster line is to be printed, are printed with the paper carry amount and nozzle ink ejection timing that will be used in practice in actual printing, that is, for each of the actual printing modes and print processing modes. For example, if this is band feed mode, then the correction patterns are printed using a print processing mode in which the paper is carried by an amount equal to the nozzle row length and raster lines are formed at the same pitch as the nozzle pitch. If this is interlaced mode, then the correction patterns are printed such that the leading edge and trailing edge areas of the paper are printed using a process mode in which the paper is carried by only very small amounts and printing is performed using only a few specified nozzles, and areas other than the leading edge and the trailing edge areas use a print processing mode in which raster lines are formed by carrying the paper by constant amounts and using as many nozzles as possible. Furthermore, in the case of so-called borderless printing in which printing is carried out with no margins on the paper, then the correction patterns are printed such that the leading edge and trailing edge areas of the paper are printed using only the nozzles that are in opposition to a groove 24*a* (see FIG. 4) provided in the platen 24, and areas other than the leading edge and the trailing edge areas use a print processing mode in which raster lines are formed by carrying the paper by constant amounts and using as many nozzles as possible. That is to say, when the print mode is a print mode in which printing is carried out such that margins are created at the leading and trailing edges of the paper, the correction patterns are not printed spanning the entire carrying direction of the paper, and margins are formed at the leading and trailing edges.

Darkness correction carried out in this way based on correction tables obtained using correction patterns that have been printed using the same paper carry amounts and nozzle ink ejection timings as the actual printing is suitable for each print mode and each print processing mode, and therefore improves the accuracy of darkness correction and very reliably inhibits darkness non-uniformities.

In the first embodiment, an example was described using correction patterns that were printed based on eight categories of gradation values for each color, but the categories of color gradation values are not limited to eight categories. However, while increasing the number of categories of correction pattern gradation values enables more exact darkness correction, it increases the time spent in processes such as the process of printing the correction patterns, the process of setting correction tables by reading the correction patterns, and the process of carrying out correction, but on the other hand, reducing the number of categories of gradation values poses the possibility of not being able to perform exact correction.

Moreover, since this increases the number of correction patterns to be printed, it can be expected that all the correction patterns may sometimes not be able to be printed on one sheet of paper, thus posing the possibility of increasing the time for printing the correction patterns and the reading time. That is, by printing correction patterns for all the gradation values of all the ink colors targeted for correction on a single sheet of paper as shown in FIG. 15, it is possible to reduce the amount of consumables such as paper that are used and also possible to shorten the processing time for printing, the time spent in reading the correction patterns, which will be described later, and the time required for obtaining correction data.

For this reason, when there are many colors targeted for correction and many levels of gradation values, it is preferable that all the required correction patterns are laid out on a single sheet of paper by, for example, narrowing the width of the correction patterns in the movement direction of the carriage 31. Of course, when there are few colors targeted for correction and few levels of gradation values, there is no need to widen the width of the correction patterns in the movement direction of the carriage 31 as long as a width by which darkness measurements can be performed is maintained for the process of reading the correction patterns, which will be described later.

(2) Reading of the Correction Patterns CP (Step S122)

The darkness of the correction patterns CPka, CPkb, . . . , and CPkh shown in FIG. 15 is measured for each dot row region by a darkness measurement device that optically measures this darkness. This darkness measurement device is capable of measuring the average darkness of a predetermined number of pixels in the carriage movement direction, that is, the direction along the dot row regions, for each dot row region individually, and an example of such a device is a scanner as known in the art. It should be noted that the reason why the darkness of the dot row regions is evaluated by the average darkness of a predetermined number of pixels is because even if printing is carried out based on image data in which the gradation values of the pixels are equalized, the size of the dots (including non-formed dots) that are formed in the pixels will differ from pixel to pixel due to the halftone processing; that is, one pixel will not necessarily be representative of the darkness of an entire dot row region.

Figure 16A:
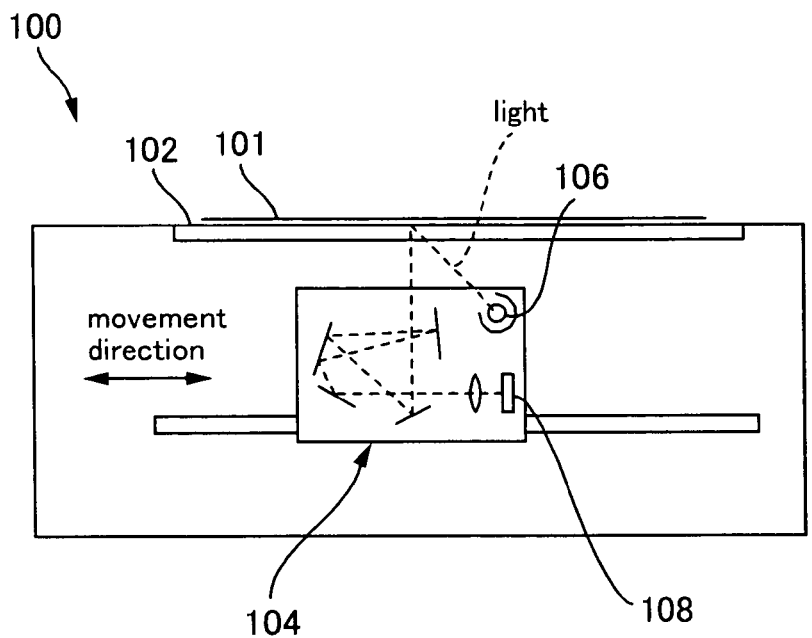
FIG. 16A is a vertical cross-section of a scanner device.
Figure 16B:
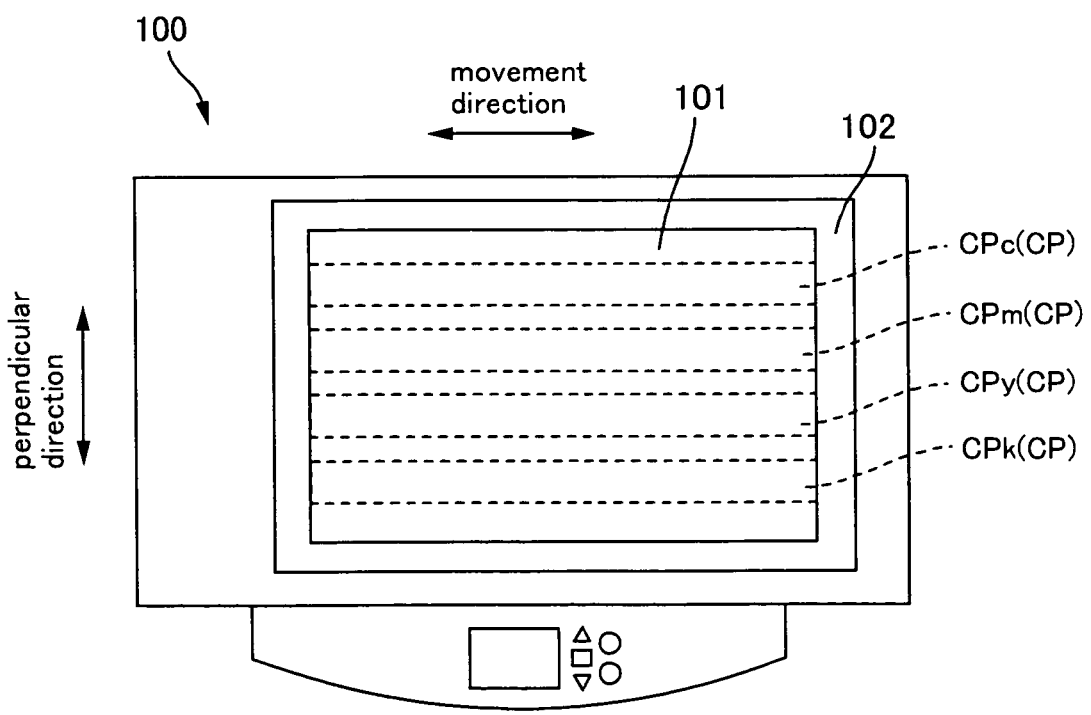
FIG. 16B is a plan view of that scanner device.

FIG. 16A and FIG. 16B show, respectively, a cross-sectional view and a top view of the scanner. The scanner 100 includes a platen glass 102 on which a document 101 is placed, and a reading carriage 104 that faces the document 101 via this platen glass 102 and that moves in a predetermined reading movement direction. The reading carriage 104 is provided with an exposure lamp 106 that irradiates light onto the document 101 and a linear sensor 108 for receiving the light that is reflected by the document 101 over a predetermined range in a direction that is perpendicular to the reading movement direction. An image is read from the document 101 at a predetermined read resolution, while moving the reading carriage 104 in the reading movement direction. It should be noted that the dashed line in FIG. 16A indicates the path of the light.

As shown in FIG. 16B, the paper serving as the document 101, on which the correction patterns CP have been printed, is placed on the platen glass 102, such that the direction of the dot row regions is aligned with the perpendicular direction. Thus, the average darkness of a predetermined number of pixels in the dot row region direction can be read for each dot row region individually. It is preferable that the reading resolution in the reading movement direction of the reading carriage 104 is several integer multiples finer than the pitch of the dot row regions so that it is easier to correlate, with each of the dot row regions, the measured gradation values of the darknesses that have been read in.

Figure 17:
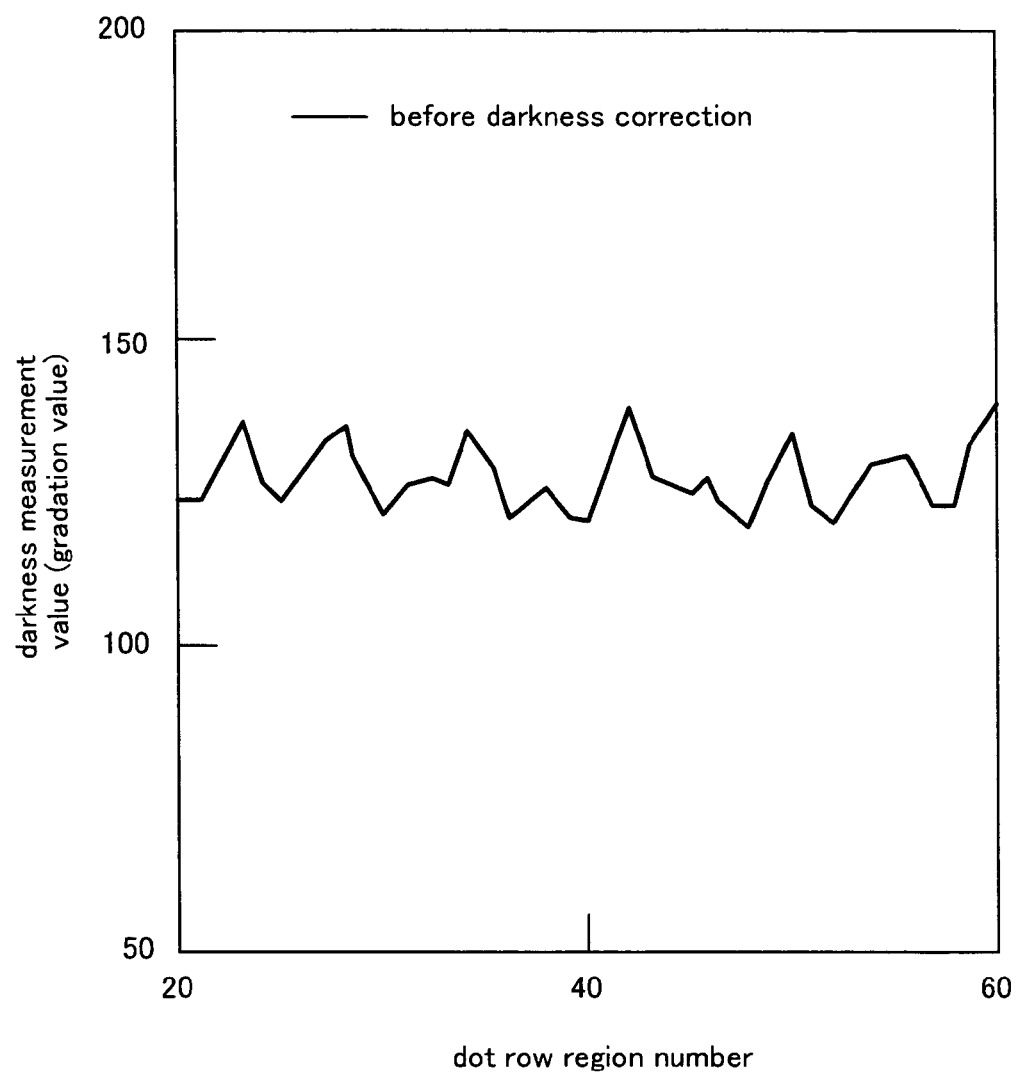
FIG. 17 is a diagram illustrating an example of measured values of the darkness of a correction pattern CPk.

FIG. 17 shows an example of the measured gradation values of the darknesses of the correction pattern CPk. The horizontal axis of FIG. 17 denotes the dot row region number and the vertical axis denotes the measured gradation value of darkness. Here, "dot row region number" refers to the numbers given starting from leading edge side of the paper to each dot row region virtually defined on the paper.

Even though printing was performed according to image data indicating gradation values of the same darkness across all dot row regions constituting the correction pattern CPk, the measured gradation values shown in FIG. 17 vary greatly for each dot row region. These are the darkness non-uniformities caused by the above-noted variations in the ink ejection direction and so forth. That is, since the measured values are values measured for each dot row region, when spacing between neighboring raster lines is narrow, a portion of an adjacent raster line is read within the dot region, and therefore the darkness is measured as a higher value, whereas when this spacing is wide, a portion of the raster line that should have been read is left out of that particular dot row region, and therefore the darkness is measured as a lower value.

Now, the scanner 100 is communicably connected to the printer 1. Moreover, the measured values of the darkness of the correction pattern read with the scanner 100 are recorded in a recording table arranged in the memory of the computer 1100, in association with the dot row region numbers. It should be noted that the darkness measured gradation values output from the scanner 100 are grayscale values (that is, data not representing color information but only brightness) represented by 256 gradation values. Here, the reason for using this grayscale is that if the measured gradation values include color information, then a further process for expressing the measured gradation values using only gradation values of that ink color must be performed, so that the processing becomes more complicated.

The darkness of the correction patterns CPka, CPkb, . . . , and CPkh printed according to the eight categories of gradation values is measured by the scanner device 100 for each dot row region, and measured gradation values Ca, Cb, . . . , Ch are recorded in the recording table shown in FIG. 13.

(3) Step 123: Setting the Correction Table for Each Dot Row Region

When carrying out darkness correction to inhibit darkness non-uniformities in the carrying direction, it is also conceivable to correct all image data based on one set of correction information, for example, one set of correction information in which gradation values indicating image data to be printed and the new, corrected gradation values are paired. In the first embodiment, darkness non-uniformity is inhibited very appropriately and efficiently by carrying out correction according to a plurality of sets of correction information corresponding to different levels of darkness. To do this, a plurality of sets of correction information are obtained, and image data correction tables are set up using the plurality of sets of corrections information that have been obtained.

<Setting Up an Image Data Correction Table>

Figure 18:
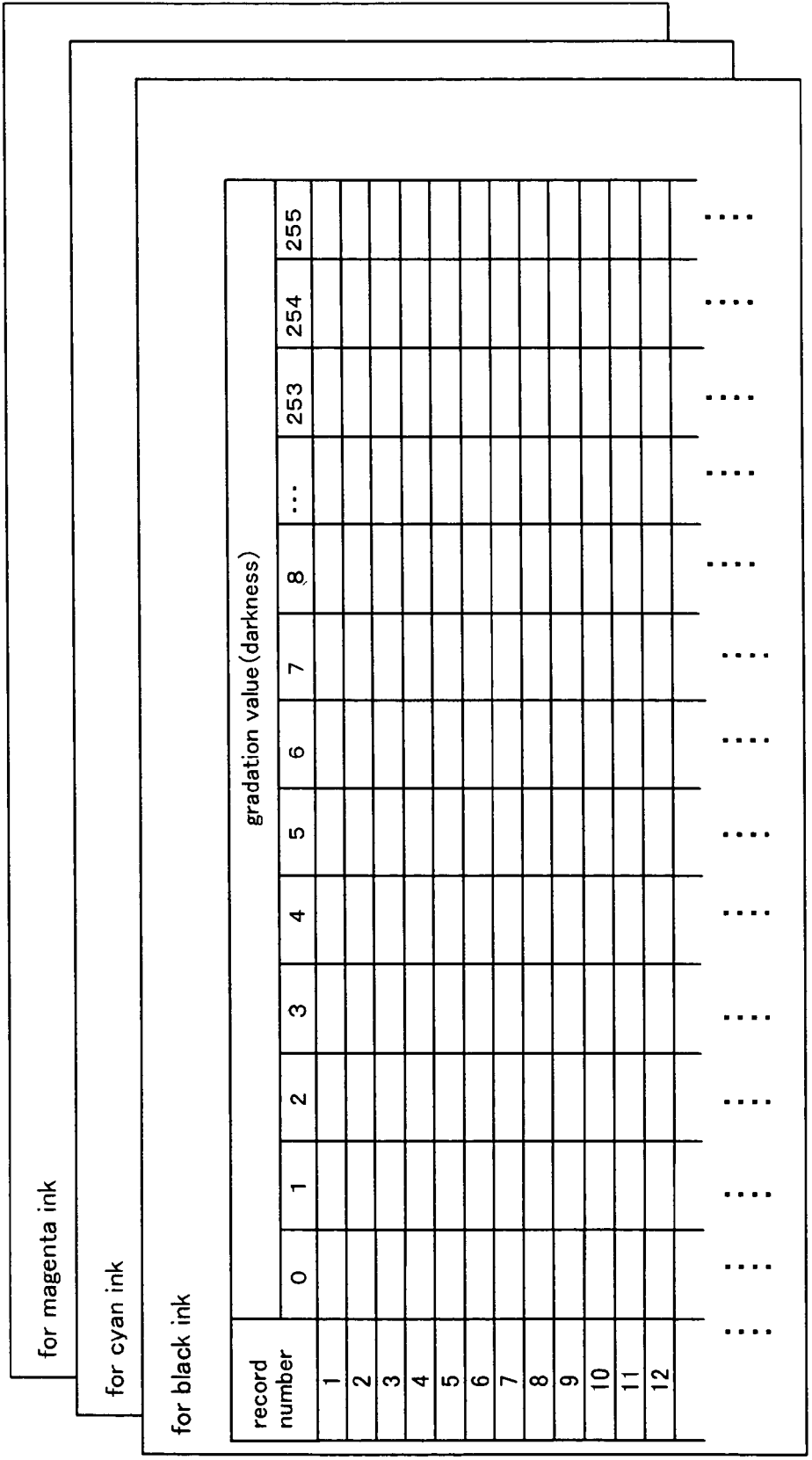
FIG. 18 is a conceptual diagram of image data correction tables stored in a correction table storage section provided in a memory of the printer.

FIG. 18 is a conceptual diagram of image data correction tables stored in the correction table storage section 63a provided in the memory 63 of the printer 1.

The image data correction tables shown in FIG. 18 are stored in the correction table storage section 63a when image data is to be corrected. The image data correction tables are prepared respectively for each ink color to be corrected and have records for recording the new gradation values after correction. Each record is assigned a record number, and a new gradation value after correction that is calculated based on the measured value or the like is recorded in the record having the same record number as the record for that measured value. The number of records provided is also equivalent to the number of dot row regions corresponding to the carrying direction length of the printable region on the paper.

First, plurality of sets of correction information are obtained using eight pairs of measurement information (Sa, Ca), (Sb, Cb), . . . , and (Sh, Ch), which are recorded in the records of the recording tables according to the above-described method and in which the specified gradation values Sa, Sb, . . . , and Sh are paired with the measured gradation values Ca, Cb, . . . , and Ch. When setting the image data correction tables, information in which a gradation value indicating a predetermined level of darkness and a new gradation value after that level of darkness has been corrected are paired for each dot row region (record), becomes the correction information.

The correction information corresponding to each gradation value is determined as follows. First, certain correction information is obtained using three sets of measurement information of the eight sets of measurement information. For example, a total of four sets of correction information are obtained in the same way. Then, new corrected gradation values are calculated for the other gradation values through linear interpolation using two sets of information selected from among the four obtained sets of correction information, the highest gradation value, and the lowest gradation value.

The new corrected gradation values that have been calculated and the gradation values indicating the levels of darkness are associated and are recorded as correction information in fields corresponding to the predetermined levels of darkness in the image data correction tables. For example, in obtaining correction information corresponding to 30% darkness, linear interpolation is performed using three sets of measurement information by measuring the darknesses of a correction pattern of 10% darkness, a correction pattern of 30% darkness, and a correction pattern of 50% darkness. Furthermore, in obtaining correction information corresponding to 50% darkness, linear interpolation is performed using three sets of measurement information by measuring the darknesses of a correction pattern of 30% darkness, a correction pattern of 50% darkness, and a correction pattern of 70% darkness. That is, corrected new gradation values are calculated using three sets of measurement information obtained from the correction patterns of the darkness for which the new gradation value is to be determined and darknesses of ±20% darkness therefrom, for example.

Figure 19:
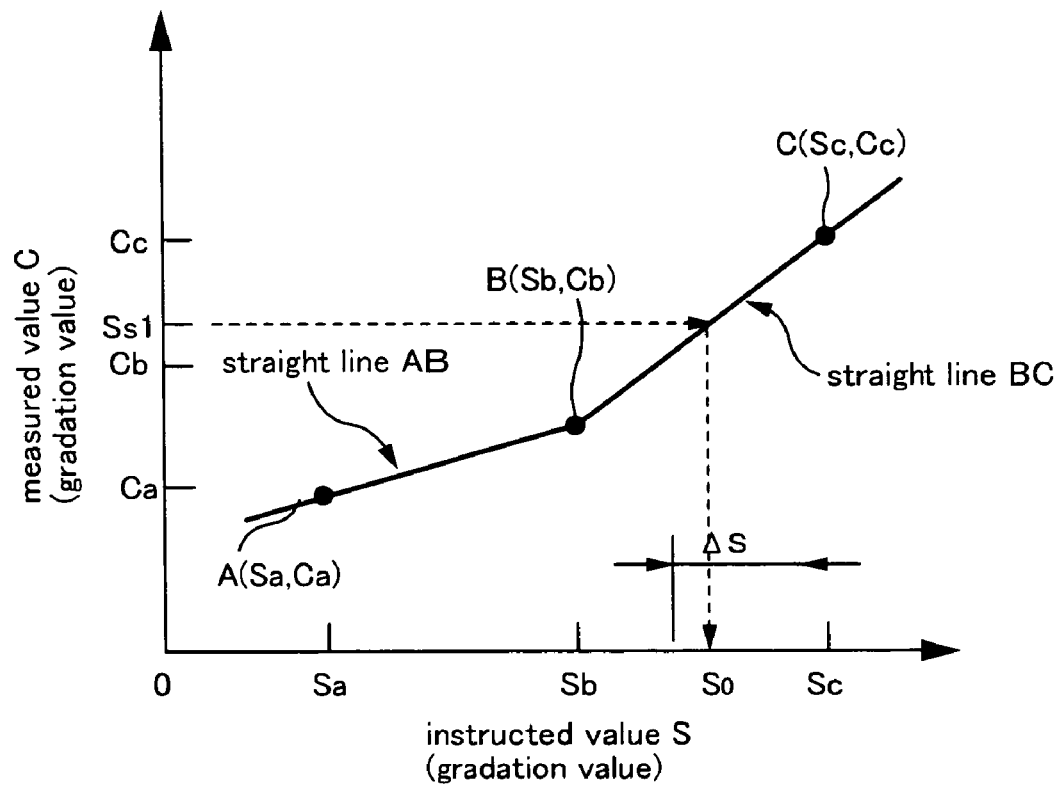
FIG. 19 is a graph for describing linear interpolation, which is performed using three pairs of correction information.

FIG. 19 is a graph for describing linear interpolation, which is performed using the three sets of correction information. It should be noted that the horizontal axis of the graph is the gradation value (hereafter, "data gradation value") S of black (K) indicated in the image data, and the vertical axis is the gradation value (hereafter, "measured gradation value") of the grayscale serving as the measured value C. The coordinates of the points on the graph are indicated by (S, C).

As is well known, linear interpolation is a technique of determining a function value between or outside two known amounts assuming that the three plotted points are on a straight line. In the first embodiment, the known amounts are the three pairs of measurement information (Sa, Ca), (Sb, Cb), and (Sc, Cc), and the function value that is determined is the data gradation value S at which the measured gradation value C takes on the target value Ss1. It should be noted that in the first embodiment, the target value Ss1 is a gradation value that indicates the darkness of an image to be printed based on a predetermined gradation value, and is a measured gradation value of a color sample (darkness sample) that has the same darkness as an image having a darkness of the predetermined gradation value that should have been printed. Here, it is a measured gradation value in grayscale that is output when the scanner device 100 reads a color sample (darkness sample) of the same darkness as the darkness that would have been expressed by a gradation value of the measurement information that is in the middle of the three sets of measurement information. This color sample indicates an absolute darkness reference; that is, if the measured gradation value C according to the scanner device 100 indicates a target value Ss1, then the measurement target thereof can be seen to be indicated by the middle value Sb of the darkness. That is, the darkness to be printed for the darkness of the target value Ss1 corresponds to the target darkness. The target darkness is not necessarily the darkness of the color sample, and may be an average value of measured values measured for each dot row region for example. When using a color sample, not only is it possible merely to inhibit darkness non-uniformities, but it is also possible to correct the darkness of an image to be printed using the darkness of the color sample as a reference. Furthermore, when using an average value of the measured values, it is possible to obtain correction information more quickly and inhibit darkness non-uniformities without the effort of measuring a color sample.

As shown in FIG. 19, the three sets of measurement information (Sa, Ca), (Sb, Cb), and (Sc, Cc) of the eight sets of measurement information for example are each expressed on the graph by point A having the coordinates (Sa, Ca), point B at (Sb, Cb), and point C at (Sc, Cc). A straight line BC that joins the two points B and C expresses the relationship between change in data gradation values S and change in measured values C in a range of high darkness; a straight line AB that joins the two points A and B expresses the relationship between change in data gradation values S and change in measured values C in a range of low darkness.

Then, a value So of the data gradation value S at which the measured gradation value C becomes the target value Ss1 is read from the graph made of these two lines AB and BC, and is set as a corrected new gradation value So of the darkness of the measurement information for the value Sb which is in the middle of the three sets of measurement information. For example, as shown in the drawing, when the target value Ss1 is larger than the measured value Cb of the point B, then linear interpolation is carried out using the straight line BC, and the corrected new gradation value So, which corresponds to the data gradation value S at which the measured value C takes the target value Ss1, is set. Conversely, when the target value Ss1 is smaller than the measured gradation value Cb of the point B, then linear interpolation is carried out using the straight line AB, and the corrected new gradation value So, which corresponds to the data gradation value S at which the measured value C takes the target value Ss1, is set.

In this way, correction information corresponding to 30% is obtained from, for example, the correction patterns of 10% darkness, 30% darkness, and 50% darkness, correction information corresponding to 40% is obtained from the correction patterns of 20% darkness, 40% darkness, and 60% darkness, correction information corresponding to 50% is obtained from the correction patterns of 30% darkness, 50% darkness, and 70% darkness, and correction information corresponding to 60% is obtained from the correction patterns of 40% darkness, 60% darkness, and 80% darkness.

Figure 20:
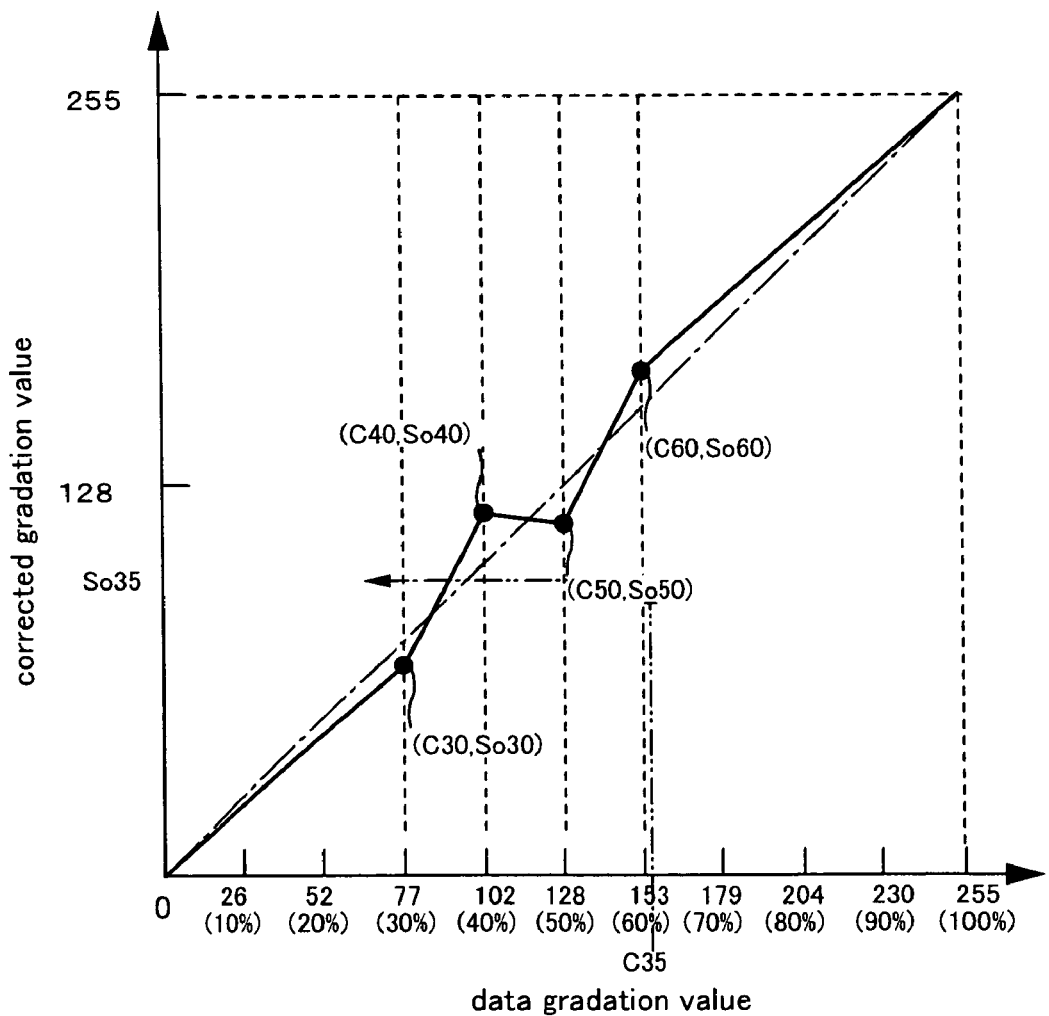
FIG. 20 is a graph for describing the image data correction tables in which data gradation values given in supplied image data and corrected gradation values are correlated.

FIG. 20 is a graph for describing the image data correction tables in which data gradation values given in supplied image data and corrected new gradation values are associated.

In the graph of FIG. 20, the horizontal axis is the data gradation values S of black (K) indicated in the image data, and the vertical axis is the corrected new gradation values. The corrected new gradation values that are obtained are plotted as data according to a data gradation value (77 for example) corresponding to 30% darkness, a data gradation value (102 for example) corresponding to 40% darkness, a data gradation value (128 for example) corresponding to 50% darkness, and a data gradation value (153 for example) corresponding to 60% darkness, and the sets of correction information are connected by straight lines. In this way, when two sets of correction information are connected by a straight line, one of the connected sets of correction information becomes a first correction information and the other becomes a second correction information. At this time, in the region connected by a straight line between the gradation value So "0" corresponding to zero darkness, which matches the gradation value "0" corresponding to the lowest level of darkness expressible in the printed image, i.e., zero darkness, and the set of correction information corresponding to 30% darkness, the correction information corresponding to 30% darkness is the first correction information, and the gradation value "0" corresponding to zero darkness and the gradation value So "0" corresponding to zero darkness are the second correction information. Furthermore, in the region connected by a straight line between the gradation value So "255" corresponding to 100% darkness, which matches the gradation value "255" corresponding to the highest darkness, i.e., 100% darkness, and the correction information corresponding to 60% darkness, the correction information corresponding to 60% darkness is the first correction information, and the gradation value "255" corresponding to 100% darkness and the gradation value So "255" corresponding to 100% darkness are the second correction information.

The image data correction tables are set according to this graph. In the case of the first embodiment, the corrected new gradation values that are obtained are recorded in the fields corresponding to zero, 30%, 40%, 50%, and 60% darkness. Then, as for the corrected new gradation value for, for example, a level of darkness between 30% darkness and 40% darkness, that is, for a level of darkness excluding 30% darkness and 40% darkness, a new gradation value for allowing printing of all of the dot row regions at the same darkness is obtained by performing linear interpolation between the first set of correction information (C30, So30), which is associated with 30% darkness, and the second set of correction information (C40, So40), which is associated with 40% darkness, taking a gradation value indicating 30% darkness as the first gradation value and a gradation value indicating 40% darkness as the second gradation value, and this value is recorded in a corresponding field of the image data correction table.

For example, when a gradation value C35 indicating 35% darkness is given as image data, this is converted to So35 as a corrected new gradation value based on the graph in FIG. 20. The way of determining corrected new gradation values corresponding to each of the data gradation values is expressed in the following formula.

The straight line that connects the first set of correction information associated with 30% darkness and the second set of correction information associated with 40% darkness can be expressed by formula 1 shown below.

$$Sox=[(So30-So40)/(C30-C40)] \cdot (Cx-C30)+So30 \quad \text{Formula 1}$$

Then, when C35 is substituted into the arbitrary data gradation value Cx in formula 1, the corrected new gradation value Sox is obtained for image data of 35% darkness.

A program for executing the computations by which the corrected new gradation values are determined is stored in a memory provided in the computer 1100A on the inspection line.

The corrected new gradation values for each level of darkness obtained by calculation are stored in corresponding fields of the image data correction tables shown in FIG. 18 (S124b). In other words, first the computer 1100A reads the three sets of measurement information (Sa, Ca), (Sb, Cb), and (Sc, Cc) from the same record of the recording table and obtains four sets of correction information. Next, two sets of correction information selected from among the four obtained sets of correction information, correction information of the lowest level of darkness, and correction information of the highest level of darkness are substituted into Formula 1 to calculate a corrected new gradation value between these two levels of darkness corresponding to the two sets of correction information. The corrected new gradation value that has been calculated is recorded in a record of the same record number in the image data correction table.

Then, when actual printing is carried out (S140), image data supplied from the application is converted to print data (S140a). That is, the supplied image data first undergoes resolution conversion and color conversion. After this, at the time of halftoning, the pixel data of the CMYK image data is made to undergo dithering etc., and the C, M, and K sets of image data are converted into corrected new gradation values based on the image data correction tables. The CMYK image data that has been converted then undergoes rasterization and is converted to print data. Then, the printer performs printing based on the converted print data (S140b). In this way, by converting the image data to perform printing, it is possible to print excellent images in which darkness non-uniformities in the carrying direction of the paper are inhibited.

With the above-described printer, darkness correction for the dot row regions is performed for only cyan, magenta, and black, and therefore correction is not performed for all the colors with which the printer is capable of printing. For this reason, it is possible to perform darkness correction in a reduced time compared to when performing correction for all the colors, and therefore throughput is increased.

In particular, cyan, magenta, and black have a high level of darkness and comparatively, non-uniformities in darkness are easily visible, and therefore it is possible to effectively inhibit darkness non-uniformities by performing correction for cyan, magenta, and black. Furthermore, cyan, magenta, and black are ink colors that correspond to nozzle rows, and therefore correction can be performed easily by correcting the image data supplied to the nozzle rows corresponding to those colors.

Moreover, since the steps for tasks involved in the processes of obtaining and generating the data used in correction are reduced, and the time spent on these processes is shortened, it is also possible to increase productivity and reduce manufacturing costs. Furthermore, since correction is carried out with respect to cyan, magenta, and black, it is possible to inhibit darkness non-uniformities between dot row regions compared to when correction is not performed.

Further still, since correction is carried out for cyan, magenta, and black based on the results of reading actually printed correction patterns printed for each gradation of a plurality of gradations, it is possible to obtain appropriate information corresponding to the actual machine, and more appropriate correction can be carried out based on the appropriate information that is obtained.

Also, although darkness non-uniformities that occurs between dot row regions originates in the printed dot rows, the conditions of the occurrences in dot rows vary depending on factors such as differences in the print mode and the ejection sections that are used, and different positions on the medium of the dot rows that are formed. In view of this, as in the above-described printing apparatus, band-shaped correction patterns are printed on the paper in the carrying direction for each gradation of the colors cyan, magenta, and black targeted for correction, and by carrying out correction based on the results of reading the printed correction patterns, it is possible to carry out appropriate correction corresponding to the print mode by which printing is actually carried out, the ejection section that actually forms the dots, and the different positions on the paper. Moreover, since the correction patterns are printed lined up along the movement direction of the carriage, it is possible to print, on a single sheet of paper, many band-shaped correction patterns in the carrying direction, which are preferable correction patterns for correcting darkness non-uniformities in the carrying direction.

===(1) Other Embodiments===

The above first embodiment was explained primarily with regard to a printer 1, but the above embodiment of course also includes the disclosure of a printing apparatus, a printing method, and a printing system, for example.

A printer 1, for example, was described as one embodiment, but the foregoing embodiment is for the purpose of elucidating the present invention and is not to be interpreted as limiting the present invention. The invention can of course be altered and improved without departing from the gist thereof and includes equivalents. In particular, the embodiments mentioned below are also included in the invention.

Furthermore, in the first embodiment, a printer and a printing method were described for correcting darkness non-uniformities occurring in the carrying direction of the paper; however, the above-described correction method is also applicable to vertical stripe-shaped darkness. non-uniformities that occur parallel to the carrying direction, which originate, for example, in mechanisms that constitute the printer 1 such as the vibrations that accompany movement of the carriage in which the head is mounted.

<Regarding the Printer>

In the above first embodiment a printer 1 was described; however, there is no limitation to this. For example, technology like that of the first embodiment can also be adopted for various types of recording apparatuses that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices. Also, methods therefor and manufacturing methods thereof are within the scope of application.

<Regarding the Ink>

The above first embodiment was of the printer 1, and thus a dye ink or a pigment ink was ejected from the nozzles. However, the ink that is ejected from the nozzles is not limited to such inks.

<Regarding the Nozzles>

In the foregoing first embodiment, ink was ejected using piezoelectric elements. However, the mode for ejecting ink is not limited to this. Other methods, such as a method for generating bubbles in the nozzles through heat, may also be employed.

<Regarding the Target of Darkness Correction>

In the above-described first embodiment, dark-colored inks, namely black, cyan, and magenta, were targeted for correction, but there is not limitation to these colors. For example, when inks such as red, purple, and green are ejectable, and the darkness non-uniformities of areas printed with these colors are easily visible, then red, purple, and green or the like may also be subjected to correction. That is, it is sufficient to select from the ejectable ink colors those colors in which darkness non-uniformities are easily visible, then generate correction tables using the correction patterns printed with the selected color inks, and carry out darkness correction on only the selected colors based on the generated correction tables. By carrying out darkness correction for only selected colors, it is possible to perform darkness correction in a shorter time than when carrying out darkness correction on all the colors, and thus it is possible to increase throughput and effectively inhibit darkness non-uniformities.

In the above first embodiment, CMYK data was subjected to correction; however, there is no limitation to this. For example, it is also possible to perform darkness correction on dot creation ratio data that is converted in halftoning and RGB image data that is obtained in resolution conversion processing. Furthermore, in the above-described embodiment, a method was described in which correction tables were stored in a memory, but there is no limitation to this, and it is also possible to store in the memory a plurality of sets of correction information corresponding to specific darknesses and an arithmetic program for calculating corrected gradation values, such that arithmetic processing is performed when the image data is converted to print data. In this case, since arithmetic processing is performed for each pixel data, there is a possibility of reducing throughput, and therefore the above-described embodiment offers a more superior effect.

<Regarding the Carriage Movement Direction in which Ink is Ejected>

The foregoing first embodiment describes an example of single-direction printing in which ink is ejected only when the carriage 31 is moving forward, but this is not a limitation, and it is also possible to perform so-called bi-directional printing in which ink is ejected both when the carriage 31 is moving forward and backward.

(2) Second Embodiment

===(2) Configuration of the Printing System===

An embodiment of a printing system is described next with reference to the drawings. However, the description of the following second embodiment also encompasses implementations relating to a computer program and a storage medium storing the computer program, for example.

Figure 21:
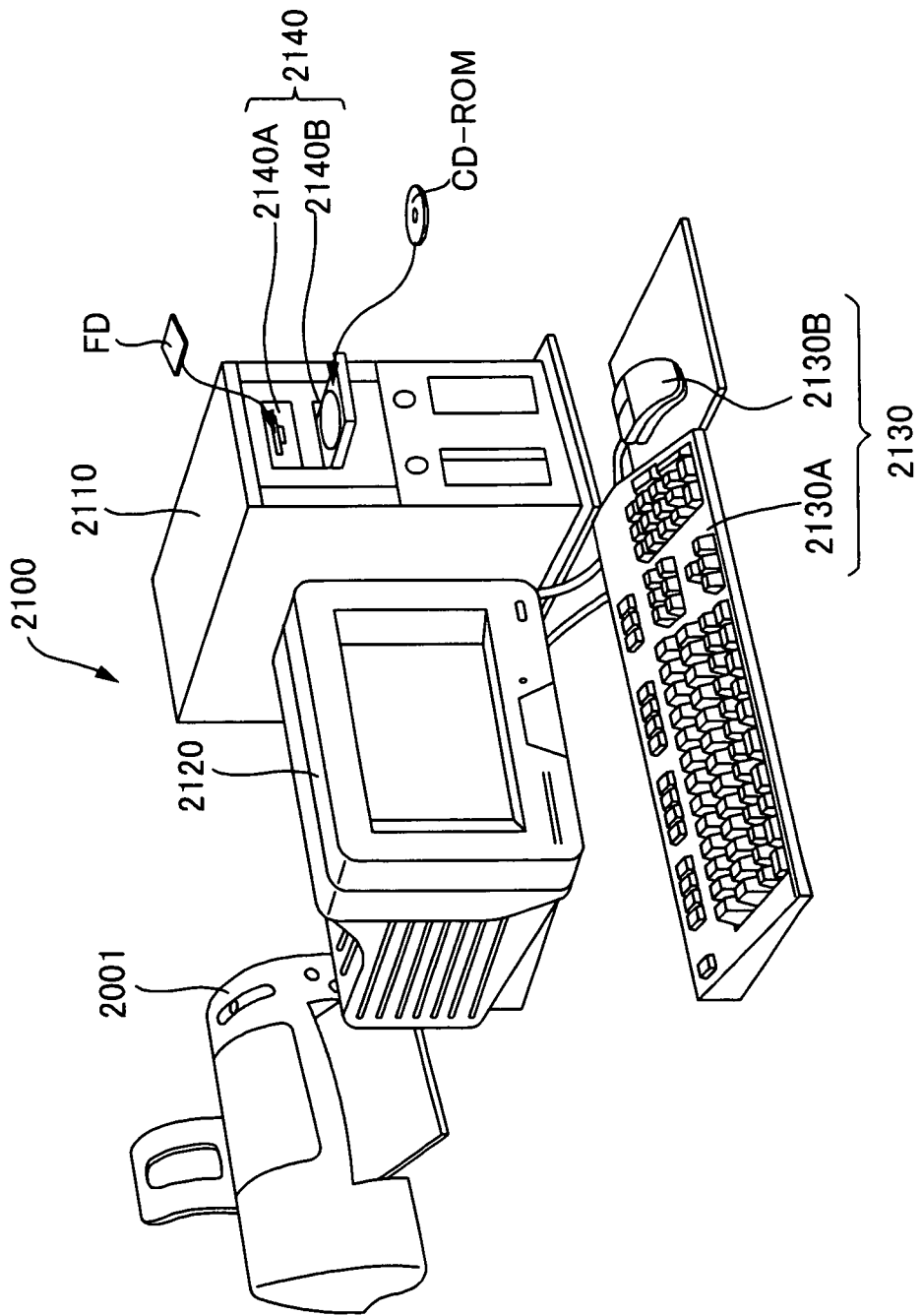
FIG. 21 is an explanatory diagram showing the external structure of the printing system.

FIG. 21 is an explanatory diagram showing the external structure of a printing system according to a second embodiment. The printing system 2100 of the second embodiment is provided with a printer 2001 and a computer 2110. The printer 2001 is a printing apparatus for printing images on a medium such as paper, cloth, or film. The computer 2110 is communicably connected to the printer 2001, and outputs print data corresponding to an image to be printed to the printer 2001 in order to print the image with the printer 2001. The computer 2110 controls the printer 2001 through print data, and is therefore also a print control apparatus.

The printing system 2100 is additionally provided with a display device 2120, input devices 2130, and a record/play device 2140. The display device 2120 has a display, and displays a user interface such as a printer driver. The input devices 2130 are for example a keyboard 2130A and a mouse 2130B, and are used to operate an application program or adjust the settings of the printer driver, for example, in accordance with the user interface that is displayed on the display device 2120. A flexible disk drive device 2140A and a CD-ROM drive device 2140B, for example, are employed as the record/play devices 2140.

A printer driver is installed on the computer 2110. The printer driver is a program for achieving the function of displaying the user interface on the display device 2120, and in addition it also achieves the function of converting image data that has been output from the application program into print data. The printer driver is stored on a storage medium (computer-readable storage medium) such as a flexible disk FD or a CD-ROM. But the printer driver also can be downloaded onto the computer 2110 via the Internet. It should be noted that this program is made of codes for achieving various functions.

===(2) Configuration of the Printer and the Computer===

<Regarding the Configuration of the Printer and the Computer>

Figure 22:
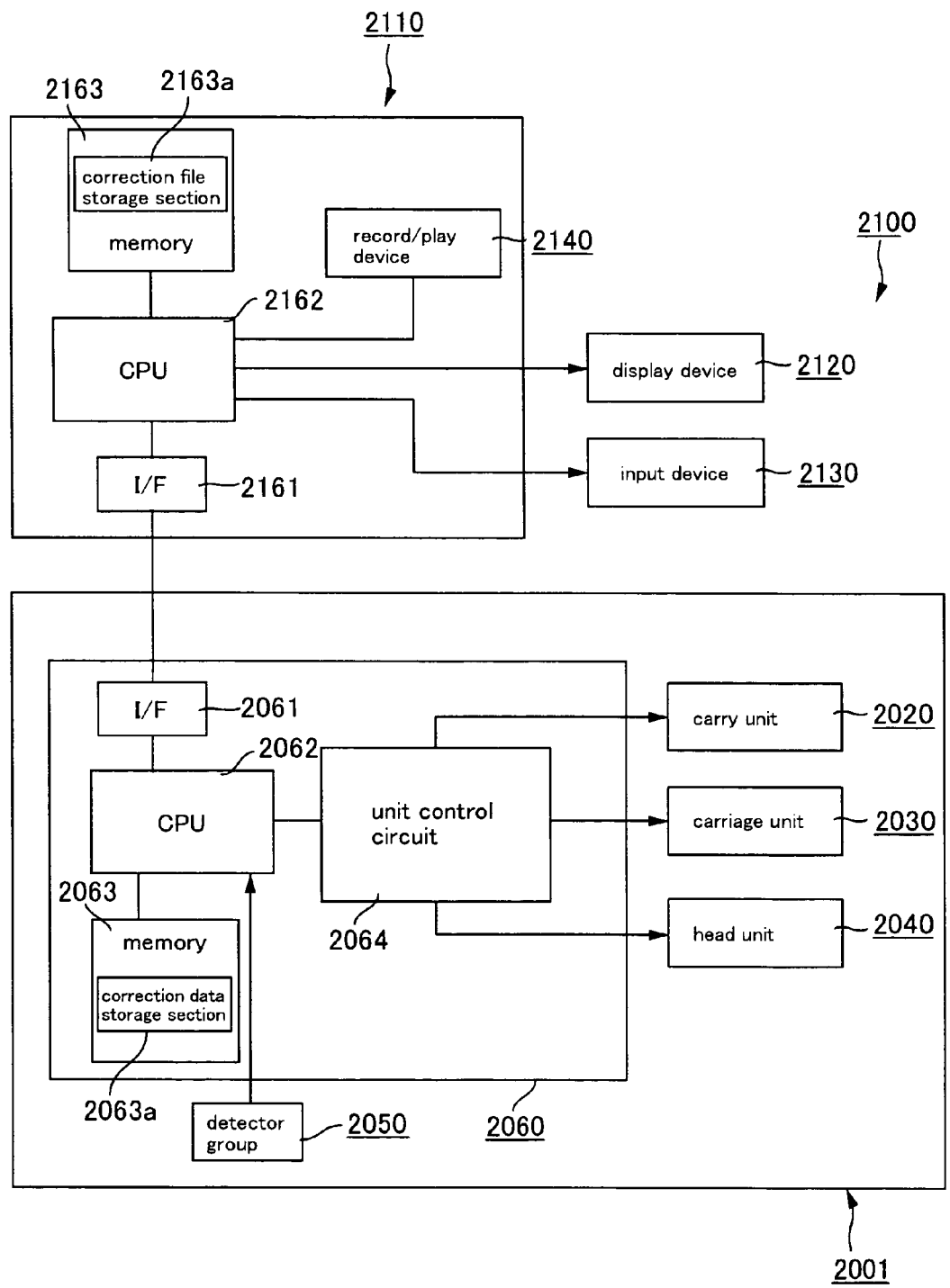
FIG. 22 is a block diagram of the overall configuration of the computer 2110 and the printer 2001.

FIG. 22 is a block diagram of the overall configuration of the computer 2110 and the printer 2001.

The computer 2110 has an interface section 2161, a CPU 2162, and a computer-side memory 2163. The interface section 2161 is for exchanging data between the printer 2001, which is an external device, and the computer 2110. The CPU 2162 is an arithmetic processing device for carrying out overall control of the computer 2110. The computer-side memory 2163 is a storage element that reserves a region for storing programs such as a printer driver and a working region. The CPU 2162 generates print data from image data in accordance to the printer driver stored in the computer-side memory 2163, and sends the print data to the printer 2001. By installing the printer driver in the computer 2110, the CPU 2162 and the computer-side memory 2163 serve as a computer-side controller that controls the printer 2001 via print data. It should be noted that in the second embodiment, a partial region of the computer-side memory 2163 is used as a correction file storage section 2163a for storing correction files, which is described later.

The printer 2001 is provided with a carry unit 2020, a carriage unit 2030, ahead unit 2040, a detector group 2050, and a printer-side controller 260. The printer 2001, which receives print data from the computer 2110 which is an external device, controls the various units (the carry unit 2020, the carriage unit 2030, and the head unit 2040) using the printer-side controller 2060. The printer-side controller 2060 controls the units in accordance with the print data that has been received from the computer 2110 to print an image on a paper. The detector group 2050 monitors the conditions within the printer 2001, and outputs the results of this detection to the printer-side controller 2060. The printer-side controller 2060 controls the various units in accordance with detection results that are output from the detector group 2050.

The printer-side controller 2060 is a control unit for carrying out control of the printer. The printer-side controller 2060 has an interface section 2061, a CPU 2062, a printer-side memory 2063, and a unit control circuit 2064. The interface section 2061 is for exchanging data between the computer 2110, which is an external device, and the printer 2001. The CPU 2062 is a computer processing device for carrying out overall control of the printer. The printer-side memory 2063 is for reserving a working region and a region for storing the programs for the CPU 2062, for instance, and includes storage means such as a RAM or an EEPROM. The CPU 2062 controls the various units via the unit control circuit 2064 in accordance with programs stored in the printer-side memory 2063. It should be noted that in the second embodiment, a partial region of the printer-side memory 2063 is used as a correction data storage section 2063a for storing correction data, which is described later.

It should be noted that the computer-side controller (the CPU 2162 and the computer-side memory 2163) and the printer-side controller 2060 serve as a controller that controls the entire printing system. Furthermore, the printer driver stored in the computer-side memory 2163 generates print data in the computer 2110 and sends the print data to the printer 2001. On the other hand, the program stored in the printer-side memory 2063 causes the paper to be carried by the carry unit 2020 according to the print data, causes the carriage to be moved by the carriage unit 2030, and causes ink to be ejected by the head unit 2040. For this reason, the printer driver and the printer-side program are programs that work together to carry out printing in the printing system.

Figure 23:
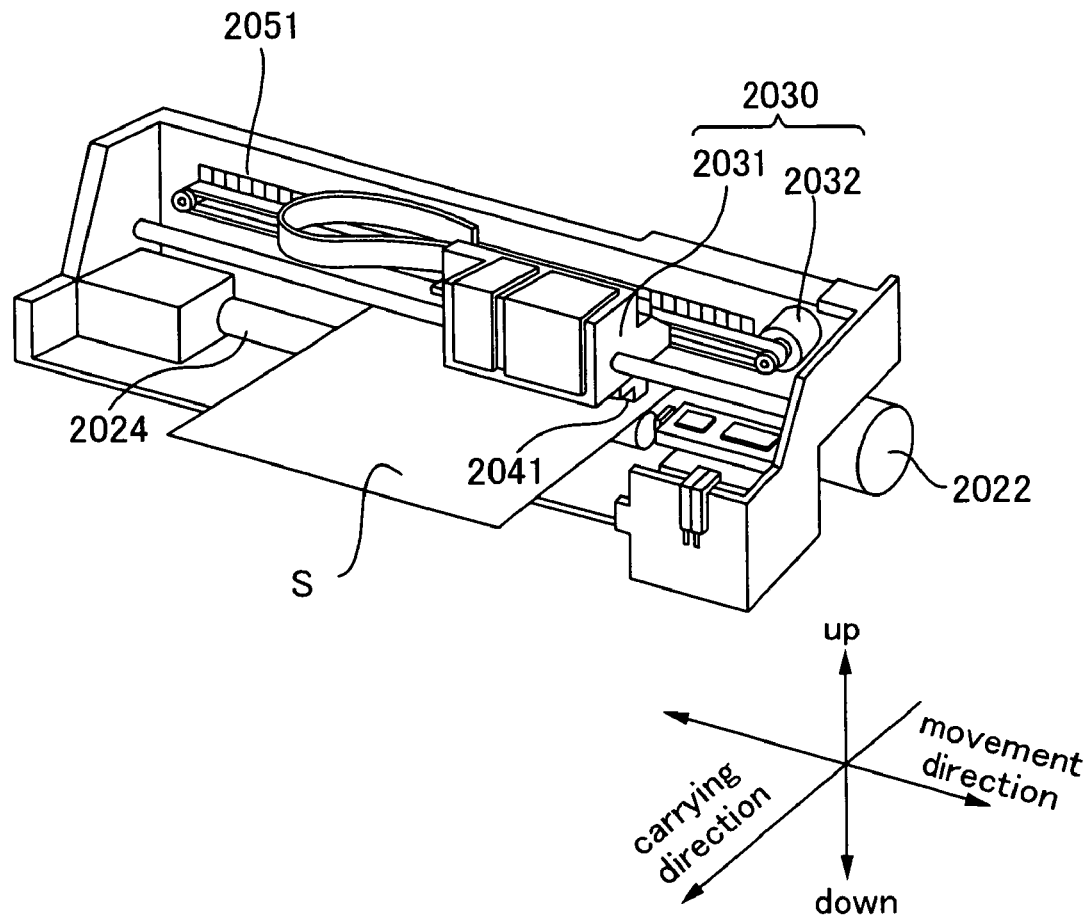
FIG. 23 is a schematic diagram of the overall configuration of the printer 2001.
Figure 24:
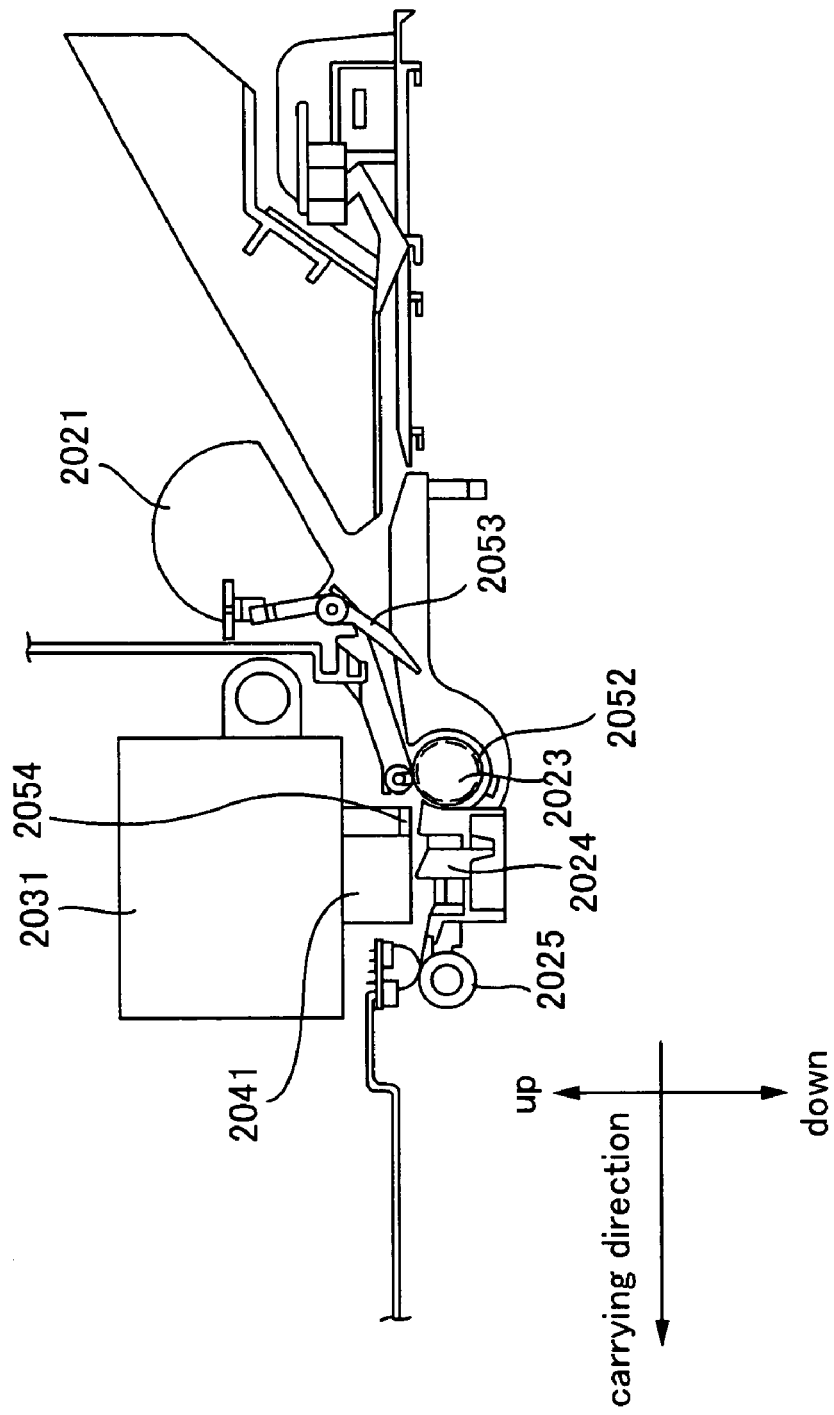
FIG. 24 is a cross-sectional view of the overall configuration of the printer 2001.

FIG. 23 is a schematic diagram of the overall configuration of the printer 2001. FIG. 24 is a cross-sectional view of the overall configuration of the printer 2001. The basic structure of the printer according to the second embodiment is described below.

The carry unit 2020 is for feeding a medium (for example, paper S) into a printable position and carrying the paper in a predetermined direction (hereinafter, referred to as the carrying direction) by a predetermined carry amount during printing. In other words, the carry unit 2020 is a carrying section for carrying paper. The carry unit 2020 has a paper supply roller 2021, a carry motor 2022 (hereinafter, also referred to as PF motor), a carry roller 2023, a platen 2024, and a paper discharge roller 2025. However, the carry unit 2020 does not necessarily have to include all of these structural elements in order to function as a carrying section. The paper supply roller 2021 is a roller for supplying paper that has been inserted into a paper insert opening into the printer. The paper supply roller 2021 has a cross-sectional shape in the shape of the letter D, and the length of its circumference section is set longer than the carrying distance to the carry roller 2023, so that the paper can be carried up to the carry roller 2023 using this circumference section. The carry motor 2022 is a motor for carrying paper in the carrying direction, and is constituted by a DC motor, for example. The carry roller 2023 is a roller for carrying the paper S that has been supplied by the paper supply roller 2021 up to a printable region, and is driven by the carry motor 2022. The platen 2024 supports the paper S during printing. The paper discharge roller 2025 is a roller for discharging the paper S to the outside of the printer and is provided downstream in the carrying direction with respect to the printable region. The paper discharge roller 2025 is rotated in synchronization with the carry roller 2023.

The carriage unit 2030 is for making the head move (also referred to as "scan") in a predetermined direction (hereinafter, referred to as the "movement direction"). The carriage unit 2030 has a carriage 2031 and a carriage motor 2032 (also referred to as "CR motor"). The carriage 2031 can be moved back and fourth in the movement direction. (Thus, the head is moved in the movement direction.) The carriage 2031 detachably retains an ink cartridge containing ink. The carriage motor 2032 is a motor for moving the carriage 2031 in the movement direction, and is constituted by a DC motor for instance. The carriage motor 2032 is a movement section that moves the head (discussed below) in the movement direction.

The head unit 2040 is for ejecting ink onto paper. The head unit 2040 includes a head 2041. The head 2041 has a plurality of nozzles, and ejects ink intermittently from the nozzles. The head 2041 is provided on the carriage 2031. Thus, when the carriage 2031 moves in the movement direction, the head 2041 also moves in the movement direction. Dot lines (raster lines) are formed on the paper in the movement direction as a result of the head 2041 intermittently ejecting ink while moving in the movement direction.

The detector group 2050 includes a linear encoder 2051, a rotary encoder 2052, a paper detection sensor 2053, and an optical sensor 2054, for example. The linear encoder 2051 is for detecting the position of the carriage 2031 in the movement direction. The rotary encoder 2052 is for detecting the amount of rotation of the carry roller 2023. The paper detection sensor 2053 is for detecting the position of the leading edge of the paper to be printed. The paper detection sensor 2053 is provided in a position where it can detect the position of the leading edge of the paper as the paper is being fed toward the carry roller 2023 by the paper supply roller 2021. It should be noted that the paper detection sensor 2053 is a mechanical sensor that detects the front end of the paper through a mechanical mechanism. More specifically, the paper detection sensor 2053 has a lever that can be rotated in the carrying direction, and this lever is disposed such that it protrudes into the path over which the paper is carried. In this way, the front end of the paper comes into contact with the lever and the lever is rotated, and thus the paper detection sensor 2053 detects the position of the leading edge of the paper by detecting the movement of the lever. The optical sensor 2054 is attached to the carriage 2031. The optical sensor 2054 detects whether or not the paper is present by its light-receiving section detecting reflected light of the light that has been irradiated onto the paper from the light-emitting section. The optical sensor 2054 can detect the position of the edge of the paper while being moved by the carriage 2031 and can detect the width of the paper. Furthermore, according to conditions, the optical sensor 2054 is also capable of detecting the leading edge of the paper (the edge portion downstream in the carrying direction, also called upper edge) and the trailing edge (the edge portion upstream in the carrying direction, also called lower edge). The optical sensor 2054 optically detects the edge of the paper, and thus has higher detection accuracy than the mechanical paper detection sensor 2053.

<Regarding the Nozzles>

Figure 25:
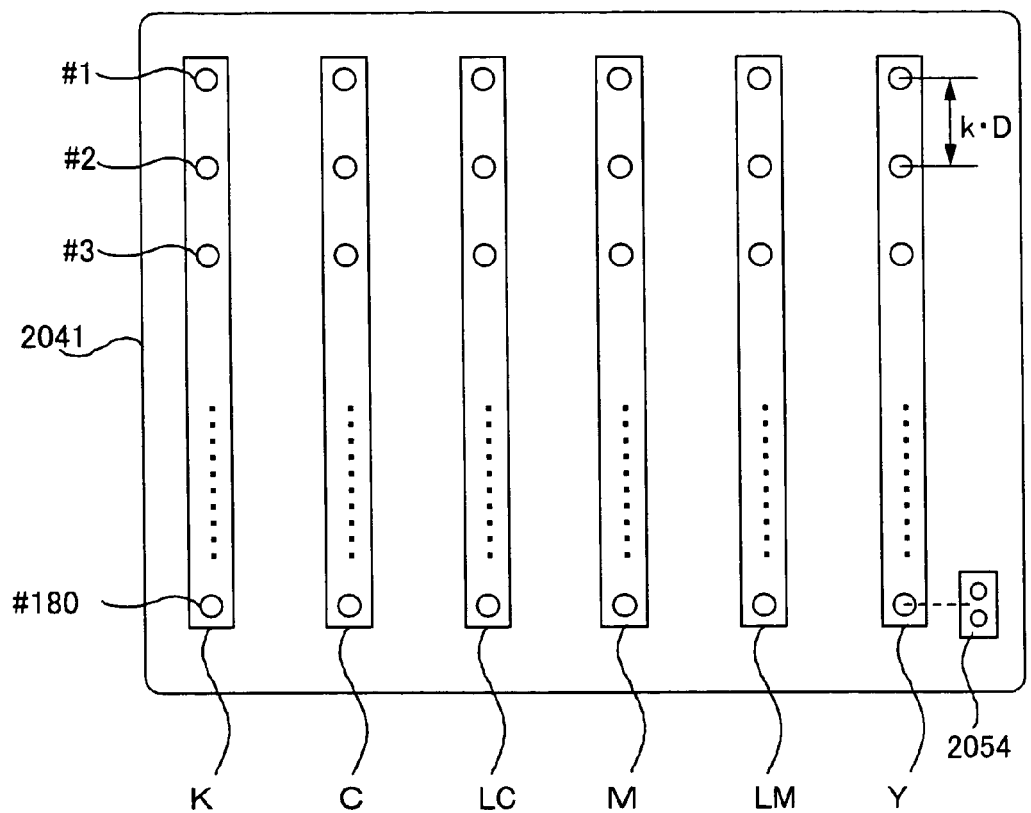
FIG. 25 is an explanatory diagram showing the arrangement of the nozzles.
Figure 25:
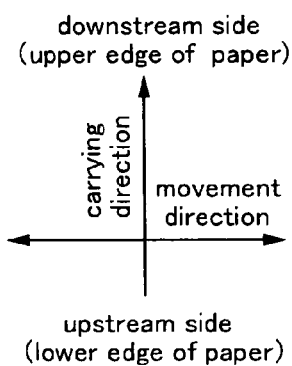

FIG. 25 is an explanatory diagram showing the arrangement of the nozzles in the lower surface of the head 2041. Six nozzle groups are formed at the lower surface of the head 2041. Each nozzle group is provided with a plurality of nozzles (in the second embodiment, 180), which are ejection openings for ejecting the various color inks.

The plurality of nozzles in each of the nozzle groups are arranged in rows at a constant spacing (nozzle pitch: k·D) in the carrying direction. Here D is the minimum dot pitch in the carrying direction (that is, the interval of dots formed on the paper S at maximum resolution). Also, k is an integer of 1 or greater.

Each of the nozzles of the nozzle groups is assigned a number (#1 to #180) that becomes smaller the more downstream in the carrying direction the nozzle is arranged. It should be noted that the above-mentioned optical sensor 2054 is provided substantially in the same position as the nozzle #180, which is on the most upstream side, as regards its position in the paper carrying direction.

Each nozzle is provided with a respective ink chamber (not shown) and a piezo element. The ink chambers expand and constrict due to the drive of the piezo elements, such that ink droplets are ejected from the nozzles.

Note here that when an inkjet printer forms a print image on paper, the print image is constituted by a multitude of dots. And the inkjet printer expresses the gradations of the print image by varying the density of dots on the paper. For example, in areas of the print image where the darkness is high, the density of dots is high, and in areas of the print image where the darkness is low, the density of dots is low.

In areas of the print image where the darkness is low, graininess occurs easily. For example, when printing a light sky blue using only cyan ink, then, as a result of dots being formed sparsely by the cyan ink, rather than a light sky blue, the print image turns out to be a polka dot pattern of cyan (graininess occurs).

For this reason, in the second embodiment, in addition to a black ink nozzle group K, a cyan ink nozzle group C, a magenta ink nozzle group M, and a yellow ink nozzle group Y, a light cyan ink nozzle group LC and a light magenta ink nozzle group LM are formed in the head 2041.

The light cyan ink nozzle group LC ejects a light cyan ink (light ink) that is lighter than the cyan ink (dark ink) ejected by the cyan ink nozzle group C. Cyan has a property of absorbing red light, which is its complementary color, but light cyan dots (light dots) formed by light cyan ink absorb a smaller amount of red light than the dots (dark dots) formed by cyan ink.

The light magenta ink nozzle group LM ejects a light magenta ink (light ink) that is lighter than the magenta ink (dark ink) ejected by the magenta ink nozzle group M. Magenta has a property of absorbing green light, which is its complementary color, but light magenta dots (light dots) formed by light magenta ink absorb a smaller amount of green light than the dots (dark dots) formed by magenta ink.

When printing a light sky blue color image in the second embodiment, light cyan dots are formed on the paper using light cyan ink. Compared to when using only cyan ink, there is a larger number of dots when expressing a light sky blue color using light cyan ink, and therefore the graininess can be reduced.

It should be noted that since there is little influence due to darkness for yellow, no light ink is prepared for yellow. However, by using a dark yellow ink (dark ink), it is possible to express a deep yellow color in the print image. It should be noted that yellow has a property of absorbing blue light, which is its complementary color, but dark yellow dots (dark dots) formed by dark yellow ink absorb a larger amount of blue light than the dots (light dots) formed by yellow ink.

===(2) Printer Driver===

<Regarding the Processing Performed by the Printer Driver>

Figure 26:
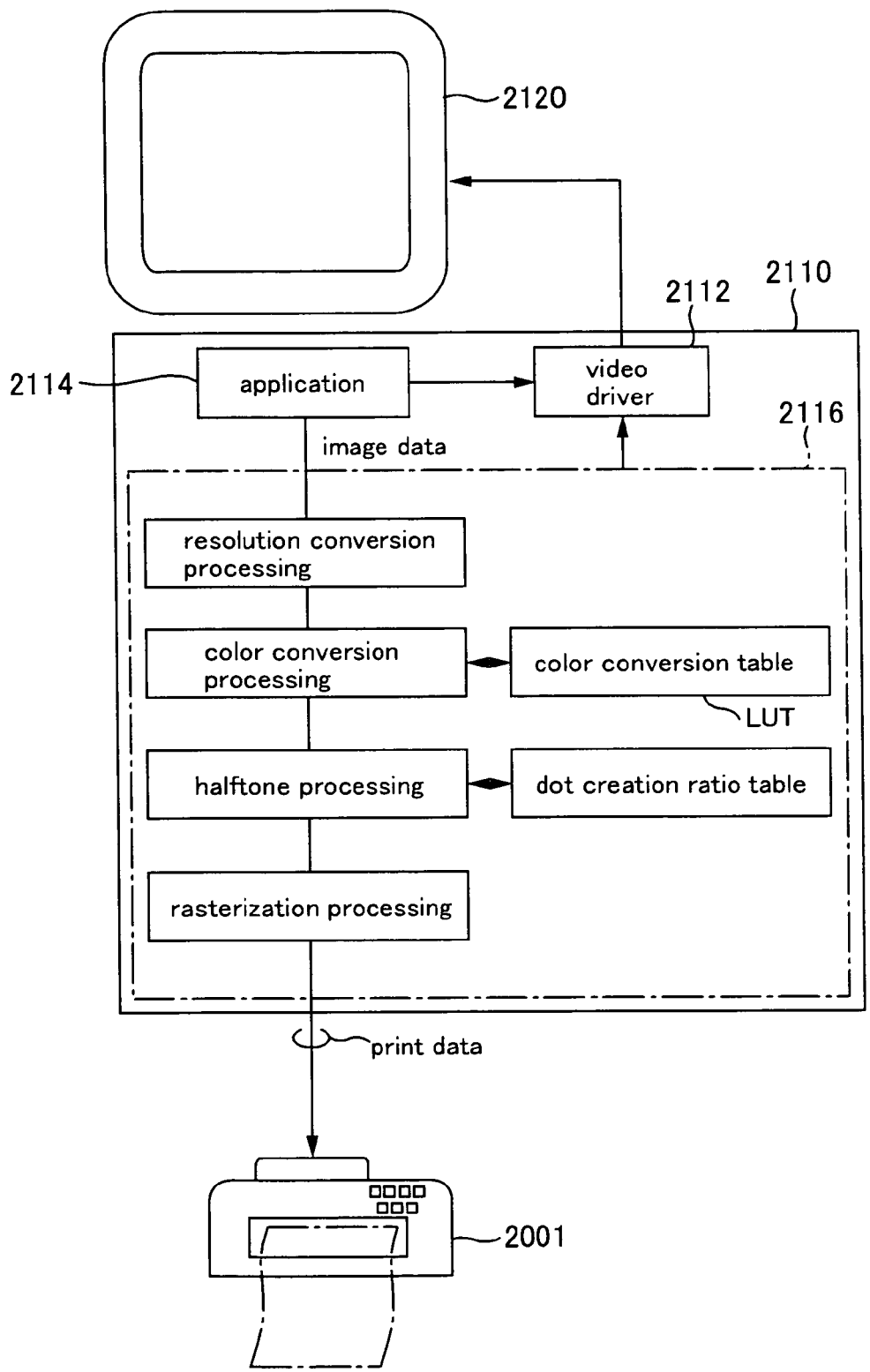
FIG. 26 is a schematic explanatory diagram of basic processes carried out by the printer driver.

FIG. 26 is a schematic explanatory diagram of basic processes carried out by the printer driver. Structural elements that have already been described are assigned identical reference numerals and thus their further description is omitted.

On the computer 2110, computer programs such as a video driver 2112, an application program 2114, and a printer driver 2116 operate under an operating system installed on the computer. The video driver 2112 has a function for displaying, for example, the user interface on the display device 2120 in accordance with display commands from the application program 2114 and the printer driver 2116. The application program 2114, for example, has a function for image editing or the like and creates data related to an image (image data). A user can give an instruction to print an image edited by the application program 2114 via the user interface of the application program 2114. Upon receiving the print instruction, the application program 2114 outputs the image data to the printer driver 2116.

The printer driver 2116 receives the image data from the application program 2114, converts the image data to print data, and outputs the print data to the printer. Here, "print data" refers to data in a format that can be interpreted by the printer 2001 and that includes various command data and pixel data. "Command data" refers to data for instructing the printer to carry out a specific operation. Furthermore, "pixel data" refers to data related to pixels that constitute an image. Each pixel data in print data is data (data of each dot that constitutes a print image) related to a dot that is formed in a position on the paper corresponding to a particular pixel. On the other hand, pixel data in image data is data related to the color and gradation of the pixels that constitute a print image.

In order to convert the image data that is output from the application program 2114 into print data, the printer driver 2116 carries out such processes as resolution conversion, color conversion, halftoning, and rasterization. The following is a description of the processes carried out by the printer driver 2116.

Resolution conversion is a process for converting image data (text data, image data, etc.) output from the application program 2114 to the resolution (the interval between dots when printing; also referred to as "print resolution") for printing the image on the paper S. For example, when the print resolution has been designated as 720×720 dpi, then the image data obtained from the application program 2114 is converted into image data having a resolution of 720×720 dpi.

It should be noted that the pixel data in the image data, which has been output from the application program 2114, represents gradation values of many levels (for example, 256 levels) expressed in an RGB color space. The pixel data that represents such RGB gradation values is hereinafter referred to as "RGB pixel data," and the image data made of these RGB pixel data is referred to as "RGB image data."

Color conversion processing is processing for converting the RGB pixel data of the RGB image data into data indicating gradation values of many levels (for example, 256 levels) expressed in CMYK color space. Here, in the term CMYK, C stands for cyan, while M stands for magenta, Y for yellow, and K for black. Hereinafter, the pixel data indicating CMYK gradation values is referred to as "CMYK pixel data", and the image data composed of this CMYK pixel data is referred to as "CMYK image data". Color conversion processing is carried out by the printer driver 2116 with reference to a table (color conversion lookup table LUT) that correlates RGB gradation values and CMYK gradation values.

Halftoning is a process for converting CMYK pixel data representing many gradation values into binary pixel data that represents fewer gradation values, which can be expressed by the printer 2001. For example, using halftoning, CMYK pixel data that represents 256 gradation values of four colors (cyan, magenta, yellow, and black) is converted into 1-bit binary pixel data that indicates two gradation values of six colors (cyan, light cyan, magenta, light magenta, yellow, and black). This binary pixel data is data that indicates for each color for example, "no dot formation" (binary value "0"), and "dot formation" (binary value "1"). It should be noted that, in order to simplify description, pixel data that has undergone halftoning is 1-bit data in the second embodiment, but may also be 2-bit data. When the pixel data is 2-bit data, it is possible to express not only on/off of a dot, but also dot size (large dot, medium dot, and small dot, etc). It should be noted that the printer driver 2116 converts the pixel data of 256 gradations into binary pixel data by referring to a dot creation ratio table. The dot creation ratio table is described in detail later.

Dithering or the like is used for such a halftone processing to create binary pixel data with which the printer 2001 can form dispersed dots. Also, the method used for halftone processing is not limited to dithering, and it is also possible to use gamma correction or error diffusion.

Rasterization is processing for changing the CMYK image data that has been subjected to halftone processing into the data order in which it is to be transferred to the printer 2001. Data that has been rasterized is output to the printer 2001 as print data.

<Regarding Dot Creation Ratios>

Figure 27A:
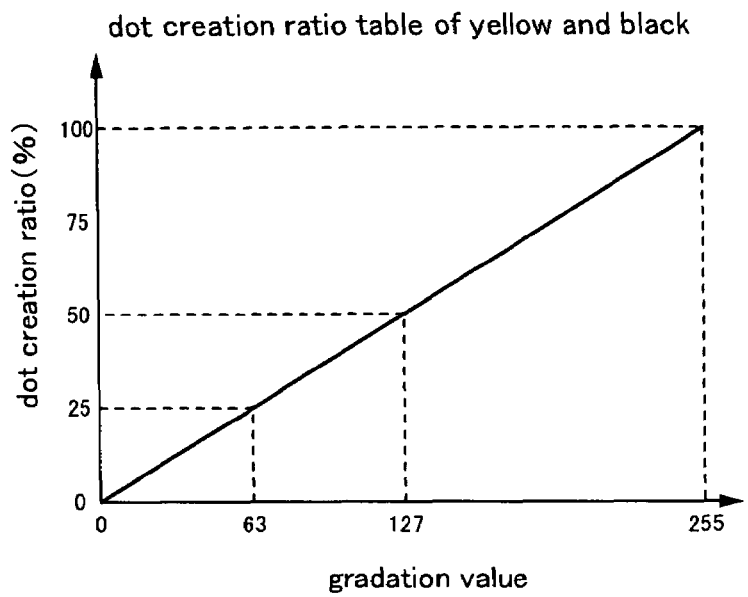
FIG. 27A is a dot creation ratio table concerning yellow and black.
Figure 27B:
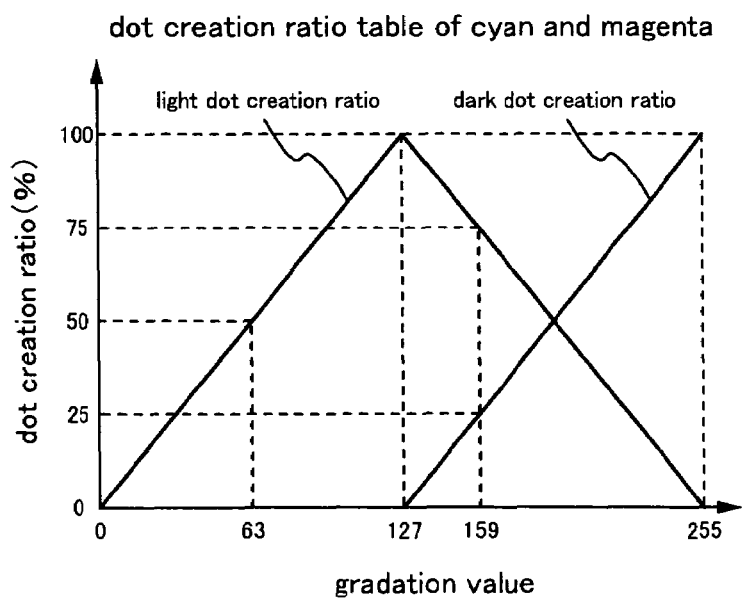
FIG. 27B is a dot creation ratio table concerning cyan and magenta.

FIGS. 27A and 27B are explanatory diagrams of the dot creation ratio tables used in the above-mentioned halftoning process. FIG. 27A is a dot creation ratio table concerning yellow and black. FIG. 27B is a dot creation ratio table concerning cyan and magenta. The horizontal axis represents the gradation values of pixel data (CMYK pixel data) prior to halftoning. The vertical axis represents a dot creation ratio. When the dot creation ratio for a particular pixel is 50%, the binary pixel data after halftoning has a 50% probability of becoming "1" (the dot generated in a position on the paper corresponding to that pixel). Furthermore, when the entire region of all 256 pixels (16×16 pixels) has a dot creation ratio of 50%, then the pixel data after halftoning is expressed such that dots are formed for 128 pixels.

In the second embodiment, yellow (and black) are expressed in gradations with ink of one category of darkness, and therefore the dot creation ratio on the yellow dot creation ratio table becomes higher for higher gradation values.

On the other hand, cyan (and magenta) are expressed in gradations with ink of two categories of darkness, and therefore the cyan dot creation ratio table is different from the dot creation ratio table of yellow (and black). Gradation values of 127 or lower are expressed only by light cyan ink, and therefore the dot creation ratio of dots (light dots) using light cyan ink becomes higher for higher gradation values. Gradation values of 128 or higher are formed by dots (dark dots) using cyan ink, and the creation ratio of light dots becomes lower as the creation ratio of dark dots becomes higher.

In the cyan dot creation ratio table, when the gradation value of a particular pixel data prior to halftoning is 63 for example, the light dot creation ratio for that pixel is 50% and the dark dot creation ratio is 0%. Further, when the gradation value of a particular pixel data prior to halftoning is 159, the light dot creation ratio for that pixel is 75% and the dark dot creation ratio is 25%. That is, when the gradation value of a particular C (cyan) pixel data prior to halftoning is 159, the binary pixel data of light cyan becomes "1" at a probability of 75% and the binary pixel data of cyan becomes "1" at a probability of 25%.

Using the dot creation ratio table shown in FIG. 27B, pixel data of 256 gradations of cyan (or magenta) is converted (halftone processed) into binary pixel data of two gradations of cyan and light cyan (or magenta and light magenta). As a result, pixel data of 256 gradations of four colors (CMYK) is converted (halftone processed) into binary pixel data of two gradations of six colors (C, LC, M, LM, Y, and K).

It should be noted that when the gradation value prior to halftoning is 127 or lower for pixel data of a particular region according to the dot creation ratio table, then only light dots are formed on the region on the paper corresponding to that region and no dark dots are formed there.

Also note that in the second embodiment, halftoning (which is described later) is carried out using dot creation ratio tables corrected for each dot row region.

===(2) Printing Operation===

Figure 28:
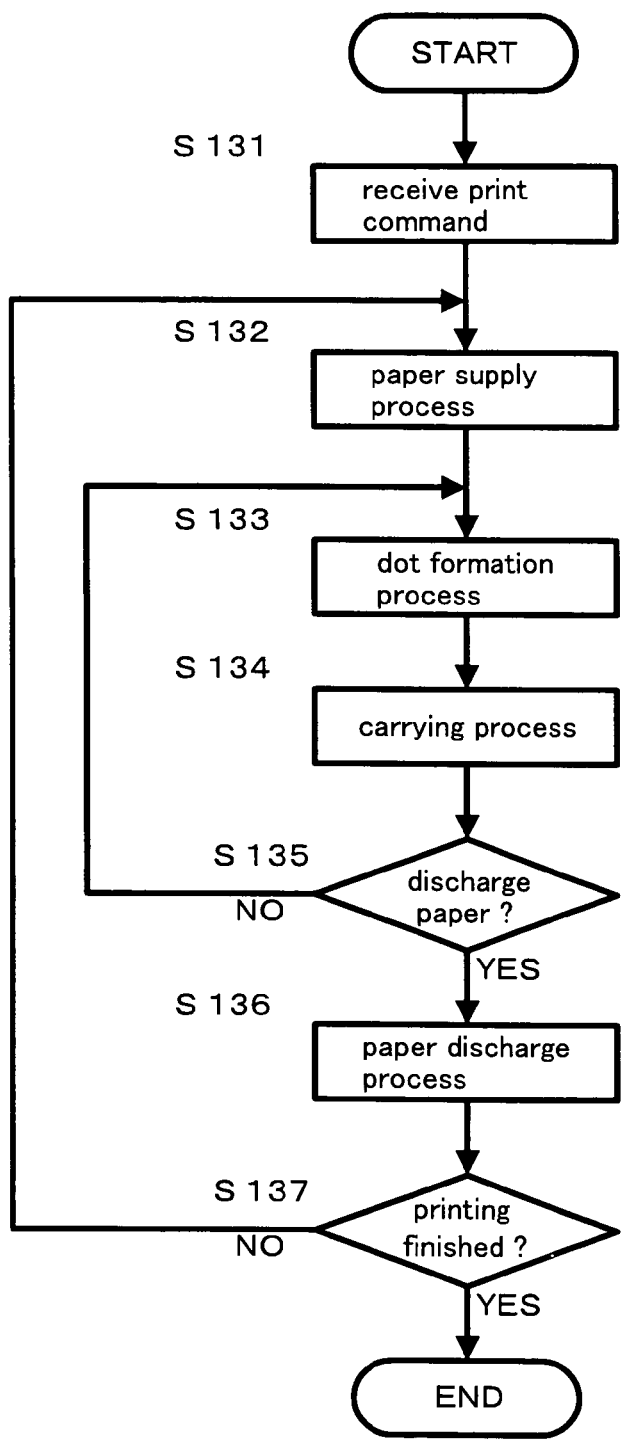
FIG. 28 is a flowchart of the processing during printing.

FIG. 28 is a flowchart of the processing during printing. The processes described below are executed by the printer-side controller 2060 controlling the various units in accordance with a program stored in the printer-side memory 2063. This program includes codes for executing the various processes.

Receive Print Command (S131): First, the printer-side controller 2060 receives a print command from the computer 2110 via the interface section 2061. This print command is included in the header of the print data transmitted from the computer 2110. The printer-side controller 2060 then analyzes the content of the various commands included in the print data that is received and uses the units to perform the following paper supply process, carrying process, and dot formation process, for example.

Paper Supply Process (S132): The paper supply process is a process for supplying paper to be printed into the printer and positioning the paper at a print start position (also referred to as the "indexed position"). The printer-side controller 2060 rotates the paper supply roller 2021 to feed the paper to be printed up to the carry roller 2023. Next, the printer-side controller 2060 rotates the carry roller 2023 to position the paper, that has been fed from the paper feed roller 2021, at the print start position. When the paper has been positioned at the print start position, at least some of the nozzles of the head 2041 are in opposition to the paper.

Dot Formation Process (S133): The dot formation process is a process for intermittently ejecting ink from a head that moves in the movement direction so as to form dots on the paper. The printer-side controller 2060 drives the carriage motor 2032 to move the carriage 2031 in the movement direction. The printer-side controller 2060 then causes the head to eject ink in accordance with the print data while the carriage 2031 is moving. Dots are formed on the paper when ink droplets ejected from the head 2041 land on the paper. Since ink is intermittently ejected from the moving head 2041, dot rows (raster lines) made of a plurality of dots in the movement direction are formed on the paper.

Carrying Process (S134): The carrying process is a process for moving the paper relative to the head in the carrying direction. The printer-side controller 2060 drives the carry motor to rotate the carry roller and thereby carry the paper in the carrying direction. Through this carrying process, the head 2041 can form dots at positions that are different from the positions of the dots formed in the preceding dot formation process.

Paper Discharge Determination (S135): The printer-side controller 2060 determines whether or not to discharge the paper being printed. The paper is not discharged if there is still data with which to print the paper being printed. The printer-side controller 2060 alternately repeats the dot formation and carrying processes until there is no more data to be printed, gradually printing an image made of dots on the paper.

Paper Discharge Process (S136): When there is no more data for printing the paper being printed, the printer-side controller 2060 discharges that paper by rotating the paper discharge roller. It should be noted that whether or not to discharge the paper can also be determined based on a paper discharge command included in the print data.

Print Over Determination (S137): Next, the printer-side controller 2060 determines whether or not to continue printing. If the next sheet of paper is to be printed, then printing is continued and the paper supply process for the next sheet of paper is started.

If the next sheet of paper is not to be printed, then the printing operation is ended.

===(2) Regarding the Reason Why Darkness Non-uniformities Occur in the Image===

Darkness non-uniformities that occur in a multicolor printed image are generally due to darkness non-uniformities that occur in each of those colors (cyan, magenta, yellow, and black). For this reason, the method that is normally adopted is a method for inhibiting darkness non-uniformities in images printed in multiple colors by individually inhibiting darkness non-uniformities in each of the colors. The following is a description of how darkness non-uniformities occur in images printed in a single color.

Figure 29A:
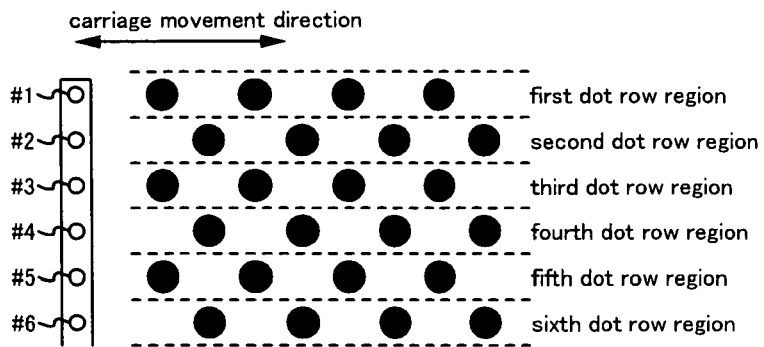
FIG. 29A is an explanatory diagram illustrating the state when dots are ideally formed.

FIG. 29A is an explanatory diagram illustrating the state when dots are ideally formed. While the carriage moves in the movement direction, ink is ejected from the nozzles and dots are formed when the ink lands on the paper. The nozzles eject ink intermittently while moving, and therefore dot rows (raster lines) are formed in the movement direction. Each raster line forms an image fragment and the print image is made by lining up the image fragments in the carrying direction.

In this drawing, dots are ideally formed, and therefore the dots are formed exactly in regions defined virtually on the paper. Here, a region in which a raster line is to be formed is called "dot row region." In the drawing, dot row regions are shown as regions sandwiched between the dashed lines. It should be noted that the dot row regions are also regions on the paper corresponding to a plurality of pixels lined up in the movement direction.

Figure 29B:
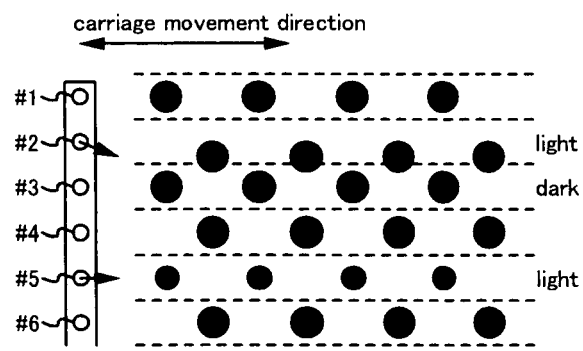
FIG. 29B is an explanatory diagram of the effect of uneven machining precision of the nozzles.

FIG. 29B is an explanatory diagram of the effect of uneven machining precision of the nozzles. Here, the raster line formed by the nozzle #2 is displaced to the side (the upstream side in the carrying direction) of the raster line formed by the nozzle #3 due to unevenness in the travel direction of ink ejected by the nozzle #2. Furthermore, the amount of ink ejected from the nozzle #5 is small and the dots formed by the nozzle #5 are small.

Even though image fragments of the same darkness should be formed in the dot row regions, darkness/lightness may occur in the dot row regions due to unevenness in machining precision. For example, the image becomes comparatively lighter in the second dot row region and the image becomes comparatively darker in the third dot row region. Moreover, the image becomes comparatively lighter in the fifth dot row region.

Then, when a print image made of such raster lines is viewed macroscopically, band-shaped darkness non-uniformities are visible in the movement direction of the carriage. The darkness non-uniformities are a cause of reduced quality in printed images.

In the second embodiment, the dot creation ratio is corrected for dot row regions that tend to appear darker so that lighter image fragments are formed, and the dot creation ratio is corrected for dot row regions that tend to appear lighter so that darker image fragments are formed, thus inhibiting darkness non-uniformities in the printed image.

Figure 29C:
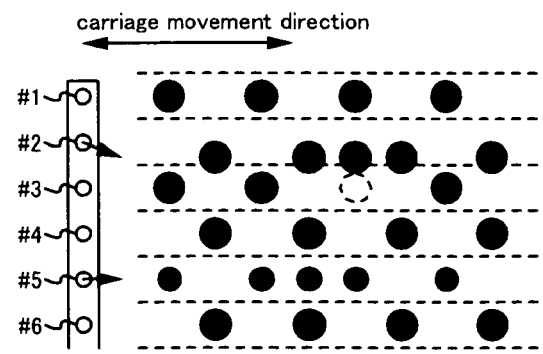
FIG. 29C is an explanatory diagram illustrating the state when dots are formed using the printing method of the second embodiment.

FIG. 29C is an explanatory diagram illustrating the state when dots are formed using the printing method of the second embodiment. In the second embodiment, the dot creation ratio of the second dot row region is set higher, the dot creation ratio of the third dot row region is set lower, and the dot creation ratio of the fifth dot row region is set higher. In this way, the darkness of image fragments formed in the dot row regions is corrected, thus inhibiting darkness non-uniformities in the printed image.

Note here that the density of dots formed in dark regions of the print image is originally high, and therefore macroscopically there is little change in darkness even when the raster lines are formed displaced in the carrying direction. That is, darkness non-uniformities tend not to occur in dark regions of printed images. On the other hand, the density of dots formed in light regions of the print image is low, and therefore the density of dots changes greatly when there is displacement of the raster lines in the carrying direction, which leads to a macroscopic effect on darkness. That is, darkness non-uniformities tend to occur easily in light regions of printed images.

For this reason, in the second embodiment, the occurrence of darkness non-uniformities is effectively inhibited by performing darkness correction on only light images.

===(2) Until Shipping of the Printer of the Second Embodiment===

In the second embodiment, the printer is manufactured at a printer manufacturing factory and then shipped. Then, the user who has bought the printer first installs the printer driver on his computer and prints an image created using an application software with the printer. The processes until the printer is shipped are described first below.

Figure 30:
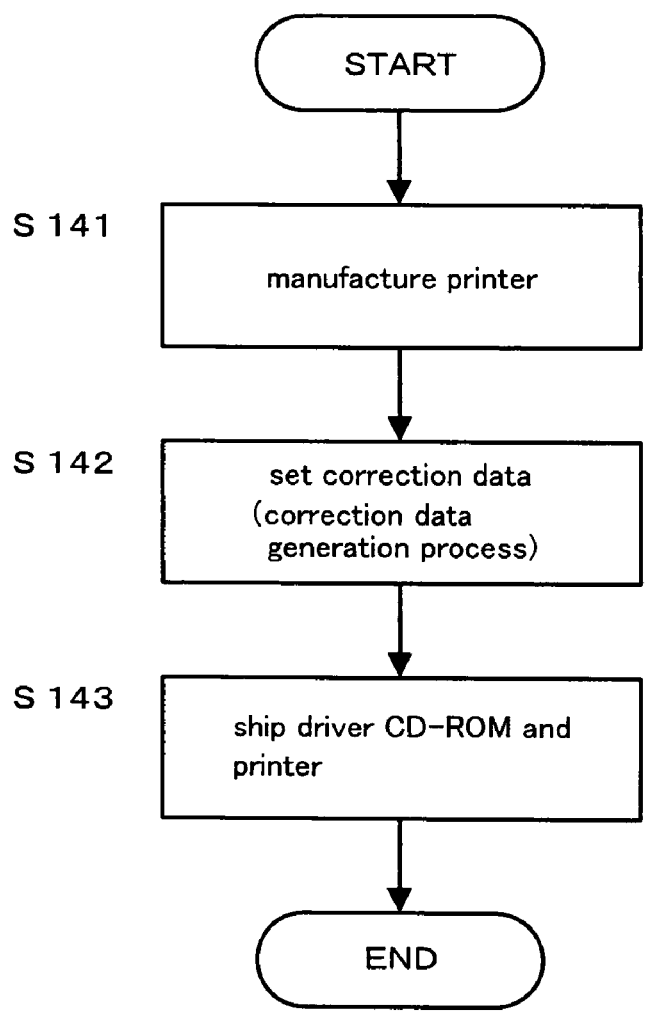
FIG. 30 is a flowchart of steps taken until a printer in a printer manufacturing factory is shipped.

FIG. 30 is a flowchart of steps taken until a printer in the printer manufacturing factory is shipped.

First, the printer 2001 is manufactured on the manufacturing line (S141). Next, correction data for correcting darkness is set in the printer 2001 by a worker responsible for inspection (S142). More detailed description of the correction data is given later.

Next, the printer 2001 and a driver CD-ROM are shipped (S143). The driver CD-ROM stores the printer driver, which is a program, and is packed together with the printer 2001 for shipping. It should be noted that application software other than the printer driver may also be stored on the driver CD-ROM.

<Step 142: Regarding Setting the Correction Data>

Figure 31:
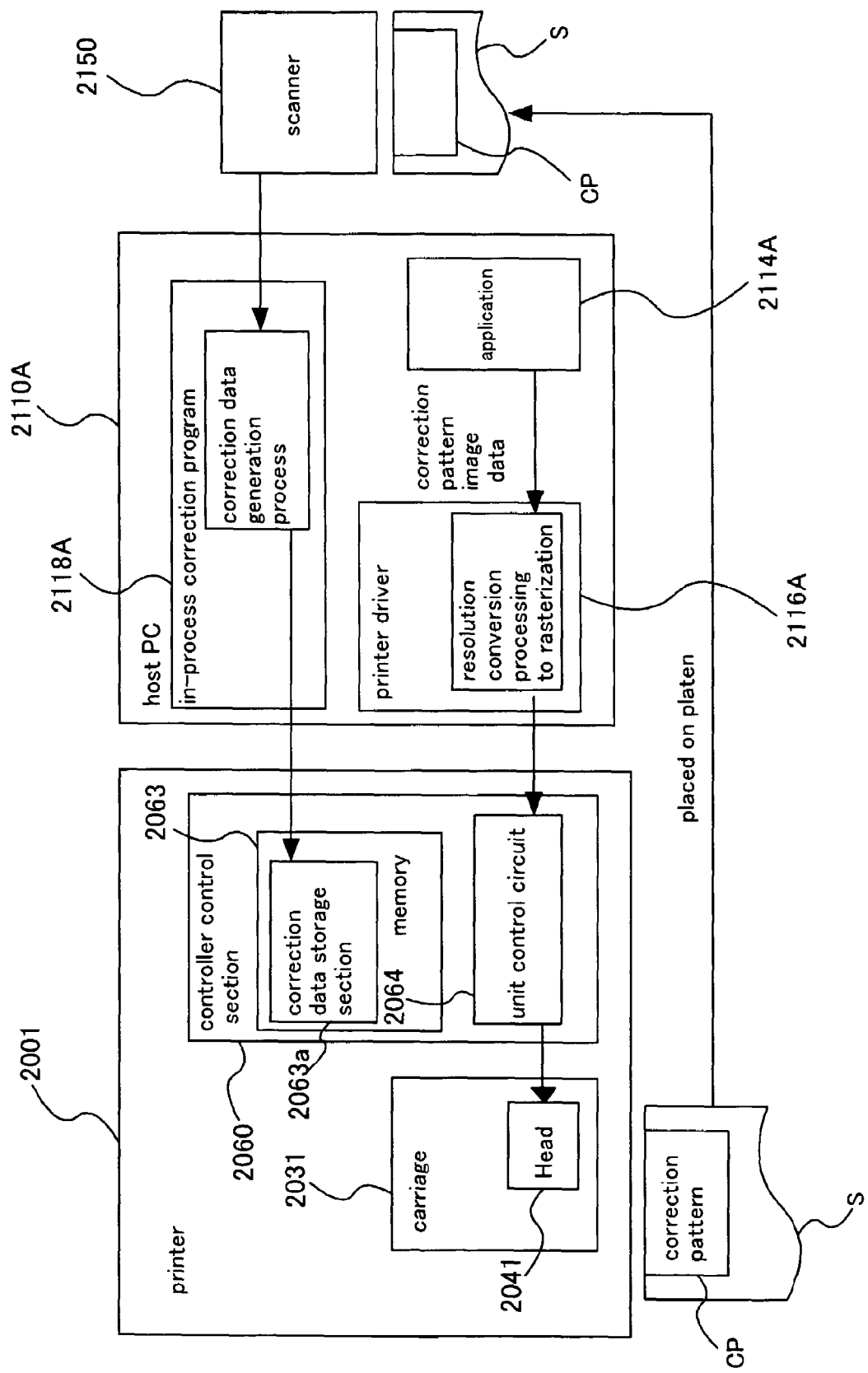
FIG. 31 is a block diagram describing equipment used for setting the correction data.

FIG. 31 is a block diagram describing equipment used for setting the correction data. It should be noted that structural elements that have already been described are assigned identical reference numerals and further description thereof is omitted.

In this drawing, the computer 2110A is a computer installed on an inspection line in the printer manufacturing factory. The computer 2110A runs an application 2114A and a printer driver 2116A. The application 2114A outputs image data of correction patterns CP of designated gradation values to the printer driver 2116A. The printer driver converts the image data from the application 2114A into print data, and outputs print data for printing a correction pattern CP to the printer 2001.

Moreover, the computer 2110A runs an in-process correction program 2118A. This in-process correction program enables a correction data generation process in the computer 2110A. With the correction data generation process, the computer 2110A reads the correction pattern CP using the scanner 2150 and generates correction data for each dot row region based on the reading result (the darkness measurement value for each dot row region). Then, the computer 2110A sets the correction data (correction data table) that has been generated in a correction data storage section 2063a of the printer-side memory 2063.

Figure 32:
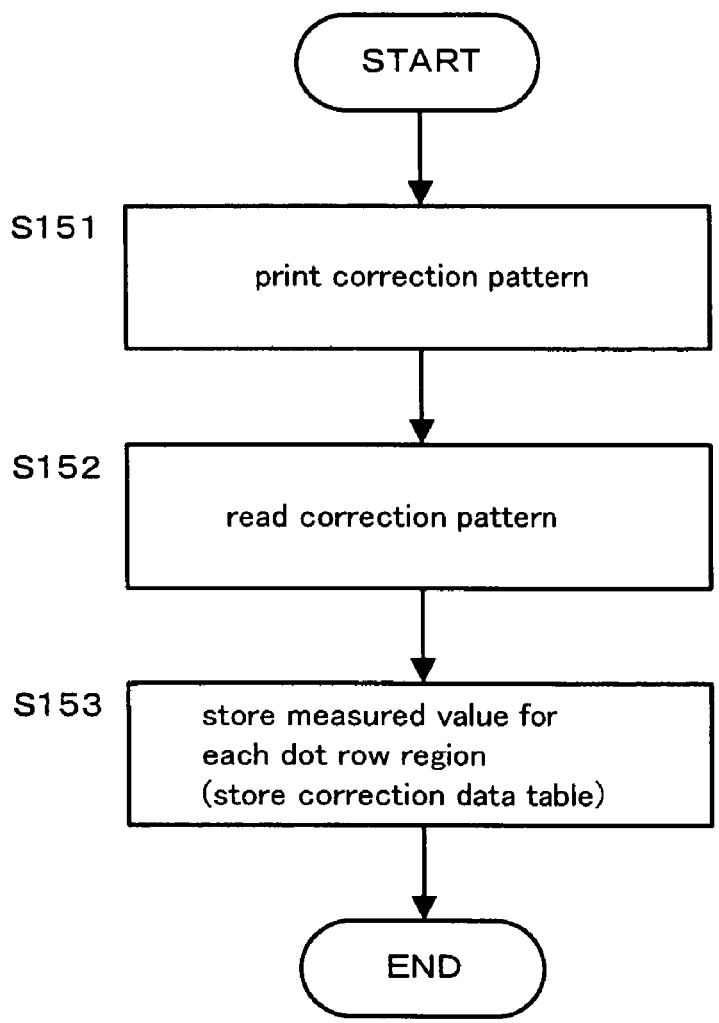
FIG. 32 is a flowchart of a correction data generation process.

FIG. 32 is a flowchart of the correction data generation process (S142). The procedure for setting the correction data is described below using this flowchart.

This setting procedure includes a step of printing a correction pattern CP (S151), a step of reading the correction pattern CP (S152), and a step of setting a correction data based on the measured values of darkness for each dot row region (S153). These steps are described in detail below.

(1) Regarding Printing of the Correction Pattern CP (S151)

First, in Step S151, the computer 2110A lets the printer print the respective correction patterns CP on the paper S. Here, a worker responsible for inspection communicably connects the printer 2001 to the computer 2110A that is set up on the inspection line and prints correction patterns CP with the printer 2001 via the user interface of the computer 2110A. It should be noted that the printer 2001 that prints the correction patterns CP is the printer 2001 for which correction data is to be set. In other words, correction data settings are performed for each printer 2001.

Figure 33:
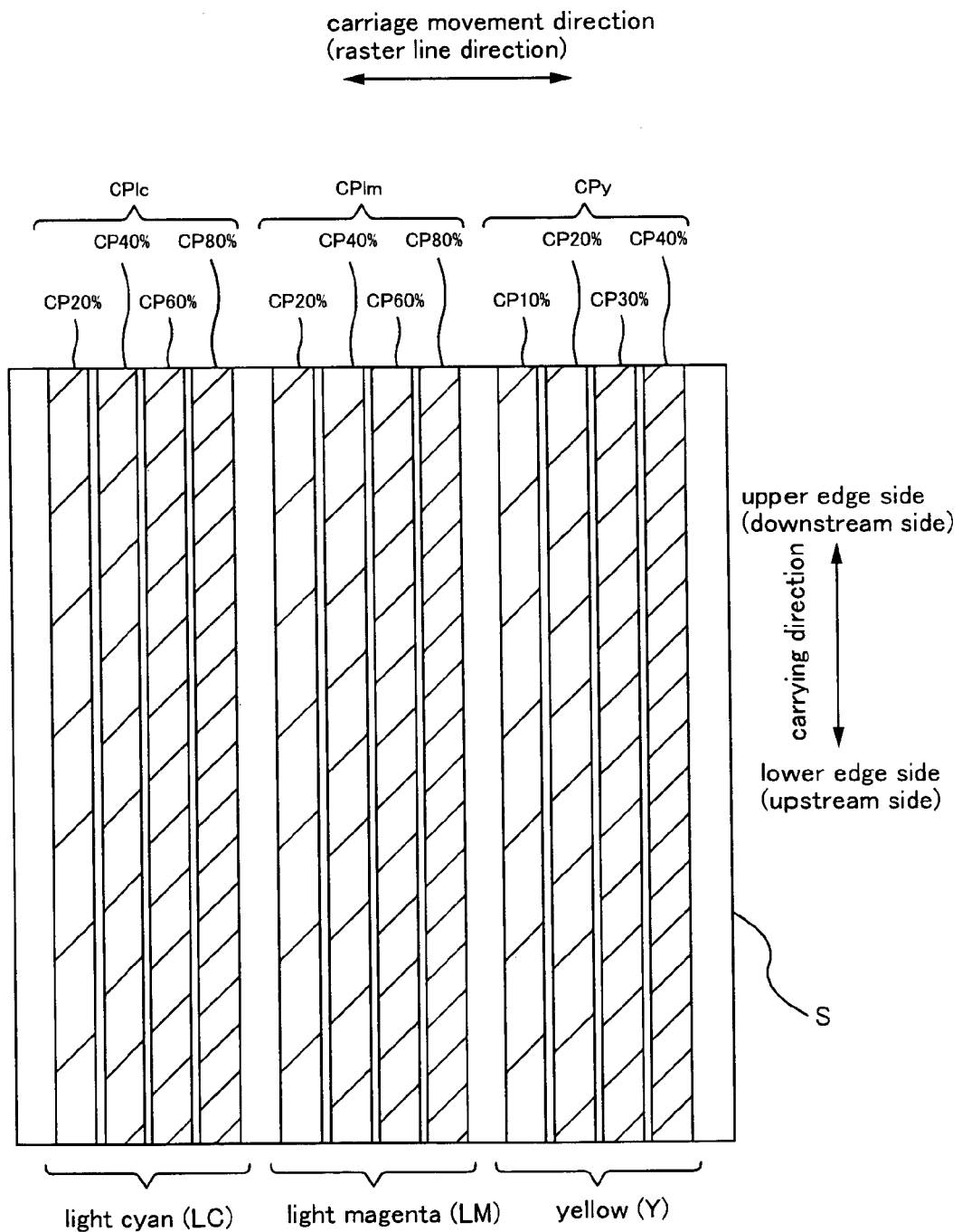
FIG. 33 is an explanatory diagram of a correction pattern CP that is printed.

FIG. 33 is an explanatory diagram of the correction patterns CP that are printed. As shown in the drawing, the correction patterns CP of the second embodiment are formed for three colors of ink (light cyan ink, light magenta ink, and yellow ink). It should be noted that correction patterns are not printed using cyan ink, magenta ink, or black ink. The following is a description of a correction pattern CPlc for light cyan.

The correction pattern CPlc for light cyan has patterns for four categories of dot creation ratios. The four patterns are formed in band shapes spanning the entire carrying direction length, lined up side by side. The four categories of dot creation ratios here are 20%, 40%, 60%, and 80% (however the four categories of dot creation ratios for the yellow correction pattern CPy are 10%, 20%, 30%, and 40%). A dot creation ratio of 100% using light cyan corresponds to a cyan gradation value of "127" (see FIG. 27). The following is a description of a correction pattern CP40% of a dot creation ratio of 40%.

The correction pattern CP40% is printed according to print data generated from image data representing an image of a band of uniform darkness. Furthermore, the correction pattern CP40% is constituted by a multitude of raster lines lined up in the carrying direction. If the printer is ideally manufactured, then the correction pattern CP40% will be printed with a uniform darkness. However, as described above, darkness non-uniformities occur in the correction pattern CP40% due to unevenness in machining precision.

In the second embodiment, correction patterns are printed on the papers for only three colors of inks. For this reason, compared to when printing correction patterns for all six color inks, with the second embodiment it is possible to reduce the area in which the correction patterns are printed on the paper S.

(2) Reading of the Correction Patterns CP (Step S152)

Next, a worker responsible for inspection sets the paper S on which the correction patterns CP have been printed in the scanner device 2150 and the computer 2110A causes the scanner device 2150 to read the correction patterns CP.

Figure 34A:
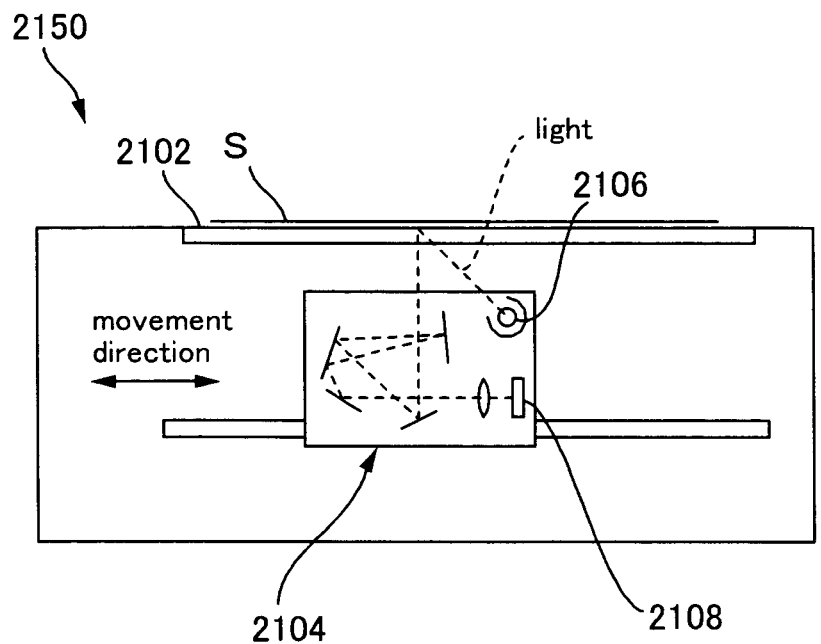
FIG. 34A is a cross-sectional view of a scanner.
Figure 34B:
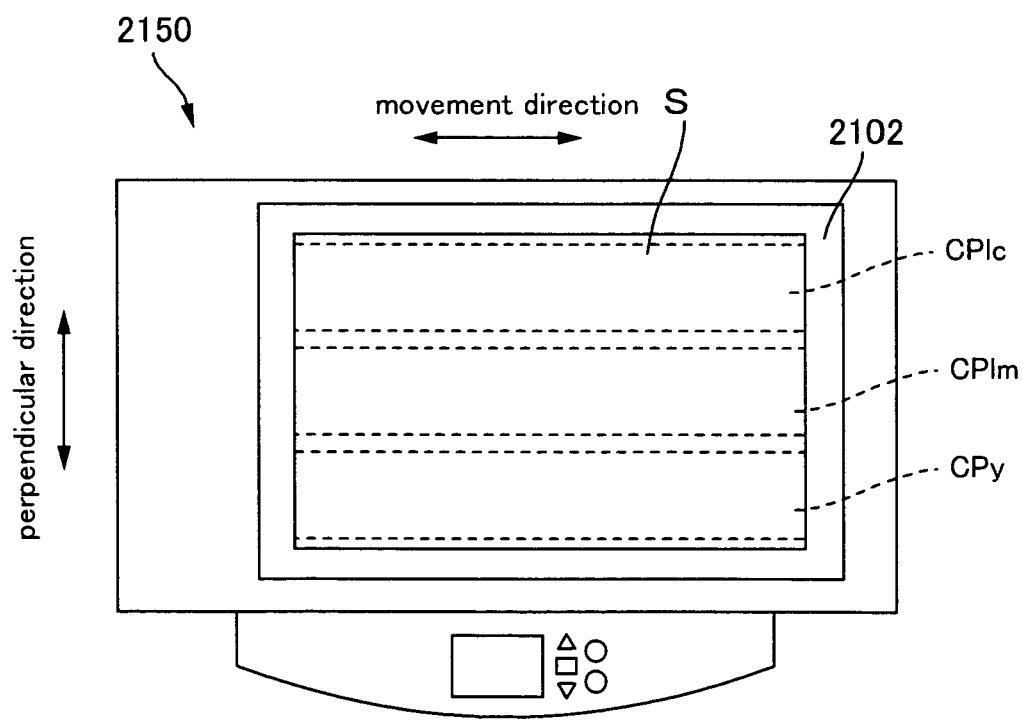
FIG. 34B is a plan view of the scanner.

FIG. 34A is a cross-sectional view of a scanner. FIG. 34B is a plan view of a scanner. The scanner device 2150 is provided with a platen glass 2102 on which is placed the paper S, on which the correction patterns CP are printed, and a reading carriage 2104. The reading carriage 2104 is in opposition to the paper S placed on the platen glass 2102 and moves in a predetermined reading movement direction. The reading carriage 2104 is provided with an exposure lamp 2106 that irradiates light onto the paper S and a linear sensor 2108 for receiving the light that is reflected by the paper S over a predetermined range in a direction that is perpendicular to the reading movement direction. The correction patterns CP are read from the paper S at a predetermined read resolution, while moving the reading carriage 2104 in the reading movement direction. It should be noted that the dashed line in FIG. 34A indicates the path of the light.

The paper S on which the correction patterns CP are printed is placed on the platen glass 2102 as shown in FIG. 34B. For this reason, the linear sensor 2108 can simultaneously measure the darkness of twelve correction patterns (three colors× four categories of correction patterns) in a given dot row region. Then, the darkness of each dot row region can be measured by moving the reading carriage 2104 in the reading movement direction.

Figure 35:
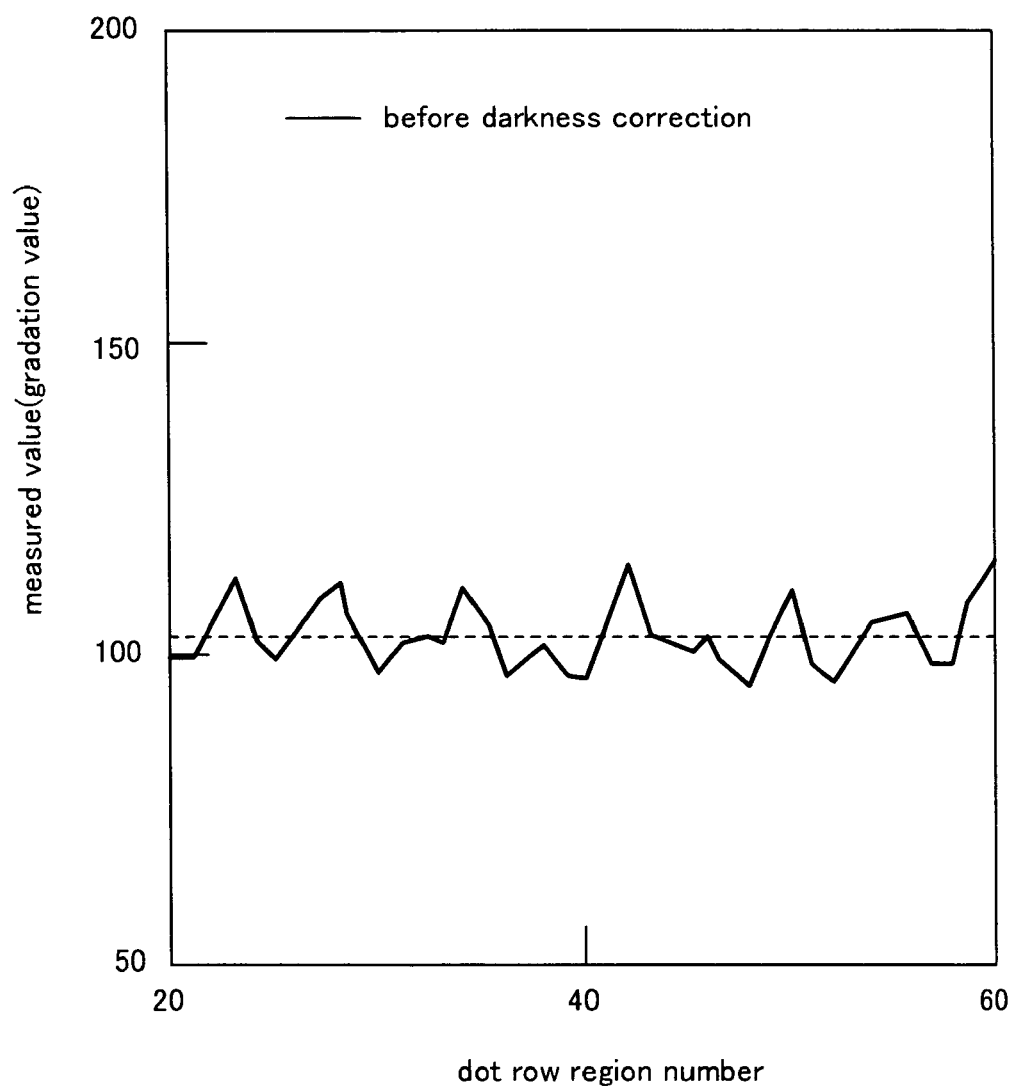
FIG. 35 shows a portion of the results of measuring a pattern printed at a dot creation ratio of 40%.

FIG. 35 shows a portion of the results of measuring the 40% dot creation ratio pattern of the correction pattern CPlc for light cyan ink. The vertical axis represents the measured values and the horizontal axis is the dot row region number. Here, "dot row region number" refers to the numbers given starting from the leading edge side of the paper to each dot row region virtually defined on the paper.

If the printer is ideally manufactured, then the darkness of the correction pattern CP40% will be uniform, and therefore the measured values will be as the dotted line in the drawing. However, since there is unevenness in the density of dots in the dot row regions due to unevenness in the ink ejection direction etc., the measured values are as shown by the solid line in the drawing.

In the second embodiment, correction patterns are read for only three colors of inks. For this reason, compared to when reading correction patterns for all six color inks, with the second embodiment it is possible to reduce the work involved in reading the correction patterns.

(3) Regarding Recording of the Measured Value for each Dot Row Region (Step S153)

Next, the computer 2110A records the measured values in the printer-side memory 2063 and then stores correction data tables in the printer-side memory 2063.

FIG. 36 is a conceptual diagram of the correction data tables stored in the printer-side memory 2063. The correction data tables are prepared respectively for light cyan ink, light magenta ink, and yellow ink.

In the correction data tables, measured values are stored correlated to a dot row region and a dot creation ratio. Each dot row region is given a number, and the numbers in each correction data table is equivalent to the number of dot row regions lined up in the carrying direction of the printable region on the paper. Furthermore, the measured values of the correction patterns CP20%, CP40%, CP60%, and CP80% in the same dot row region are recorded in a table of the same number.

The correction data storage section 2063a of the printer-side memories 2063 of the printers 2001 manufactured in the factory stores correction data tables intrinsic to that printer.

It should be noted that the printers are shipped with correction tables recorded (above-described step S143).

In the second embodiment, correction data tables are recorded for only three colors of inks. For this reason, compared to when recording correction data tables for all six colors of inks, with the second embodiment it is possible to reduce the amount of data required to be stored, and therefore it is possible to make the capacity of the printer-side memory 20363 smaller.

===(2) Installing the Printer Driver of the Second Embodiment===

Figure 37:
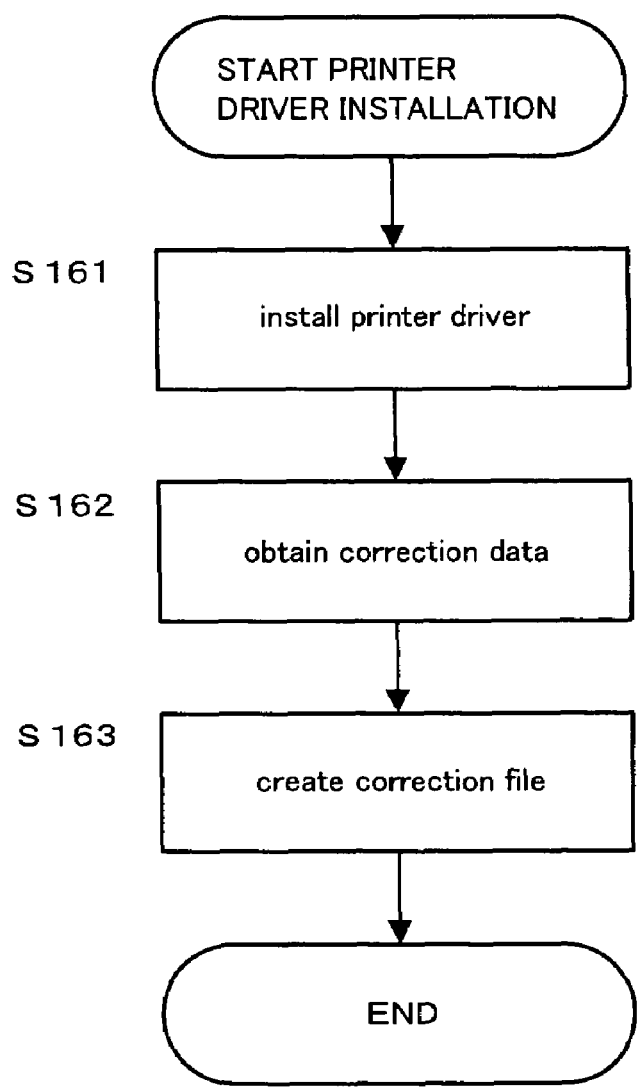
FIG. 37 is a flowchart of when installing the printer driver.

FIG. 37 is a flowchart for describing the flow of processes when installing the printer driver.

A user who purchased the printer connects the printer and the computer 2110, then sets the driver CD-ROM packaged that is packaged with the printer in a CD-ROM drive device 2140B of the computer 2110. Programs such as a printer driver and application software are recorded on the driver CD-ROM.

When the driver CD-ROM is set in the CD-ROM drive device 2140B, the computer 2110 carries out installation of the printer driver (Step S161).

Then, the printer driver that has been installed on the computer 2110 respectively reads out correction data of the correction data tables recorded in the correction data storage section 63a of the printer-side memory 2063 and records the correction data that has been read out on the computer-side memory 2163 (Step S162).

It should be noted that since the correction data tables for only three color inks is recorded in the second embodiment, compared to the case of recording correction data tables for all six colors, it is possible to reduce the reading-out time for reading out the correction data from the printer.

After this, the printer driver creates correction files based on the obtained correction data (Step S163). The creation of the correction files will be discussed later. It should be noted that the above-described obtaining of correction data (S162) and creation of correction files (Step S163) can be carried out in parallel with the installation processes of other application software recorded on the driver CD-ROM. After the correction files are created and other applications are finished being installed, the computer 2110 finishes the operation of the CD-ROM drive device 2140B and the reading out of information from the driver CD-ROM is finished.

<Step S163: Creating Correction Files>

Figure 38:
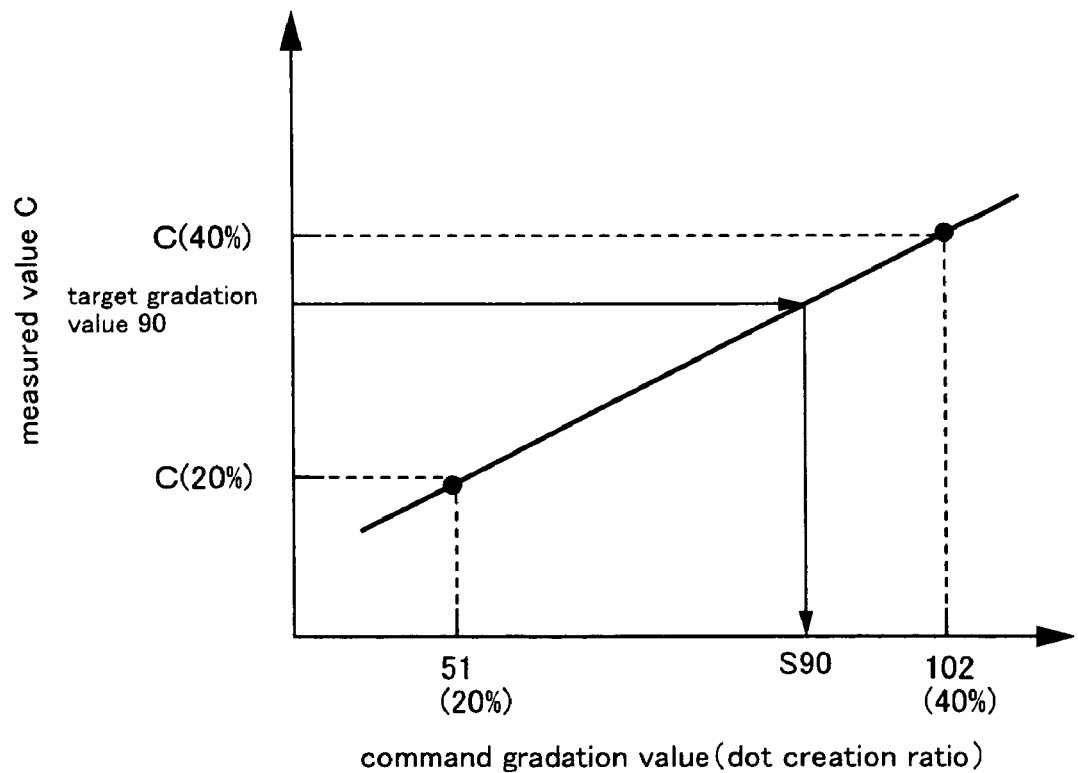
FIG. 38 is a graph showing the relationship between instructed values and measured values in a given dot row region.

FIG. 38 is a graph showing the relationship between instructed gradation values and measured values in a given dot row region. In this drawing, the measured value of the darkness of the correction pattern CP40% in a given dot row region is C(40%) and the measured value of the darkness of the correction pattern CP20% in a given dot row region is C(20%).

The above-mentioned correction pattern CP40%. is printed based on instructed gradation values indicating a dot creation ratio of 40%. A 40% dot creation ratio corresponds to an image of gradation value 102 (in 256 gradations), but due to unevenness in machining precision, the measured gradation value C (40%) will not always be "102." For example, in a dot row region of low darkness, the measured gradation value C (40%) may be a value lower than 102.

In other words, in the case of printing an image of the gradation value C(40%), if the image is subjected to halftoning at the dot creation ratio corresponding to the gradation value "102" during halftoning, then an image of the target gradation value C(40%) can be printed even if there is unevenness in machining precision.

Similarly, in the case of printing an image with a gradation value of 90, if the image undergoes halftoning at the dot creation ratio corresponding to the gradation value "S90" in the drawing during halftoning, then an image of the target gradation value 90 can be printed even if there is unevenness in machining precision. The gradation value "S90" can be calculated using linear interpolation based on the measured gradation value C(40%) and the measured gradation value C(20%).

In this way, when printing a particular target gradation value, a dot creation ratio matching that target gradation value can be calculated based on correction data stored in the correction data storage section 2063a. By calculating matching dot creation ratios for each gradation value of each dot row region in this way, it is possible to create the correction files of the second embodiment.

Figure 39:
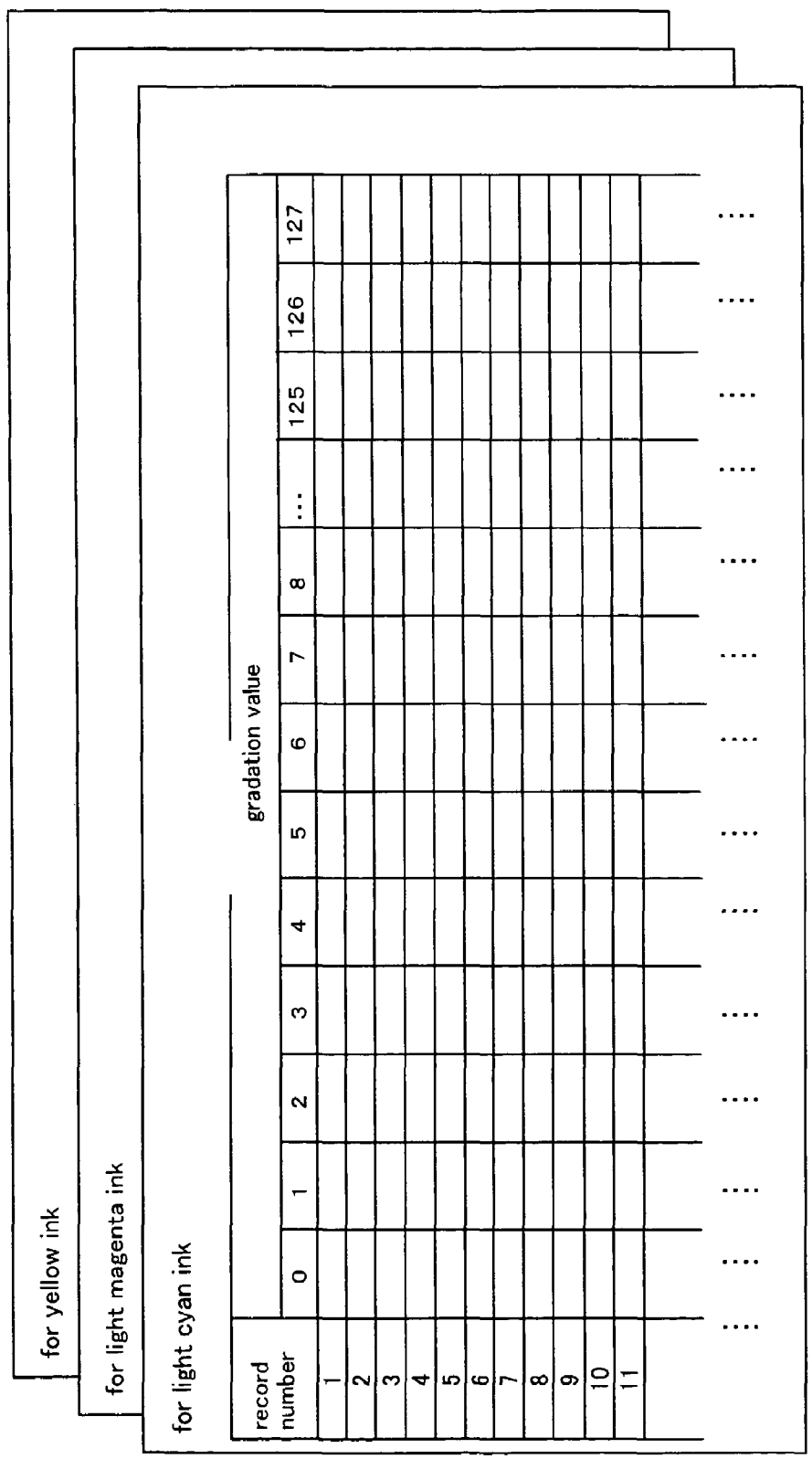
FIG. 39 is an explanatory diagram of correction files in the second embodiment.

FIG. 39 is an explanatory diagram of correction files in the second embodiment. As shown in this drawing, correction data files are prepared respectively for light cyan ink, light magenta ink, and yellow ink. The printer driver associates the dot creation ratios that have been calculated using linear interpolation with the dot row regions and the gradation values and records these in the correction file storage section 2163a of the computer-side memory 2163. That is, the printer driver creates correction files by recording the calculated dot creation ratios in the empty fields shown in the drawing. The correction files include dot creation ratio tables for each dot row region from gradation value 0 to 127. And different dot creation ratio tables are created for each dot row region.

The correction files of the second embodiment indicate dot creation ratios for gradation values of 127 and lower and do not have information indicating dot creation ratios for gradation values of 128 and higher. For this reason, compared to correction files that indicate dot creation ratios for all 256 gradation values, the correction files of the second embodiment have a reduced data volume. Further, since the printer driver does not perform calculations for dot creation ratios for gradation values of 128 and higher in the second embodiment, it is possible to reduce the amount of calculation of the computer 2110 when generating correction files.

===(2) The Processing During Printing in the Second Embodiment===

<Regarding Dot Creation Ratios in the Second Embodiment>

When a user who has installed the printer driver executes printing from application software, the printer driver receives the image data from the application software, then generates print data by performing resolution conversion, color conversion, halftoning, and rasterization, and sends the print data to the printer 2001. The following is a description of the halftoning process in the second embodiment when generating print data.

Figure 40A:
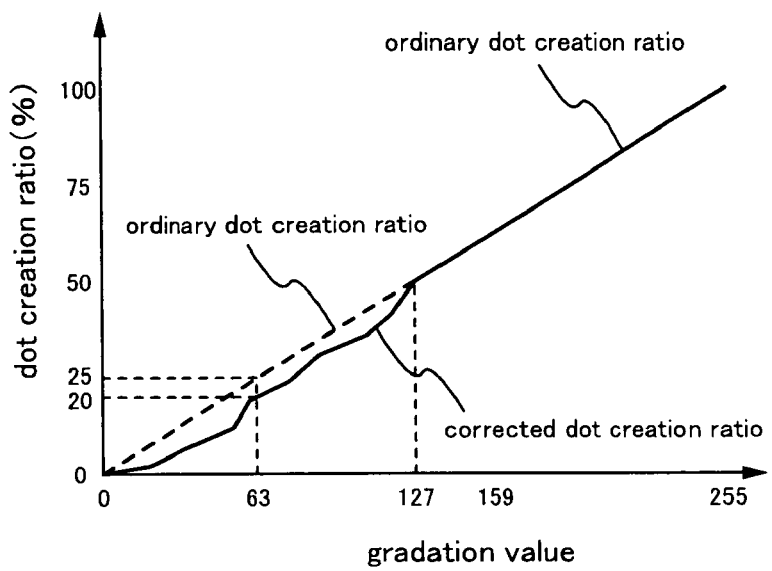
FIG. 40A is an explanatory diagram of a dot creation ratio table for yellow in a particular dot row region.
Figure 40B:
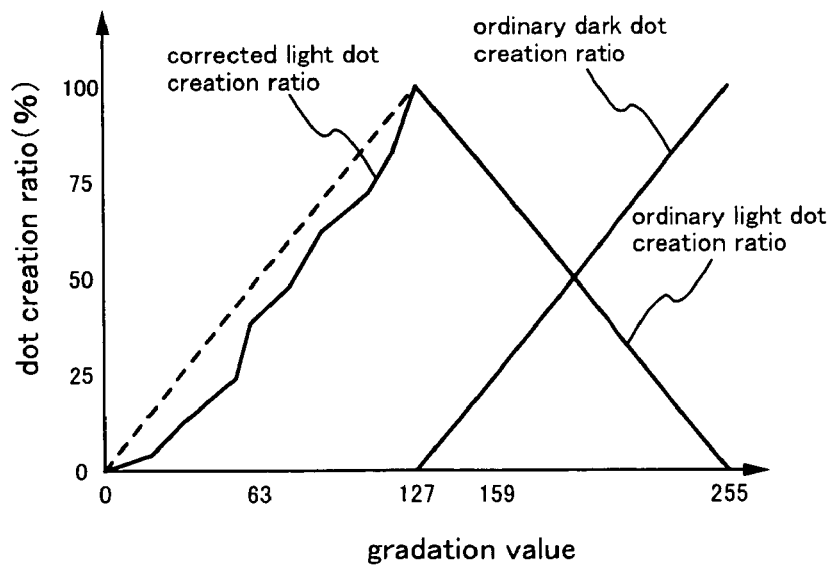
FIG. 40B is an explanatory diagram of a dot creation ratio table for cyan in a particular dot row region.

FIG. 40A is an explanatory diagram of a dot creation ratio table for yellow in a particular dot row region. FIG. 40B is an explanatory diagram of a dot creation ratio table for cyan (or magenta) in a particular dot row region. The dashed lines in the drawings indicate the dot creation ratios of FIGS. 27A and 27B.

When halftoning is performed based on the dot creation ratios of the dashed lines shown in the drawings, darkness non-uniformities occur due to unevenness in machining precision. On the other hand, in the second embodiment, halftoning is performed using dot creation ratios calculated based on correction data tables as shown by the solid lines in the drawings.

When performing halftoning on pixel data of a given dot row region, if the gradation value indicated in that pixel data is 127 or lower (less than 128), the printer driver reads out a dot creation ratio corresponding to that dot row region from the correction files stored in the correction data storage section 2063a. The printer driver then performs halftoning on the pixel data of that dot row region based on the dot creation ratio that has been read out.

For example, when the gradation value of pixel data of a particular dot row region is 63 prior to halftoning, ordinarily the dot creation ratio for that pixel data is 25%, but here it is 20% (for other dot row regions, this will be a different value). Similarly, when the gradation value of pixel data prior to halftoning is 127 or less in this dot row region, then a dot creation ratio lower than the ordinary dot creation ratio will be used.

The dot row regions corresponding to the dot creation ratio table in the figure can be thought to be printed relatively darker, due to unevenness in machining precision. In the second embodiment, the pixel data corresponding to these dot row regions are subjected to halftoning using the dot creation ratio of the correction file, and therefore the density of dots formed in that dot row region is lowered and the darkness of the image fragment of that dot row region is corrected to the target darkness.

In the second embodiment, when the gradation value of pixel data corresponding to a particular dot row region is 127 or lower, the dots in that dot row region are formed based on a dot creation ratio corresponding to that dot row region, and therefore the darkness of the image fragment formed in that dot row region is corrected. In this way, even when printing a light image in which darkness non-uniformities occur easily, the darkness of the image fragments that constitute that image can be made uniform, such that the occurrence of darkness non-uniformities can be inhibited.

On the other hand, when the gradation value of pixel data corresponding to a particular dot row region is 128 or higher, the printer driver performs halftoning on that pixel data based on standard dot creation ratio tables (FIGS. 27A and 27B). That is, the same halftoning is performed for the pixel data of any dot row region when the gradation value of the pixel data is 128 or higher. For this reason, if the gradation value of pixel data is 128 or higher, then an image fragment is formed in a dot row region without darkness correction being performed. As a result, although the levels of darkness in the dot row regions will vary due to unevenness in processing precision, it is difficult for darkness non-uniformities to occur since the print image is dark in these regions if the gradation value of the pixel data is 128 or higher, such that it is unnecessary to perform darkness correction.

<Regarding Halftoning in the Second Embodiment>

Figure 41:
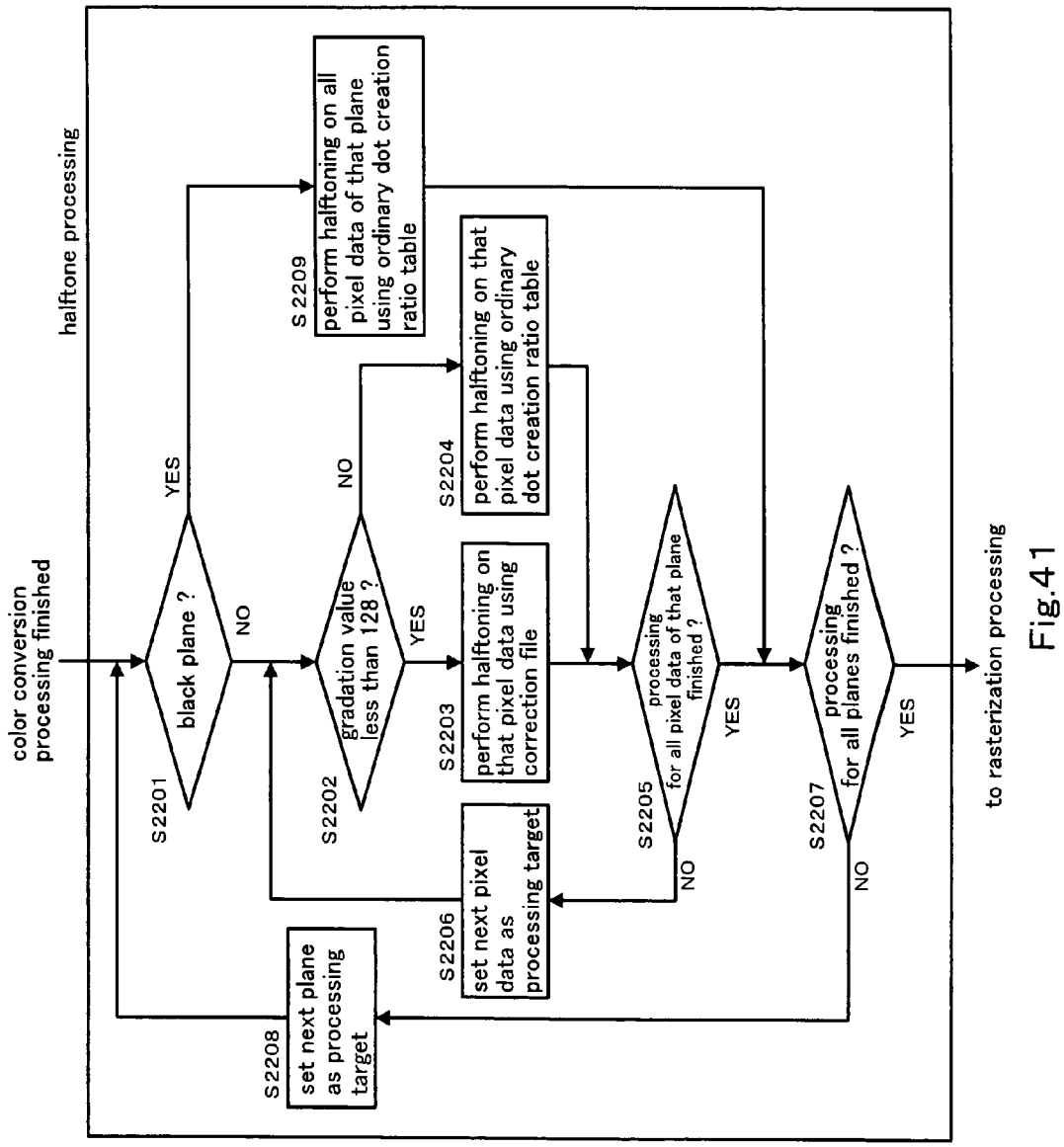
FIG. 41 is a flowchart of the halftoning process according to the second embodiment.

FIG. 41 is a flowchart of the halftoning process according to the second embodiment. After color conversion, the printer driver performs halftoning on CMYK image data of 256 gradations of four colors. Here, the halftoning is performed on the image data in order of cyan, magenta, yellow, and black. It should be noted that the collection of pixel data that constitutes the cyan image data is also referred to in such ways as the "cyan plane."

First, the printer driver determines whether or not the target for halftoning is black plane pixel data (step S201). Since the first target for processing is cyan image data, the determination here is "No."

Next, the printer driver determines whether or not the gradation value of the first pixel data of the cyan plane is less than 128 (step S202). If the gradation value of the pixel data is less than 128 ("yes" at S202), then the printer driver performs halftoning on that pixel data according to the correction file (step S203). That is, the printer driver references the correction file (FIG. 39), reads out the dot creation ratio corresponding to the dot row region to which that pixel data belongs and the gradation value indicated for that pixel data, then performs halftoning on that pixel data according to the dot creation ratio that has been read out. On the other hand, if the gradation value of the pixel data is 128 or higher ("no" at S202), then the printer driver performs halftoning on that pixel data according to the ordinary dot creation ratio table (FIG. 27B) (step S203). Due to step S203 and step S204, the 256 gradation pixel data of cyan is converted into binary pixel data of cyan and binary pixel data of light cyan.

The above-described process (steps S202 to S204) is repeated by the printer driver for all the pixel data of the cyan plane ("no" at step S205, S206). Then, once the processing of all the pixel data of the cyan plane is finished ("yes" at step S205), the printer driver sets the magenta plane as the next processing target ("no" at step S207, step S208).

Similarly, the printer driver performs halftoning on all the pixel data of the magenta plane, performs halftoning on all the pixel data of the yellow plane, then finally sets the black plane as the target for processing.

When the black plane is the target for processing, since there is no data related to dot creation ratios for black in the correction file, the printer driver performs halftoning on all the pixel data of the black plane according to the ordinary dot creation ratio table (FIG. 27A) (step S209).

After this, when the processing for all planes is finished ("yes" at step S207), all the pixel data of 256 gradations have been converted into binary pixel data, and therefore the printer driver next carries out rasterization.

===(2) Other Embodiments===

The foregoing second embodiment is for the purpose of elucidating the present invention and is not to be interpreted as limiting the present invention. The invention can of course be altered and improved without departing from the gist thereof and includes equivalents. In particular, the embodiments mentioned below are also included in the invention.

<Regarding the Head>

In the foregoing second embodiment, ink was ejected using piezoelectric elements. However, the method for ejecting liquid is not limited to this. Other methods, such as a method for generating bubbles in the nozzles through heat, may also be employed.

Furthermore, in the foregoing second embodiment, the head was provided in a carriage. However, the head may be provided in an ink cartridge attachable/detachable with respect to the carriage.

<Regarding the Movement Section>

In the foregoing second embodiment, the carriage motor 2032 constituted by a DC motor was used as the movement section for moving the head in the movement direction. However, there is no limitation to this motor. In effect, it is sufficient if the movement section is capable of moving the head in the movement direction.

<Regarding the Carrying Section>

In the foregoing second embodiment, the carry unit 2020 was used as the carrying section for carrying a medium such as paper in the carrying direction. However, the configuration of the carrying section is not limited to this configuration. For example, the carrying section may carry paper using a carry belt or the like rather than a carry roller.

<Regarding the Unit Regions>

In the foregoing second embodiment, as shown in FIG. 29A, the dot row region in which a raster line is to be formed is used as a "unit region". However, the unit region may also be a region between the center of one raster line and the center of another raster line. In this case, the unit image is the image in the unit region between the center of one raster line and the center of another raster line, and the correction data is created by detecting the darkness of this unit image.

<Regarding Dot Size>

In the foregoing second embodiment, the pixel data was binary in order to simplify description. However, there is no limitation to this, and the pixel data may indicate dot size (large dot, medium dot, small dot, etc) by using 2-bit data as the pixel data.

In this case, an image of light gradations indicated by low gradation values is mainly formed by small dots. And darkness non-uniformities tend to occur easily in print images formed by such small dots.

For this reason, when the head is capable of forming dots of different sizes, correction patterns constituted by only small dots may be created. The dot creation ratios of small dots may then be corrected according to the detection results of the correction patterns. This makes it possible to inhibit darkness non-uniformities in print images.

<Regarding the Range of the Correction>

In the foregoing second embodiment, darkness correction was carried out when the gradation value of the pixel data was in the range of 0 to 127. However the range of gradation values to be corrected is not limited to this. For example, darkness correction may be performed when the gradation value of pixel data is in the range of 32 to 96, and instead of carrying out darkness correction for the entire range less than a predetermined gradation value, it is also possible to carry out darkness correction for a specified range less than a predetermined gradation value.

In this case, it is only necessary that, for example, the correction pattern CPlc in cyan has two categories of correction patterns of dot creation ratios (40% and 60%), and therefore it is not necessary to print the correction pattern CP20% and the correction pattern CP80%.

===Overview===

(1) The printing system 2100 according to the foregoing second embodiment is provided with a carriage motor 2032 (an example of a movement section) that moves the head 2041, which ejects ink, and carry unit 2020 (an example of a carrying section) that carries paper (an example of a medium) in the carrying direction.

With this printing system, darkness non-uniformities may occur when a print image is formed by alternately repeating a dot formation operation and a carrying operation. For this reason, in order to correct the darkness of image fragments (which are formed by raster lines and are one example of a "unit image") by which a print image is formed, the above-described printing system is provided with printer-side memory 2063 for storing correction data (see FIG. 36) and a computer-side memory 2163 for storing correction files (see FIG. 39) that are created using the correction data.

Then, the printer driver (specifically, a computer-side controller (the CPU 2162 and the computer-side memory 2163) of a computer on which the printer driver is installed) generates print data by carrying out halftoning according to a dot creation ratio expressed in the correction file. When this print data is sent to the computer 2001, the printer-side controller 2060 forms the print image on the paper according to the print data. The darkness of the print fragments that constitute the print image at this time are corrected according to the correction file, and therefore a print image is obtained free of darkness non-uniformities.

Note here that when halftoning is provisionally carried out based on correction files for pixel data of all gradation values, the data volume of the correction files becomes large. Furthermore, extensive computation is necessary in creating such correction files.

While it is easy for darkness non-uniformities to occur in light regions in the print image, it is difficult for them to occur in dark regions in the print image. For this reason, it is possible to inhibit darkness non-uniformities by carrying out halftoning based on the correction files for only pixel data having low gradation values, that is, by carrying out darkness correction for only regions in the print image that are light.

Accordingly, when the gradation value of the pixel data is less than 128, the printer driver references the correction files and carries out halftoning based on a dot creation ratio of the dot row region corresponding to the pixel data, and when the gradation value of the pixel data is higher than 128, halftoning is carried out based on an ordinary dot creation ratio. When print data created in this way is sent to the printer, the printer-side controller forms the print image on the paper in a state in which the image fragments in light regions have undergone darkness correction. In other words, with the above-described printing system, the computer-side controller and the printer-side controller 2060 form the image fragments in each dot row region such that darkness correction is carried out when the gradation value of the pixel data is less than 128 but darkness correction is not carried out when the gradation value of the pixel data is 128 or higher. This reduces darkness non-uniformities and improves the quality of print images.

Also, with this printing system, the storage capacity of the printer-side memory 2063 that stores the correction data can be reduced. If it were attempted to carry out darkness correction for all gradation values, the printer-side memory would have to not only have correction data for light cyan ink, but also correction data for cyan ink, which would make it necessary to increase the storage capacity of the printer-side memory 2063.

Furthermore, with this printing system, the amount of computation used when creating the correction files can be reduced. If it were attempted to carry out darkness correction for all gradation values, the printer driver must calculate dot creation ratios not only for gradation values in the range of 0 to 127, but also dot creation ratios for gradation value in the range of 128 to 255, which requires extensive amounts of computation.

(2) The above-described head 2041 is capable of forming cyan dots (dark dots) and light cyan dots (light dots), which absorb red light, but absorb different amounts of red light. Furthermore, the above-described head is capable of forming magenta dots (dark dots) and light magenta dots (light dots), which absorb green light, but absorb different amounts of green light. In regard to cyan and magenta, when the gradation value of the pixel data is less than 128, only light dots are formed on the paper (see FIG. 40B).

For this reason, the printer-side memory 2063 and the computer-side memory 2163 do not need to store correction values related to dark dots, thus the storage capacity of the memories can be reduced. Furthermore, when creating the correction patterns, it is only necessary to use only light inks (light cyan ink and light magenta ink), and therefore the time and effort of the tasks involved can be reduced. Furthermore, when creating the correction data, it is only necessary to detect only correction patterns using light inks, thus reducing the time and effort of the tasks involved.

(3) The above-described head 2041 forms dark dots and light dots of cyan and magenta. However, there is no limitation to this, and the head 2041 may form dark dots and light dots of yellow.

(4) The above-described computer-side memory 2163 stores dot creation ratios of light dots for each dot row region in correction files (see FIG. 39). And the darkness of image fragments formed in the dot row regions is corrected using the dot creation ratios of the correction files.

However, the information to be stored in the computer-side memory 2163 is not limited to dot creation ratios. For example, correction values for correcting each dot row region of RGB image data after resolution conversion may be stored in the computer-side memory 2163. The darkness of image fragments can also be corrected in this way.

(5) The above-described printer-side memory 2063 stores measured values of darkness in the dot row regions as correction data (see FIG. 36). And the darkness of image fragments formed in the dot row regions is corrected using the correction data.

However, the information to be stored in the printer-side memory 2063 is not limited to measured values in the above-described embodiments. For example, information obtained by performing calculations on the measured values may also be stored.

(6) The above-described head 2041 forms on paper the correction patterns CP in which a plurality of image fragments are made adjacent to one another in the carrying direction (see FIG. 33). And the printer-side memory 2063 stores measured values corresponding to the darkness of each dot row region in the correction patterns, these measured values being associated with the respective dot row regions (see FIG. 36). And the computer-side memory 2163 stores dot creation ratios corresponding to the darkness of each dot row region in the correction patterns, these dot creation ratios being associated with the respective dot row regions (see FIG. 39).

Thus, darkness correction can be carried out corresponding to each dot row region, and therefore darkness non-uniformities can be inhibited.

(7) The above-described head 2041 is capable of forming cyan dots (dark dots) and light cyan dots (light dots), which absorb red light, but absorb different amounts of red light. Furthermore, the above-described head is capable of forming magenta dots (dark dots) and light magenta dots (light dots), which absorb green light, but absorb different amounts of green light.

Also, the correction pattern CPlc is formed using only light cyan dots (light dots) and the correction pattern CPlm is formed using only light magenta dots (light dots). That is, when creating correction patterns for carrying out darkness correction of a cyan image for example, it is not necessary to create correction patterns using cyan ink (dark ink), thus reducing the time and effort of the tasks involved.

(8) The above-described computer-side controller and printer-side controller 2060 correct the darkness of image fragments by correcting, based on correction files, the dot creation ratios of dots to be formed in the dot row regions.

For example, focusing on a dot row region in which a comparatively dark image fragment is formed, the dot creation ratio corresponding to the correction file of that dot row region will have a value smaller than the ordinary dot creation ratio. For this reason, when the computer-side controller carries out halftoning according to the correction files, print data is generated in which the number of dots formed is smaller than ordinary. And when the printer-side controller 2060 carries out printing according to this print data, the number of dots that constitute the raster lines forming that dot row region is smaller than ordinary, such that the image fragment made by a raster line is formed lighter than ordinary, a result of which is that darkness non-uniformities are inhibited.

(9) If all the components of the above-described printing system are provided, it is possible to achieve all the effects described above. However, not all the components of the above-described printing system are absolutely necessary.

(10) In the above-described printing method, first the user connects the printer 2001, which forms the print image on the paper (an example of a medium) by forming image fragments (an example of a unit image) in adjacent dot row regions (an example of a unit region), to the computer 2110. Next, the user installs the printer driver on the computer 2110 and, at this time, the printer driver obtains correction data associated with each of the dot row regions from the printer 2001. Then, when the gradation value of the pixel data corresponding to the dot row region on the paper is less than 128, the printer driver performs halftoning (see step S203 in FIG. 41) according to dot creation ratios of the correction files created using correction data corresponding to the dot row regions. When the printer 2001 carries out printing according to the thus-created print data, the image fragment formed in that dot row region will be formed based on darkness that has been corrected. Furthermore, when the gradation value of the pixel data is 128 or higher, halftoning is carried out according to the ordinary dot creation ratios (step S204 in FIG. 41). When the printer 2001 carries out printing according to the thus-created print data, the image fragment formed in that dot row region will be formed based on darkness that has not been corrected.

With this printing method, darkness non-uniformities can be effectively inhibited. Furthermore, the amount of information of correction data stored in the printer 2001 can be reduced, and therefore the time required for the printer driver to obtain correction data can be shortened. Moreover, the amount of computation required in darkness correction can be reduced.

(11) The computer 2110 (an example of a print control apparatus) in which the above-described printer driver is installed controls the printer 2001 that forms print images on paper by forming image fragments in adjacent dot row regions. And the printer driver lets the computer 2110 obtain correction data associated with the dot row regions from the printer. Then, when the gradation value of the pixel data corresponding to the dot row region on the paper is less than 128, the printer driver, in the computer 2110, performs halftoning (see step S203 in FIG. 41) according to dot creation ratios of the correction files created using correction data corresponding to that dot row region and creates print data. Furthermore, when the gradation value of the pixel data corresponding to the dot row region on the paper is 128 or higher, the printer driver, in the computer 2110, performs halftoning according to the ordinary dot creation ratios (see step S204 in FIG. 41). The printer driver, in the computer 2110, then sends the print data that has been created to the printer 2001.

Thus, if the printer 2001 carries out printing according to the print data, it is possible to achieve printed images with few darkness non-uniformities. Furthermore, the amount of information of correction data stored in the printer 2001 can be reduced, and therefore the time required for the printer driver to obtain correction data can be shortened. Moreover, the amount of computation of the computer 2110 required in darkness correction can be reduced.

(12) In the above-described printing method, first, a worker in a printer factory prepares a printer 2001 that is capable of forming on paper cyan dots (an example of dark dots) and light cyan dots (an example of light dots), which absorb red light, but absorb different amounts of red light, then causes the printer to form on the paper a correction pattern CPlc (see FIG. 33) that is constituted by only light cyan dots. After this, the scanner device 2150 reads the correction pattern CPlc, and detects the respective levels of darkness of a plurality of image fragments (an example of a unit image and each constituted by a raster line) that constitute the correction pattern CPlc. Then, an in-process correction program 2118A of the computer 2110A inside the factory stores measurement data (an example of information related to darkness) of the darkness of each image fragment, this data being associated with the respective dot row regions and stored in the correction data storage section 2063a of the printer-side memory 2063 (see FIG. 36).

At the time of printing, the printer driver creates print data based on the correction data of the printer 2001 and the printer 2001 carries out printing according to the print data. As a result, the darkness of the image fragments formed by dark dots and light dots is corrected according to correction data, and a print image constituted by a plurality of image fragments is formed on the paper.

With this printing method, printed images with few darkness non-uniformities can be obtained. Furthermore, since it is not necessary to record information related to dark dots, the volume of information of correction data can be made small. Thus, the time and effort of creating and reading correction patterns can be reduced.

(13) In the above-described method of manufacturing a printer, first, a worker in a printer factory prepares a printer 2001 that is capable of forming on paper cyan dots (an example of dark dots) and light cyan dots (an example of light dots), which absorb red light, but absorb different amounts of red light, then causes the printer to form on the paper a correction pattern CPlc (see FIG. 33) that is constituted by only light cyan dots. After this, the scanner device 2150 reads the correction pattern CPlc, and detects the respective levels of darkness of a plurality of image fragments (an example of a unit image and each constituted by a raster line) that constitute the correction pattern CPlc. Then, an in-process correction program 2118A of the computer 2110A inside the factory stores measurement data (an example of information related to darkness) of the darkness of each image fragment, this data being associated with the respective dot row regions and stored in the correction data storage section 2063a of the printer-side memory 2063 (see FIG. 36).

With this method of manufacturing a printer, since it is not necessary to record information related to dark dots, the capacity of the memory 2063 of the printer 2001 can be made small. Furthermore, the time and effort of creating and reading correction patterns when creating correction data to be recorded in the memory 2063 can be reduced, and the printer can be manufactured with better efficiency.

What is claimed is:

1. A printing method comprising:
   determining a first color group including at least one color of a plurality of colors, said plurality of colors being colors of ink is to be ejected from a plurality of nozzles of a printing apparatus;
   determining a second color group including at least one color of said plurality of colors, said second color group being different from said first color group;
   carrying out darkness correction in order to inhibit darkness non-uniformity between dot row regions on a medium with respect to said first color group, for each of said dot row regions, without carrying out said darkness correction with respect to said second color group;
   ejecting ink toward each of said dot row regions from each of said plurality of nozzles for said first color group so that said dot row regions take on a corrected darkness; and
   ejecting ink toward each of said dot row regions from each of said plurality of nozzles for said second color group so that said dot row regions take on a darkness that has not been corrected.

2. A printing method according to claim 1,
   wherein said darkness correction is carried out based on a result of reading correction patterns printed for each of a plurality of gradations for each color of said first color group.

3. A printing method according to claim 2,
   wherein each of said correction patterns is printed extending in a predetermined direction on said medium for each of said gradations for each color of said first color group.

4. A printing method according to claim 2,
   wherein said correction patterns are printed lined up in a movement direction.

5. A printing method according to claim 2,
   wherein said correction patterns required for carrying out said darkness correction are all printed on a single medium.

6. A printing method according to claim 1,
   wherein said each color of said first color group is a color in which darkness non-uniformity between said dot row regions is easily visible.

7. A printing method according to claim 1,
   wherein said each color of said first color group is a color that, among said plurality of colors, has a high level of darkness.

8. A printing method according to claim 1,
   wherein said first color group includes at least one of cyan, magenta, and black, and
   wherein said second color group includes yellow.

9. A printing method comprising:
- determining a first color group including at least one color of a plurality of colors, said plurality of colors being colors of ink that is to be ejected from a plurality of nozzles of a printing apparatus;
- determining a second color group including at least one color of said plurality of colors, said second color group being different from said first color group;
- carrying out darkness correction in order to inhibit darkness non-uniformity between dot row regions on a medium with respect to said first color group, for each of said dot row regions, without carrying out said darkness correction with respect to said second color;
- ejecting ink toward each of said dot row regions from each of a plurality of nozzles for said first color group so that said dot row regions take on a corrected darkness; and
- ejecting ink toward each of said dot row regions from each of said plurality of nozzles for said second color group so that said dot row regions take on a darkness that has not been corrected;
- wherein said darkness correction is carried out based on a result of reading correction patterns printed for each of a plurality of gradations for each color of said first color group;
- wherein each of said correction patterns is printed extending in a predetermined direction on said medium for each of said gradations for each color of said first color group;
- wherein said correction patterns are printed lined up in a movement direction;
- wherein said correction patterns required for carrying out said darkness correction are all printed on a single medium;
- wherein said each color of said first color group is a color in which darkness non-uniformity between said dot row regions is easily visible;
- wherein said each color of said first color group is a color that, among said plurality of colors, has a high level of darkness; and
- wherein said first color group includes at least one of cyan, magenta, and black, and
- wherein said second color group includes yellow.

10. A computer-readable medium for causing a printing apparatus that is provided with a plurality of nozzles arranged along a predetermined direction for each ink color of a plurality of colors to operate, said medium comprising:
- a code for causing performance of darkness correction in order to inhibit darkness non-uniformity between dot row regions on a medium with respect to a first color group, for each of said dot row regions, without carrying out said darkness correction with respect to a second color group, said first color group including at least one color of a plurality of colors, said plurality of colors being colors of ink that is to be ejected from a plurality of nozzles of a printing apparatus, said second color group including at least one color of said plurality of colors, said second color group being different from said first color group;
- a code for causing ejection of ink toward each of said dot row regions from each of said nozzles for said first color group, so that said dot row regions take on a corrected darkness; and
- a code for causing ejection of ink toward each of said dot row regions from each of said nozzles for said second color group so that said dot row regions take on a darkness that has not been corrected.

11. A printing method comprising:
- a printer executing a correction pattern,
- wherein said correction pattern being used in darkness correction executed for each of a plurality of dot row regions on a medium to inhibit darkness non-uniformities between said dot row regions, said darkness correction being carried out with respect to a first color group, for each of said dot row regions, said darkness correction not being carried out with respect to a second color group, said first color group including at least one color of a plurality of colors, said plurality of colors being colors of ink that is to be ejected form a plurality of nozzles of a printing apparatus, said second color group including at least one color of said plurality of colors, said second color group being different from said first color group,
- wherein each color of said first color group is used for printing said correction pattern, and
- wherein each color of said second color group is not used for printing said correction pattern.

12. A printing apparatus comprising:
- a plurality of nozzles for each ink color of a plurality of colors;
- wherein darkness correction is executed for each of a plurality of dot row regions on a medium to inhibit darkness non-uniformities between said dot row regions with respect to a first color group, for each of said dot row regions, without carrying out said darkness correction with respect to said second color group, said first color group including at least one color of a plurality of colors, said plurality of colors being colors of ink that is to be ejected from said plurality of nozzles of said printing apparatus, said second color group including at least one color of said plurality of colors, said second color group being different from said first color group,
- wherein each of the plurality of nozzles ejects ink toward each of said dot row regions for said first color group so that said dot row regions take on a corrected darkness; and
- wherein each of the plurality of nozzles ejects ink toward each of said dot row regions for said second color group so that said dot row regions take on a darkness that has not been corrected.

* * * * *